United States Patent
Suzuki

(10) Patent No.: US 12,142,244 B2
(45) Date of Patent: Nov. 12, 2024

(54) IMAGE DISPLAY DEVICE AND IMAGE DISPLAY METHOD

(71) Applicant: SONY SEMICONDUCTOR SOLUTIONS CORPORATION, Kanagawa (JP)

(72) Inventor: Takaharu Suzuki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/260,496

(22) PCT Filed: Nov. 25, 2021

(86) PCT No.: PCT/JP2021/043170
§ 371 (c)(1),
(2) Date: Jul. 6, 2023

(87) PCT Pub. No.: WO2022/153683
PCT Pub. Date: Jul. 21, 2022

(65) Prior Publication Data
US 2024/0054972 A1 Feb. 15, 2024

(30) Foreign Application Priority Data
Jan. 15, 2021 (JP) ................. 2021-005005

(51) Int. Cl.
*G09G 5/10* (2006.01)
*G06V 40/18* (2022.01)
(52) U.S. Cl.
CPC ............. *G09G 5/10* (2013.01); *G06V 40/193* (2022.01); *G09G 2320/0626* (2013.01)

(58) Field of Classification Search
CPC .......... G02B 27/017; G02B 2027/0178; G02B 27/0172; G02B 2027/0174; G06F 3/013; G06T 19/006
See application file for complete search history.

(56) References Cited

U.S. PATENT DOCUMENTS 11,295,641 B2 * 4/2022 Lee ................. G03B 21/14
2006/0119539 A1 6/2006 Kato et al.
(Continued)

FOREIGN PATENT DOCUMENTS

JP H11-044862 2/1999
JP 2004-233908 8/2004
(Continued)

OTHER PUBLICATIONS

International Search Report and Written Opinion prepared by the Japan Patent Office on Feb. 7, 2022, for International Application No. PCT/JP2021/043170, 3 pgs.

*Primary Examiner* — Koosha Sharifi-Tafreshi
(74) *Attorney, Agent, or Firm* — SHERIDAN ROSS P.C.

(57) ABSTRACT

The present technology provides an image display device capable of preventing a user from feeling glare as much as possible. The image display device according to the present technology includes: an irradiation system that irradiates an eyeball of a user with image light with which an image is formed; and a light amount adjustment system that adjusts a total light amount of the image light to be equal to or lower than a first threshold value regardless of a size of the image. Therefore, it is possible to provide the image display device capable of preventing a user from feeling glare as much as possible.

24 Claims, 59 Drawing Sheets

(56) References Cited

U.S. PATENT DOCUMENTS

| | | | |
|---|---|---|---|
| 2015/0049003 A1* | 2/2015 | Fujimaki | G02B 27/0172 |
| | | | 345/8 |
| 2015/0356905 A1 | 12/2015 | Watanabe | |
| 2016/0266643 A1 | 9/2016 | Martensson et al. | |
| 2018/0149866 A1* | 5/2018 | Noguchi | G02B 27/42 |
| 2019/0011703 A1 | 1/2019 | Robaina et al. | |
| 2019/0361233 A1 | 11/2019 | Ogawa | |
| 2022/0197377 A1* | 6/2022 | Kim | G06V 40/18 |

FOREIGN PATENT DOCUMENTS

| | | |
|---|---|---|
| JP | 2018-034622 | 3/2018 |
| JP | 2019-533824 | 2/2019 |
| WO | WO 2014/129007 | 8/2014 |
| WO | WO 2018/146961 | 8/2018 |
| WO | WO 2020/054378 | 3/2020 |

\* cited by examiner

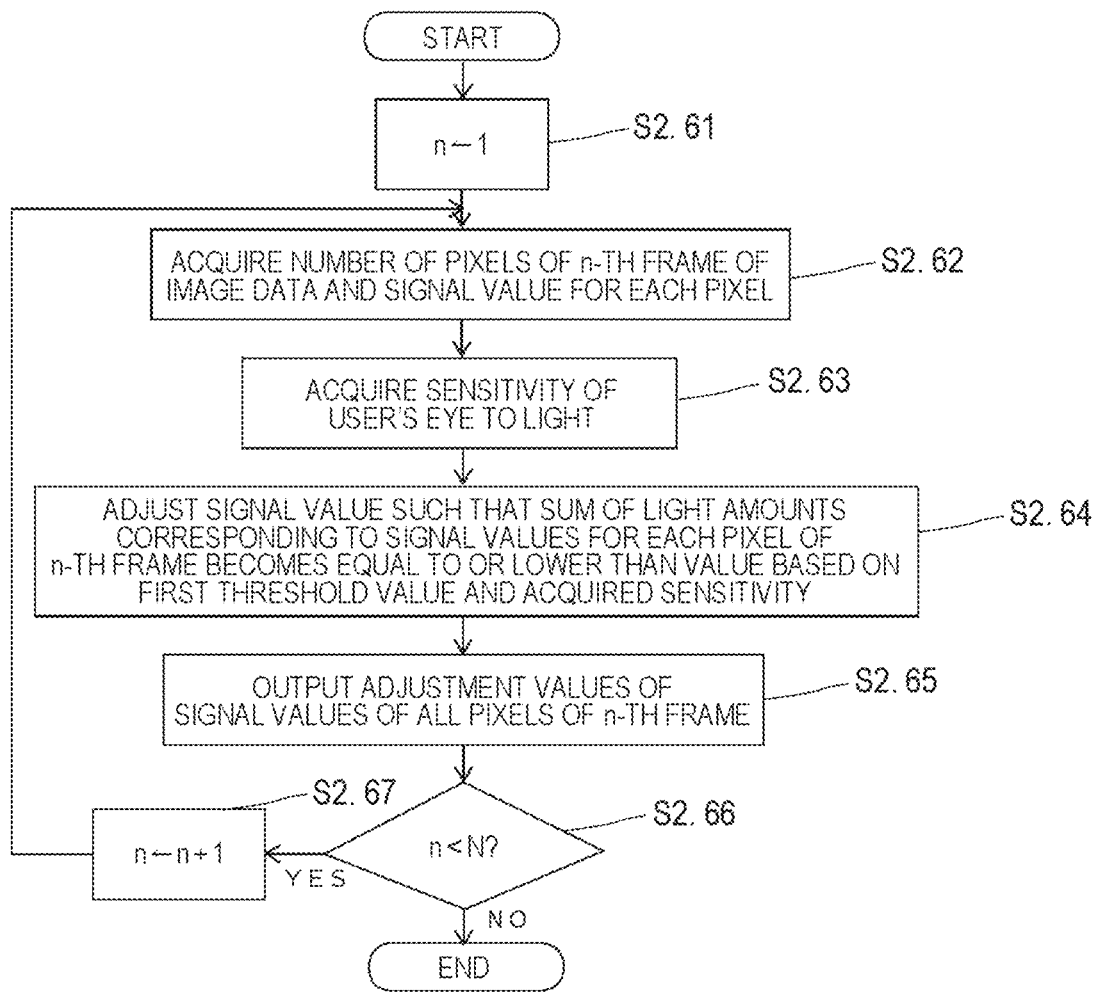

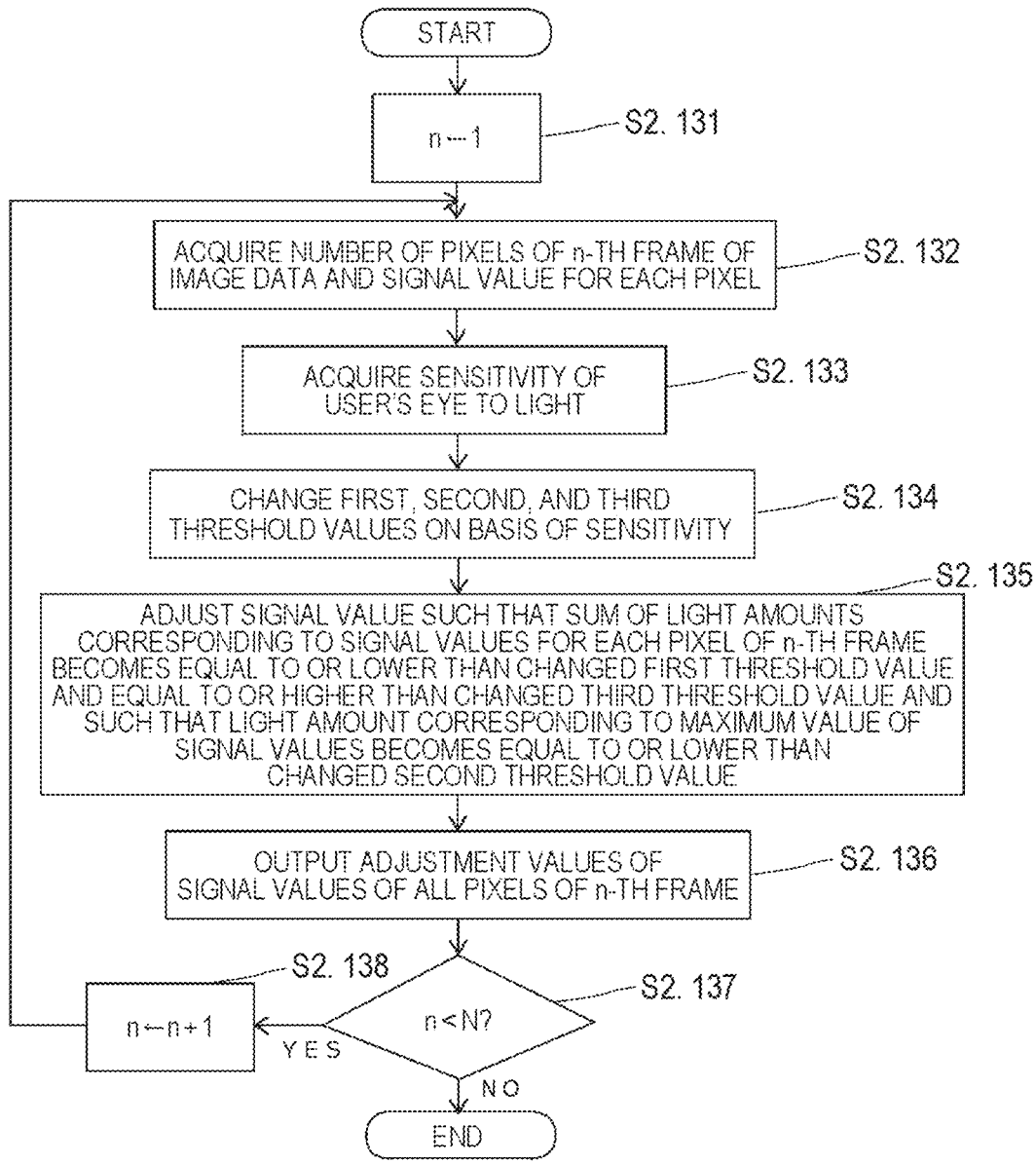

IMAGE DISPLAY DEVICE AND IMAGE DISPLAY METHOD

CROSS REFERENCE TO RELATED APPLICATIONS

This application is a national stage application under 35 U.S.C. 371 and claims the benefit of PCT Application No. PCT/JP2021/043170, having an international filing date of 25 Nov. 2021, which designated the United States, which PCT application claimed the benefit of Japanese Patent Application No. 2021-005005, filed 15 Jan. 2021, the entire disclosures of each of which are incorporated herein by reference.

TECHNICAL FIELD

The technology according to the present disclosure (hereinafter, also referred to as "the present technology") relates to an image display device and an image display method.

BACKGROUND ART

In the related art, an image display device that projects an image onto an eye of a user is known. As such an image display device, a device that detects a pupil diameter of a user and adjusts a light amount of light which is incident on an eye of the user on the basis of a detection result has been disclosed (for example, refer to Patent Document 1).

CITATION LIST

Patent Document

Patent Document 1: Japanese Patent Application Laid-Open No. H11-44862

SUMMARY OF THE INVENTION

Problems to be Solved by the Invention

However, in the image display device in the related art, there is room for improvement in preventing the user from feeling glare as much as possible.

Therefore, a main object of the present technology is to provide an image display device and an image display method capable of preventing a user from feeling glare as much as possible.

Solutions to Problems

According to the present technology, there is provided an image display device including: an irradiation system that irradiates an eyeball of a user with image light with which an image is formed; and a light amount adjustment system that adjusts a total light amount of the image light to be equal to or lower than a first threshold value regardless of a size of the image.

The first threshold value may be a lower limit value of the total light amount at which a person feels glare or a value based on the lower limit value.

The light amount adjustment system may adjust a peak light amount of the image light to be equal to or lower than a second threshold value regardless of a size of the image.

The second threshold value may be a lower limit value of the peak light amount at which a person feels glare or a value based on the lower limit value.

The light amount adjustment system may adjust the total light amount of the image light to be equal to or higher than a third threshold value lower than the first threshold value regardless of a size of the image.

The third threshold value may be a lower limit value of the total light amount at which a person does not feel poor visibility or a value based on the lower limit value.

The light amount adjustment system may adjust the total light amount of the image light to a target value equal to or lower than the first threshold value and equal to or higher than the third threshold value regardless of a size of the image.

The light amount adjustment system may adjust the peak light amount of the image light to be equal to or higher than a fourth threshold value lower than the second threshold value regardless of a size of the image.

The fourth threshold value may be a lower limit value of the peak light amount at which a person does not feel poor visibility or a value based on the lower limit value.

The light amount adjustment system may adjust the peak light amount of the image light to a target value equal to or lower than the second threshold value and equal to or higher than the fourth threshold value regardless of a size of the image.

The light amount adjustment system may include a sensitivity acquisition unit that acquires a sensitivity of an eye of the user to light, and a light amount adjustment unit that adjusts the total light amount and/or the peak light amount on the basis of an acquisition result of the sensitivity acquisition unit.

The sensitivity acquisition unit may acquire the sensitivity from a feature amount of a pupil of the eyeball and/or a feature amount of an iris of the eyeball.

The feature amount of the pupil may be at least one of a hue, a shade, or a size of the pupil.

The feature amount of the iris may be at least one of a hue, a shade, or a size of the iris.

The sensitivity acquisition unit may include an image capturing unit that captures an image of the eyeball and/or a surrounding environment of the eyeball, and acquire the feature amount of the pupil and/or the feature amount of the iris from an image capturing result of the image capturing unit.

The feature amount of the pupil and/or the feature amount of the iris may be input to the sensitivity acquisition unit via an operation unit.

The light amount adjustment system may further include a threshold value changing unit that changes the first threshold value according to the acquisition result of the sensitivity acquisition unit, and the light amount adjustment unit may adjust the total light amount to be equal to or lower than the changed first threshold value.

The threshold value changing unit may further change the second threshold value according to the acquisition result of the sensitivity acquisition unit, and the light amount adjustment unit may adjust the peak light amount to be equal to or lower than the changed second threshold value.

A beam waist position of the image light is at a position shifted from a pupil of the eyeball, and an iris of the eyeball is irradiated with a part of the image light. The light amount adjustment system may adjust the total light amount and/or the peak light amount according to a feature amount of the iris of the eyeball and/or a feature amount of the pupil of the eyeball.

The irradiation system may include a light source unit that emits the image light, and a diffraction unit that diffracts the image light from the light source unit toward the eyeball.

According to the present technology, there is provided an image display method of irradiating an eyeball of a user with image light with which an image is formed, the method including: a light amount adjustment step of adjusting a total light amount of the image light to be equal to or lower than a first threshold value regardless of a size of the image.

The first threshold value may be a lower limit value of the total light amount at which a person feels glare or a value based on the lower limit value.

In the light amount adjustment step, a peak light amount of the image light may be adjusted to be equal to or lower than a second threshold value regardless of a size of the image.

The second threshold value may be a lower limit value of the peak light amount at which a person feels glare or a value based on the lower limit value.

In the light amount adjustment step, the total light amount of the image light may be adjusted to be equal to or higher than a third threshold value lower than the first threshold value regardless of a size of the image.

The third threshold value may be a lower limit value of the total light amount at which a person does not feel poor visibility or a value based on the lower limit value.

In the light amount adjustment step, the total light amount of the image light may be adjusted to a target value equal to or lower than the first threshold value and equal to or higher than the third threshold value regardless of a size of the image.

In the light amount adjustment step, the peak light amount of the image light may be adjusted to be equal to or higher than a fourth threshold value lower than the second threshold value regardless of a size of the image.

The fourth threshold value may be a lower limit value of the peak light amount at which a person does not feel poor visibility or a value based on the lower limit value.

In the light amount adjustment step, the peak light amount of the image light may be adjusted to a target value equal to or lower than the second threshold value and equal to or higher than the fourth threshold value regardless of a size of the image.

BRIEF DESCRIPTION OF DRAWINGS

FIG. 20 is a flowchart for explaining light amount adjustment processing 6.

FIG. 41 is a flowchart for explaining light amount adjustment processing 13.

MODE FOR CARRYING OUT THE INVENTION

Figure 1:
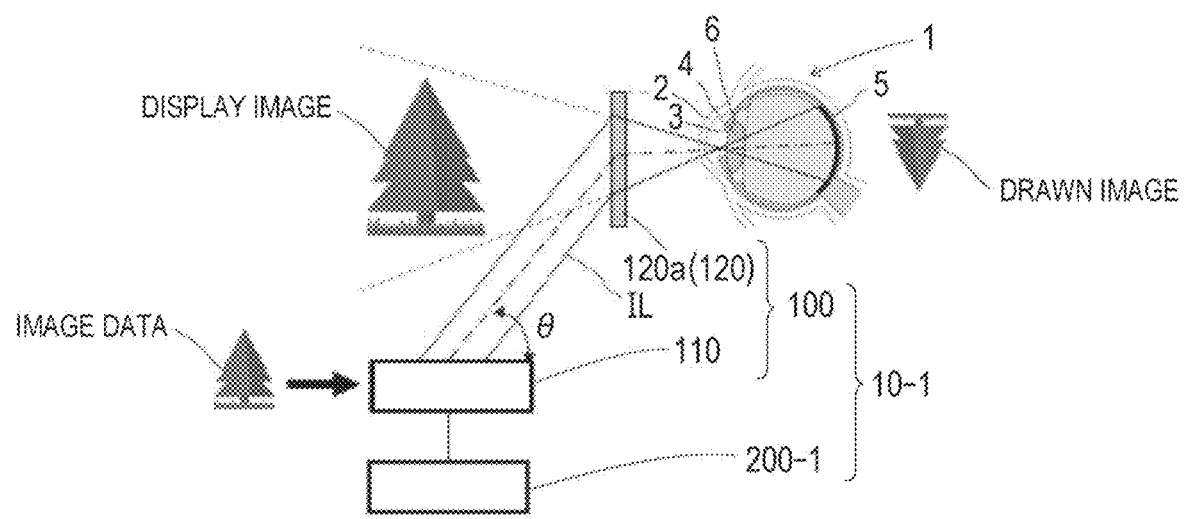
FIG. 1 is a diagram schematically illustrating a configuration example of an image display device according to a first embodiment.

Hereinafter, preferred embodiments of the present technology will be described in detail with reference to the accompanying drawings. Note that, in the present specification and the drawings, components having substantially same functional configurations are denoted by same reference numerals, and repeated description thereof is omitted. The embodiments to be described below show representative embodiments of the present technology, and the scope of the present technology is not narrowly interpreted by these embodiments. In the present specification, even in a case where it is described that each of the image display device and the image display method according to the present technology exhibits a plurality of effects, each of the image display device and the image display method according to the present technology is only required to exhibit at least one effect. The effects described in the present specification are merely examples and are not limited, and other effects may also be provided.

Further, description will be given in the following order.
1. Introduction
2. Configuration of Image Display Device according to Example 1 of First Embodiment of Present Technology
3. Image Display Processing
4. Effects of Image Display Device and Image Display Method according to Example 1 of First Embodiment of Present Technology
5. Image Display Device according to Examples 2 to 5 of First Embodiment of Present Technology
6. Image Display Device according to Examples 1 to 5 of Second Embodiment of Present Technology
7. Image Display Device according to Examples 1 to 5 of Third Embodiment of Present Technology
8. Image Display Device according to Examples 1 to 5 of Fourth Embodiment of Present Technology
9. Modification Example of Present Technology 1. <Introduction>

By the way, in an image display device that displays an image by irradiating an eyeball of a user with image light, a technique of detecting a pupil diameter and adjusting a light amount of the image light according to a detection result as in a technique in the related art is known (for example, JP11-44862A).

However, in the technique in the related art, in a case where luminance of the image dynamically changes by switching the image at a frame rate of, for example, 60 frames per second (fps), it takes about 0.5 seconds for the pupil diameter to greatly change according to the change, and as a result, the user feels glare during the time. In particular, in an image display device that displays an image by retinal direct drawing, an eye of a user is always irradiated with image light, and as a result, the eye is exposed to luminance higher than necessary. In this case, there is a concern that a transitional burden is applied to the user's eye.

That is, a rate of change of the pupil diameter cannot correspond to the frame rate at which the image is switched. For example, in a case where the light amount is optimized in a small image, the light amount with which the eyeball of the user is irradiated rapidly increases at a moment at which switching to a large image is performed, and as a result, user feels glare.

For this reason, the present inventor has intensively studied the concern and has developed an image display device according to each of the embodiments of the present technology as an image display device capable of preventing a user from feeling glare as much as possible as will be described below.

2. <Configuration of Image Display Device According to Example 1 of First Embodiment of Present Technology>

Hereinafter, an image display device 10-1 according to Example 1 of a first embodiment of the present technology will be described with reference to the drawings.

As an example, as illustrated in FIG. 1, the image display device 10-1 is a device that directly draws an image on a retina of a user by retinal direct drawing using light, and is used for providing, to the user, for example, augmented reality (AR), virtual reality (VR), or the like. The image display device 10-1 has an image display function of a head mounted display (HMD) used by being worn on, for example, the head of the user. The HMD is also called eyewear, for example.

One image display device 10-1 may be provided for each of both eyes of the user, or may be provided for only one eye of the user.

The image display device 10-1 includes an irradiation system 100 and a light amount adjustment system 200-1. In the image display device 10-1, various controls and operations are executed by, for example, a CPU, an FPGA, or the like incorporated in the irradiation system 100 and/or the light amount adjustment system 200-1.

As an example, the irradiation system 100 and the light amount adjustment system 200-1 are integrally provided in the same support structure (for example, a spectacle frame). Note that a part of the irradiation system 100 and/or the light amount adjustment system 200-1 may be provided separately from the support structure. Hereinafter, the description will be given on a premise that a spectacle frame as an example of the support structure is mounted on the head of the user.

[Irradiation System]

Figure 2:
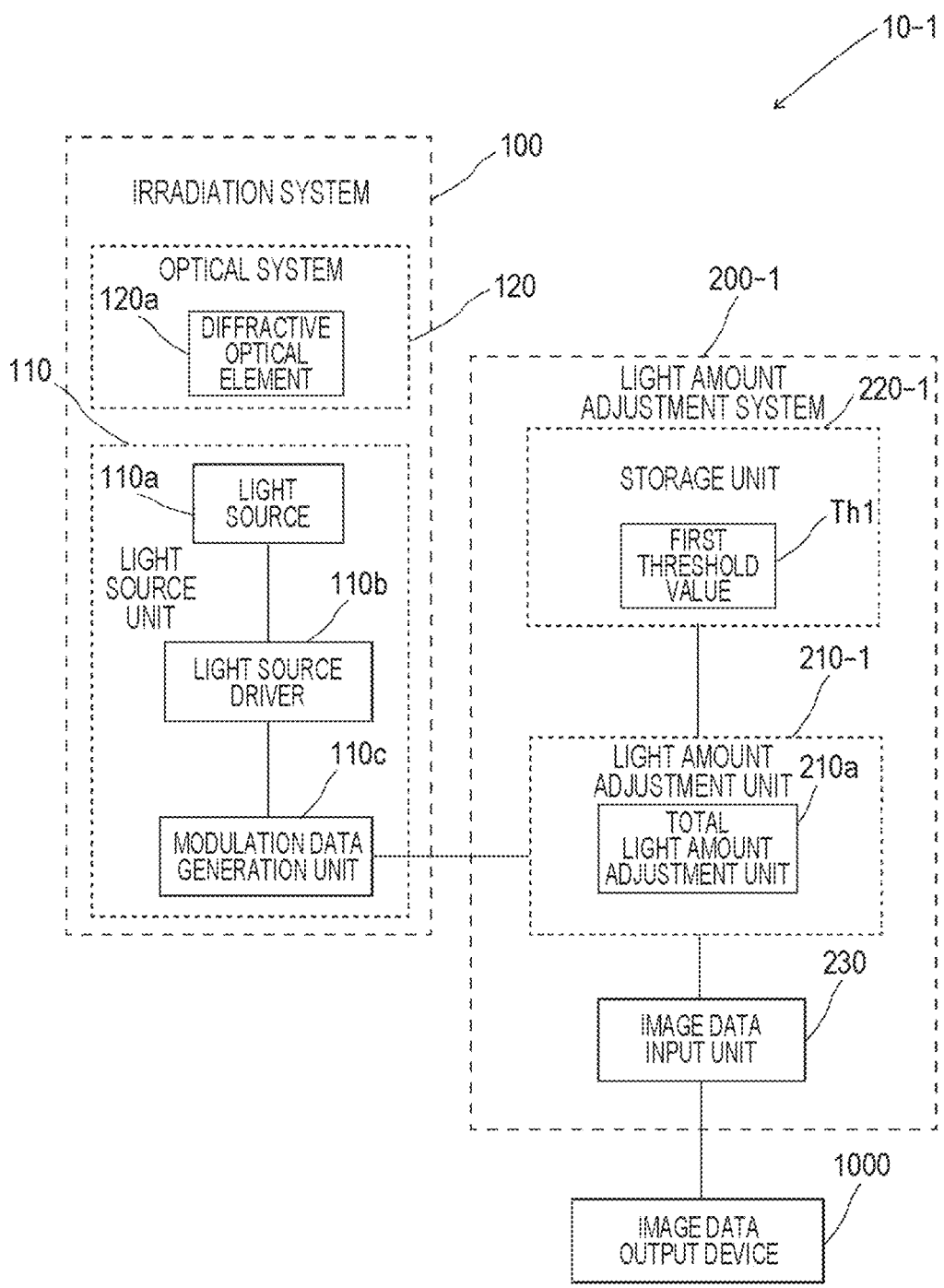
FIG. 2 is a block diagram illustrating functions of the image display device according to Example 1 of the first embodiment.

The irradiation system 100 irradiates an eyeball 1 of the user with image light IL with which an image is formed. As illustrated in FIG. 1 and FIG. 2, the irradiation system 100 includes a light source unit 110 and an optical system 120.

(Light Source Unit)

The light source unit 110 generates the image light IL. As illustrated in FIG. 2, the light source unit 110 includes a light source 110a, a light source driver 110b, and a modulation data generation unit 110c.

The light source 110a emits the image light IL. As an example, the light source 110a includes a light emitting element array in which a plurality of light emitting elements is arranged in a two-dimensional array. Each light emitting element emits light for each pixel, the light being included in the image light IL. As each light emitting element, a light emitting diode (LED), a laser (for example, a semiconductor laser such as an LD or a VCSEL), an organic EL element, or the like is used.

The modulation data generation unit 110c generates modulation data for modulation driving of each light emitting element of the light source 110a on the basis of a light amount setting value for each pixel that is input from a light amount adjustment unit 210-1 to be described later, and transmits the modulation data to the light source driver 110b. The modulation data is data including a drive signal to be applied to each light emitting element. The modulation data generation unit 110c is implemented by, for example, a CPU, an FPGA, or the like.

The light source driver 110b individually drives each light emitting element of the light source 110a using the modulation data from the modulation data generation unit 110c. The light source driver 110b is a circuit (driver circuit) including circuit elements such as transistors and capacitors.

Note that, here, the light source driver 110b and the modulation data generation unit 110c are components of the light source unit of the irradiation system. On the other hand, in the light source driver 110b and the modulation data generation unit 110c, at least the modulation data generation unit 110c may be a component of the light amount adjustment system.

Note that the light source unit may include a light emitting element and an optical deflector that deflects the light from the light emitting element instead of the light emitting element array. Therefore, it is possible to scan the eyeball with light using a small number (for example, one) of light emitting elements, and reduce a size of the light source unit. In this case, the modulation data generation unit may generate modulation data on the basis of the light amount setting value for each pixel that is input from the light amount adjustment unit 210-1 to be described later, and drive the light emitting element and the optical deflector on the basis of the modulation data. Examples of the optical deflector include, for example, a MEMS mirror, a galvanometer mirror, and the like.

(Optical System)

As illustrated in FIG. 1, the optical system 120 guides the image light IL generated by the light source unit 110 to the eyeball 1 of the user. The optical system 120 includes a diffractive optical element 120a (DOE) as an example of a diffraction unit. The diffractive optical element 120a diffracts the image light IL from the light source unit 110 and focuses the image light IL on the eyeball 1 (for example, near the pupil 3). Note that, for example, a hologram optical element (HOE) may be used instead of the diffractive optical element 120a.

More specifically, as an example, the diffractive optical element 120a is disposed at a position facing the eyeball 1. As an example, the image light IL from the light source unit 110 is incident (obliquely incident) on the diffractive optical element 120a from a direction inclined by an angle θ. As an example, the diffractive optical element 120a has a diffraction power distribution that condenses the obliquely-incident image light IL in the vicinity of the pupil 3 of the eyeball 1 in an in-plane direction. Here, a transmission-type diffractive optical element that diffracts and transmits incident light is used as the diffractive optical element 120a. On the other hand, a reflection-type diffractive optical element that reflects and diffracts incident light can also be used depending on a positional relationship with the light source unit 110.

The image light IL emitted from the light source unit 110 and diffracted by the diffractive optical element 120a passes through a cornea 2 of the eyeball 1, and is condensed in the vicinity of the pupil 3. Then, the image light IL passes through a crystalline lens 4 while diffusing, and is incident on a retina 5. Therefore, an image is drawn at a wide angle of view on the retina 5 by the image light IL. As a result, it is possible to display a display image by the image light IL in a visual field range of the user at a wide angle of view via the diffractive optical element 120a. The reference numeral 6 in FIG. 1 represents an iris of the eyeball 1.

[Light Amount Adjustment System]

The light amount adjustment system 200-1 adjusts a total light amount of the image light IL with which the image is formed to be equal to or lower than a first threshold value Th1 (refer to FIG. 5) regardless of a size of the image. As illustrated in FIG. 2, the light amount adjustment system 200-1 includes a light amount adjustment unit 210-1, a storage unit 220-1, and an image data input unit 230.

(Light Amount Adjustment Unit)

The light amount adjustment unit 210-1 is configured by, for example, a CPU, an FPGA, or the like. The light amount adjustment unit 210-1 includes a total light amount adjustment unit 210a.

The total light amount adjustment unit 210a adjusts a total light amount of the image light IL with which the image is formed by using the first threshold value Th1 stored in the storage unit 220-1 to be described later, and outputs the adjusted value (adjustment value) to the light source unit 110.

More specifically, the total light amount adjustment unit 210*a* acquires an image for each frame from image data which is transmitted from an image data output device 1000 such as a personal computer, a smartphone, a tablet, or a camera via the image data input unit 230, adjusts a light amount of each pixel (a signal value of a drive signal applied to the light emitting element, the signal value corresponding to the pixel) such that a sum of the light amounts of all the pixels of the image becomes a predetermined value equal to or lower than the first threshold value Th1, and outputs an adjustment value (a light amount adjustment value for each pixel) to the modulation data generation unit 110*c*.

In a supplementary explanation, as an example, in a case of adjusting the total light amount of the image light IL between frames, the total light amount adjustment unit 210*a* uniformly increases and decreases the light amounts of all the pixels such that reproducibility of the image is not impaired. For example, in a case where the total light amount of the image light IL is increased between frames, the total light amount adjustment unit 210*a* uniformly increases the light amounts of all the pixels. For example, in a case where the total light amount of the image light IL is decreased between frames, the total light amount adjustment unit 210*a* uniformly decreases the light amounts of all the pixels.

Note that it is not always necessary to adjust the total light amount of the image in all frames. For example, after the total light amount is adjusted to be equal to or lower than the first threshold value Th1 in a first frame, the total light amount may be adjusted to be equal to or lower than the first threshold value Th1 only in a case where switching from a frame of a small image to a frame of a large image is performed. For example, during a period for which the pupil diameter greatly changes, the total light amount may be adjusted to be equal to or lower than the first threshold value Th1 at least every other frame.

(Storage Unit)

The storage unit 220-1 stores the first threshold value Th1. The storage unit 220-1 is realized by, for example, a ROM, a RAM, a flash memory, a hard disk, or the like.

As an example, the first threshold value Th1 is a lower limit value of the total light amount at which a person feels glare. The first threshold value Th1 is based on a standardized sensitivity (standard sensitivity) of a human to light.

The first threshold value Th1 may be objectively set on the basis of, for example, a spatial glare index.

The first threshold value Th1 may be set by performing a sensitivity test regarding total light amounts of the image light IL on a plurality of subjects and detecting a total light amount (boundary value of the total light amount) at a boundary between the total light amount at which the subjects feel glare and the total light amount at which the subjects do not feel glare. For example, the first threshold value Th1 may be set by gradually increasing the total light amount of the image light IL from a relatively low value, and detecting an average value, a median value, or a mode value of the total light amounts at which the plurality of subjects starts to feel glare. For example, the first threshold value Th1 may be set by gradually decreasing the total light amount of the image light IL from a relatively high value, and detecting an average value, a median value, or a mode value of the total light amounts at which the plurality of subjects starts not to feel glare.

The sensitivity test as described above may be performed as needed, and the first threshold value Th1 may be updated in the storage unit 220-1 every time the boundary value of the total light amount is obtained.

(Image Data Input Unit)

The image data input unit 230 receives image data (a still image or a moving image) from, for example, an external device (image data output device) such as a personal computer, and transmits the image data to the light amount adjustment unit 210-1.

3. <Image Display Processing>

Figure 3:
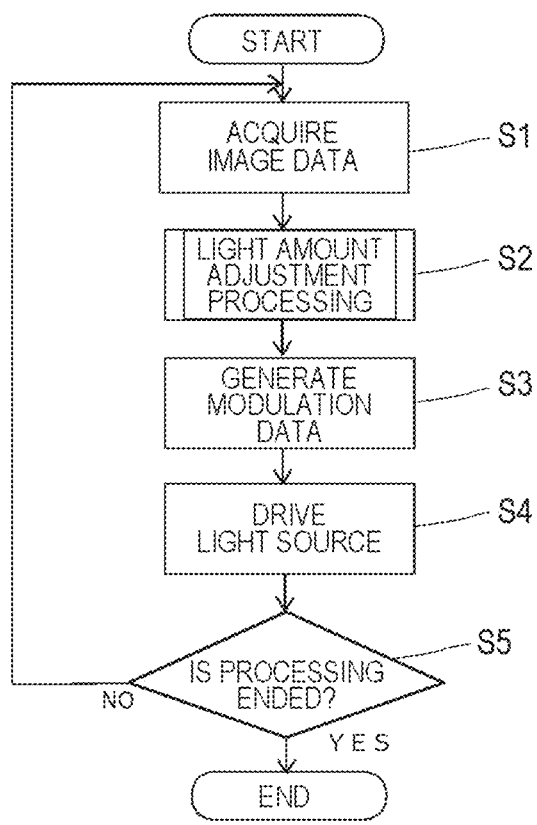
FIG. 3 is a flowchart for explaining image display processing.

Hereinafter, image display processing (an example of an image display method according to the present technology) performed by using the image display device 10-1 according to Example 1 will be described with reference to a flowchart of FIG. 3.

In first step S1, the light amount adjustment unit 210-1 acquires the image data from an image data output device 1000 via the image data input unit 230.

In next step S2, the light amount adjustment unit 210-1 performs light amount adjustment processing. The light amount adjustment processing will be described in detail later.

In next step S3, the modulation data generation unit 110*c* generates modulation data. Specifically, the modulation data generation unit 110*c* generates modulation data including a drive signal for driving each light emitting element of the light source 110*a* on the basis of the light amount setting value for each pixel that is output from the light amount adjustment unit 210-1.

In next step S4, the light source driver 110*b* drives the light source 110*a*. Specifically, the light source driver 110*b* drives each light emitting element of the light source 110*a* by using the modulation data transmitted from the modulation data generation unit 110*c*.

In final step S5, for example, the CPU or the like determines whether or not to end the processing. For example, in a case where the power of the image display device 10-1 is turned off, the determination in this step is YES. In a case where the determination in step S5 is YES, the flow is ended. In a case where the determination in step S5 is NO, the flow returns to step S1.

(Light Amount Adjustment Processing 1)

Figure 4:
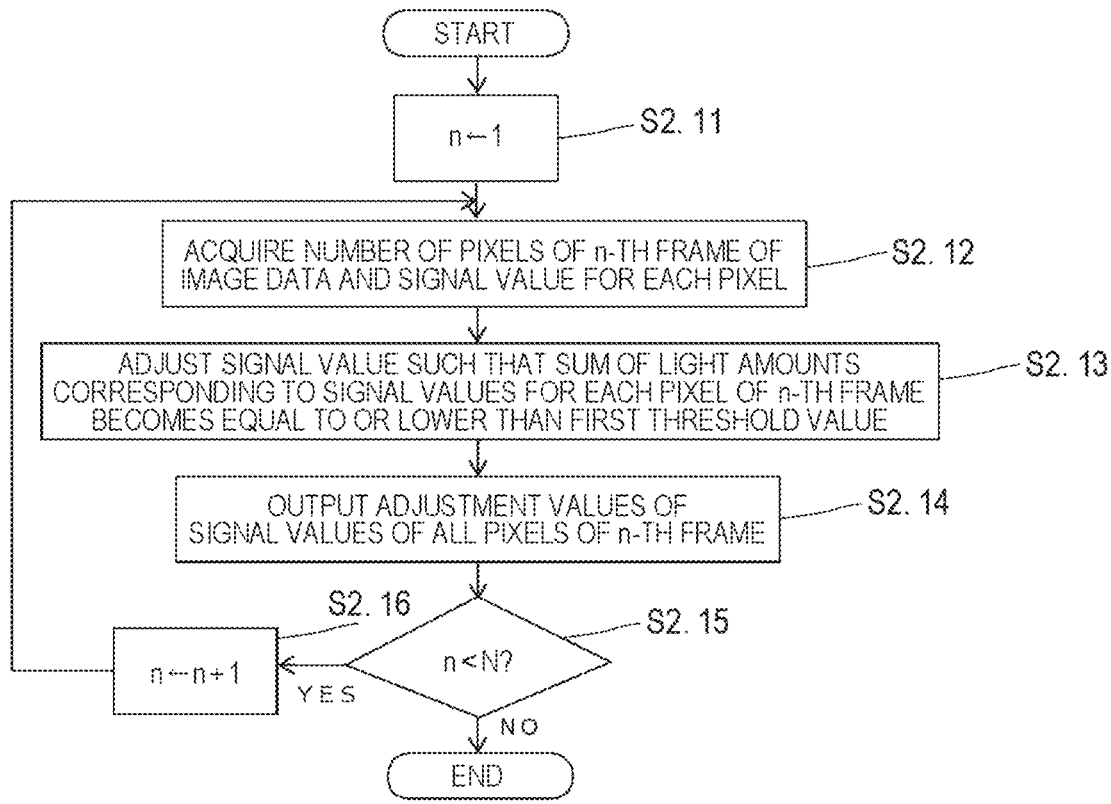
FIG. 4 is a flowchart for explaining light amount adjustment processing 1.

Hereinafter, light amount adjustment processing 1 as an example of the light amount adjustment processing in step S2 will be described with reference to a flowchart of FIG. 4. The light amount adjustment processing 1 is performed by the light amount adjustment system 200-1.

In first step S2.11, the light amount adjustment unit 210-1 sets n to 1.

In next step S2.12, the light amount adjustment unit 210-1 acquires the number of pixels of an n-th frame of the image data and the signal value for each pixel.

Figure 5:
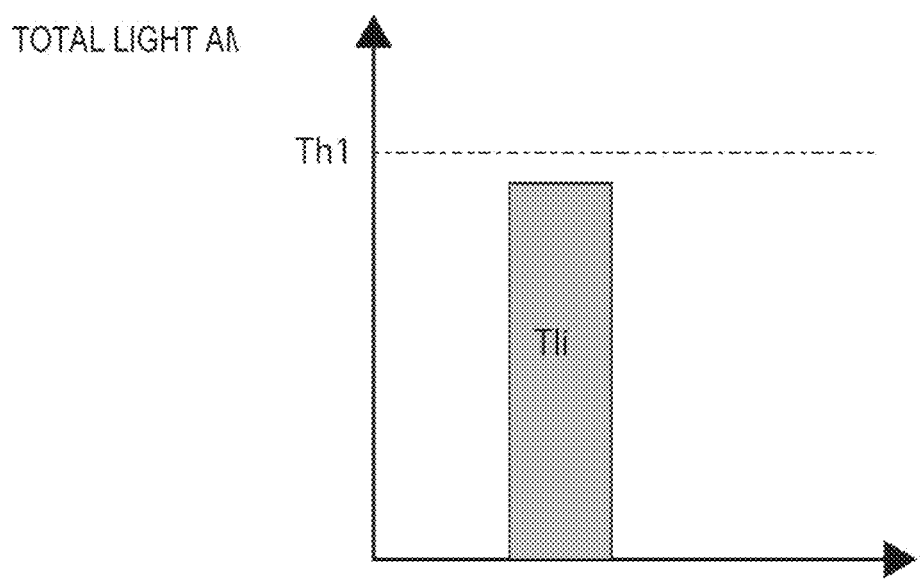
FIG. 5 is a diagram for explaining light amount adjustment processing 1.
Figure 6:
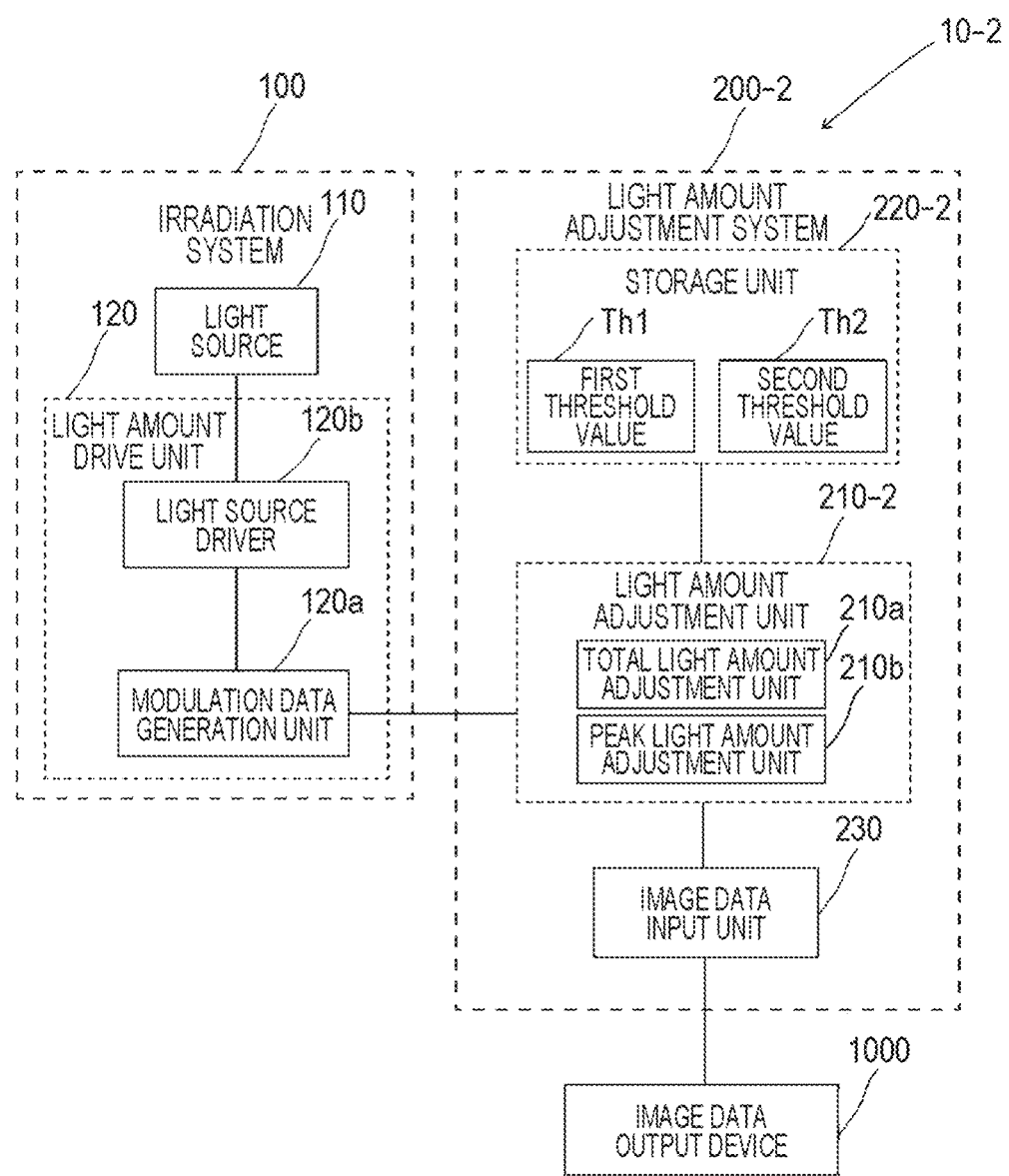
FIG. 6 is a block diagram illustrating functions of the image display device according to Example 2 of the first embodiment.

In next step S2.13, as illustrated in FIG. 5, the light amount adjustment unit 210-1 adjusts the signal value such that the total light amount Tli becomes equal to or lower than the first threshold value Th1 (preferably, the total light amount Tli becomes a target value equal to or lower than the first threshold value Th1), the total light amount Tli being a sum of the light amounts corresponding to the signal values for each pixel of the n-th frame.

In next step S2.14, the light amount adjustment unit 210-1 outputs the adjustment values of the signal values of all the pixels of the n-th frame.

In next step S2.15, the light amount adjustment unit 210-1 determines whether or not n<N (total number of frames of image data) is satisfied. In a case where the determination in this step is YES, the flow proceeds to step S2.16, and in a case where the determination in this step is NO, the flow is ended.

In step S2.16, the light amount adjustment unit 210-1 increments n. In a case where step S2.16 is executed, the flow returns to step S2.12.

As described above, in the image display device 10-1, the total light amount Tli is adjusted to be equal to or lower than the first threshold value Th1, the total light amount Tli being a sum of the light amounts corresponding to the signal values for each pixel of each frame of the image data. Therefore, even in a case where a size of the image (a size of the angle of view of the image light IL incident on the eyeball 1) changes between frames (for example, even in a case where switching from a large image to a small image is performed), the light amount is prevented from being excessive as a whole in an image of a subsequent frame in addition to an image of a previous frame, and thus the user is prevented from feeling glare as much as possible.

4. <Effects of Image Display Device and Image Display Method According to Example 1 of First Embodiment of Present Technology>

The image display device 10-1 according to Example 1 includes the irradiation system 100 that irradiates the eyeball 1 of the user with image light IL with which an image is formed, and the light amount adjustment system 200-1 that adjusts the total light amount of the image light IL to be equal to or lower than the first threshold value Th1 regardless of the size of the image.

In this case, the total light amount of the image light IL is adjusted to be equal to or lower than the first threshold value Th1 regardless of the size of the image, and thus it is possible to prevent the user from feeling glare as much as possible.

As a result, according to the image display device 10-1, it is possible to provide the image display device capable of preventing the user from feeling glare as much as possible.

In particular, in retinal direct drawing in which an amount of light which is incident on the pupil cannot be controlled by a change in the pupil diameter, the image display device 10-1 can irradiate the retina of the user with the light amount that is not excessive, and can prevent the user from feeling glare.

The first threshold value Th1 is a lower limit value of the total light amount at which a person feels glare. Therefore, the image display device 10-1 can reliably prevent the user from feeling glare.

The irradiation system 100 includes the light source unit 110 that emits the image light IL and the diffractive optical element 120a (diffraction unit) that diffracts the image light IL from the light source unit 110 toward the eyeball 1. Therefore, it is possible to irradiate the eyeball 1 with the image light IL from the light source unit 110 at a wide angle of view.

The image display method using the image display device 10-1 according to Example 1 is an image display method that irradiates the eyeball 1 of the user with image light IL with which an image is formed, and includes a light amount adjustment step of adjusting the total light amount of the image light IL to be equal to or lower than the first threshold value Th1 regardless of the size of the image. In this case, the total light amount of the image light IL is adjusted to be equal to or lower than the first threshold value Th1 regardless of the size of the image, and thus it is possible to prevent the user from feeling glare as much as possible.

As a result, according to the image display method, it is possible to prevent the user from feeling glare as much as possible.

5. <Image Display Device According to Examples 2 to 5 of First Embodiment of Present Technology>

Hereinafter, image display devices 10-2 to 10-5 according to Examples 2 to 5 of the first embodiment of the present technology will be described.

Image Display Device According to Example 2 of First Embodiment of Present Technology By the way, even in a state where the total light amount of the image light IL with which the image is formed is adjusted to be equal to or lower than the first threshold value Th1 regardless of the size of the image as in the image display device 10-1 according to Example 1, for example, in a case where the light amount of the light which forms a part of the image (a specific image region including at least one pixel) and is included in the image light IL becomes too high (for example, in a case where there is a locally high luminance region) at a moment at which the frame is switched, there is a possibility that the user feels glare. For example, in a case where switching from a frame of a large image (an image in which the angle of view of the image light IL increases) to a frame of a small image (an image in which the angle of view of the image light IL decreases) is performed, an area of the image decreases. As a result, the image becomes locally too bright, and there is a possibility that visibility is impaired.

Therefore, in the image display device 10-2 according to Example 2, a peak light amount is adjusted in accordance with the total light amount of the image light IL. The peak light amount means a light amount of light, which is included in the image light IL with which the image is formed, forms at least one pixel of the image, and has highest luminance.

The light amount adjustment system 200-2 of the image display device 10-2 adjusts the total light amount of the image light IL with which the image is formed to be equal to or lower than the first threshold value Th1 regardless of the size of the image, and adjusts the peak light amount of the image light IL with which the image is formed to be equal to or lower than a second threshold value Th2 regardless of the size of the image.

In the image display device 10-2, the light amount adjustment unit 210-1 of the light amount adjustment system 200-2 includes the total light amount adjustment unit 210a and a peak light amount adjustment unit 210b.

The peak light amount adjustment unit 210b acquires a maximum value of the signal values of all the pixels of the image of each frame of the image data, adjusts the maximum value such that the light amount according to the maximum value becomes a predetermined value equal to or lower than the second threshold value Th2, and transmits the adjustment value to the total light amount adjustment unit 210a. The total light amount adjustment unit 210a adjusts the signal value such that the maximum value of the signal values of the image of the frame matches with the adjustment value transmitted from the peak light amount adjustment unit 210b and such that the sum of the light amounts corresponding to the signal values of the pixels of the image becomes a predetermined value equal to or lower than the first threshold value Th1, and transmits the adjustment value to the modulation data generation unit 110c.

Here, in a case where only the peak light amount is lowered, contrast is lost, and an image that looks like white spots is obtained. Therefore, the total light amount adjustment unit 210a increases the overall luminance by once decreasing an overall contrast ratio, and then, making a black portion conspicuous by γ correction or the like. Thus, the image light IL having good visibility without discomfort is generated (the same applies in the following description). Further, in a case where visibility is poor in an image with a large angle of view, conversely, the total light amount adjustment unit 210a increases a contrast ratio by increasing the peak light amount to an upper limit. Thus, visibility of the image is improved (the same applies in the following description).

The storage unit 220-2 of the image display device 10-2 stores the first threshold value Th1 and the second threshold value Th2.

As an example, the second threshold value Th2 is a lower limit value of the peak light amount at which a person feels glare. The second threshold value Th2 is based on a standardized sensitivity (standard sensitivity) of a human to light.

The second threshold value Th2 may be objectively set on the basis of, for example, a spatial glare index.

The second threshold value Th2 may be set by performing a sensitivity test regarding peak light amounts of the image light IL on a plurality of subjects and detecting a peak light amount (boundary value of the peak light amount) at a boundary between the peak light amount at which the subjects feel glare and the peak light amount at which the subjects do not feel glare. For example, the second threshold value Th2 may be set by gradually increasing the peak light amount of the image light IL from a relatively low value, and detecting an average value, a median value, or a mode value of the peak light amounts at which the plurality of subjects starts to feel glare. For example, the second threshold value Th2 may be set by gradually decreasing the peak light amount of the image light IL from a relatively high value, and detecting an average value, a median value, or a mode value of the peak light amounts at which the plurality of subjects starts not to feel glare.

The sensitivity test as described above may be periodically performed, and the second threshold value Th2 may be updated in the storage unit 220-2 every time the boundary value of the peak light amount is obtained.

By using the image display device 10-2 according to Example 2, it is possible to perform image display processing similar to the image display processing (refer to FIG. 3) performed using the image display device 10-1 according to Example 1. In the image display processing, light amount adjustment processing 2 as an example of the light amount adjustment processing (step S2 in FIG. 3) is performed.

(Light Amount Adjustment Processing 2)

Figure 7:
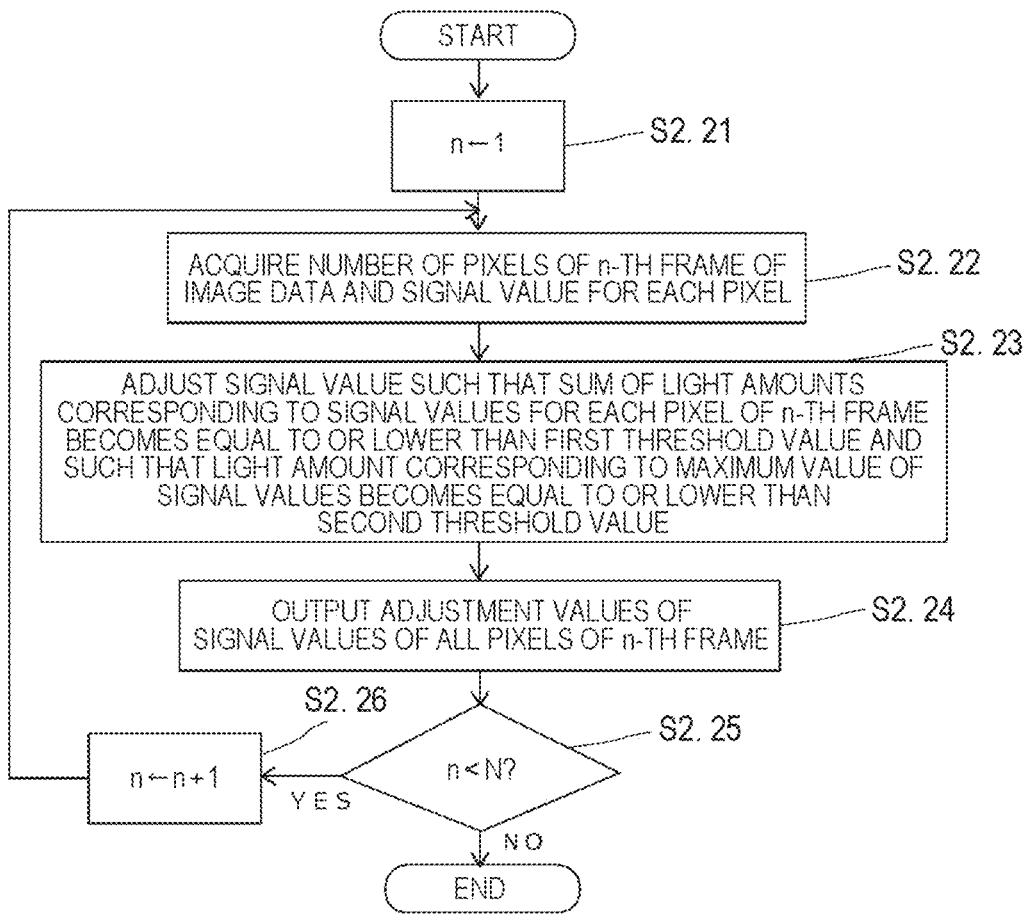
FIG. 7 is a flowchart for explaining light amount adjustment processing 2.

Hereinafter, the light amount adjustment processing 2 will be described with reference to a flowchart of FIG. 7. The light amount adjustment processing 2 is performed by the light amount adjustment system 200-2.

In first step S2.21, the light amount adjustment unit 210-2 sets n to 1.

In next step S2.22, the light amount adjustment unit 210-2 acquires the number of pixels of an n-th frame of the image data and the signal value for each pixel.

Figure 8A:
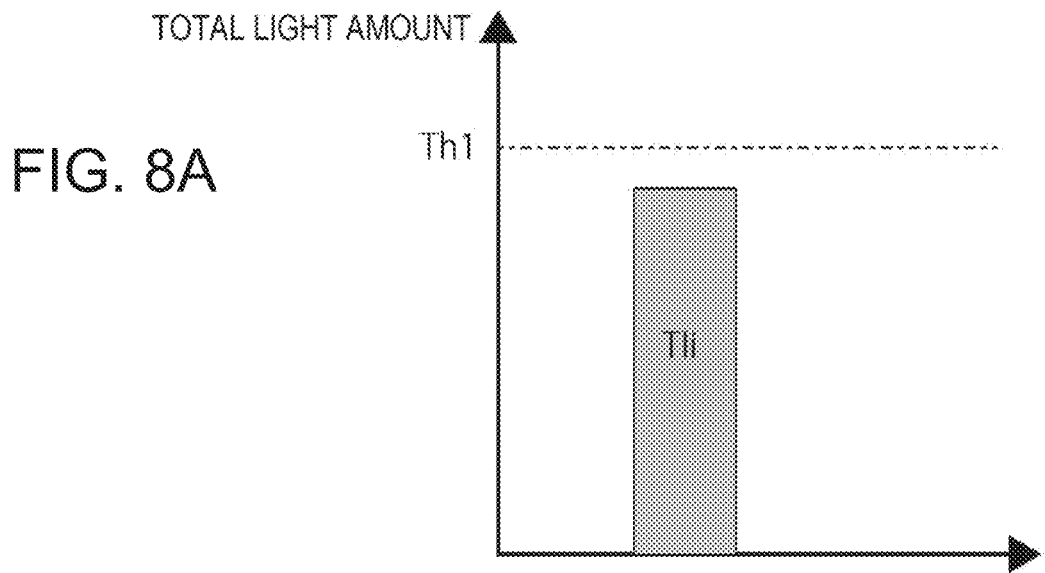
FIG. 8A and FIG. 8B are diagrams for explaining light amount adjustment processing 2.
Figure 8B:
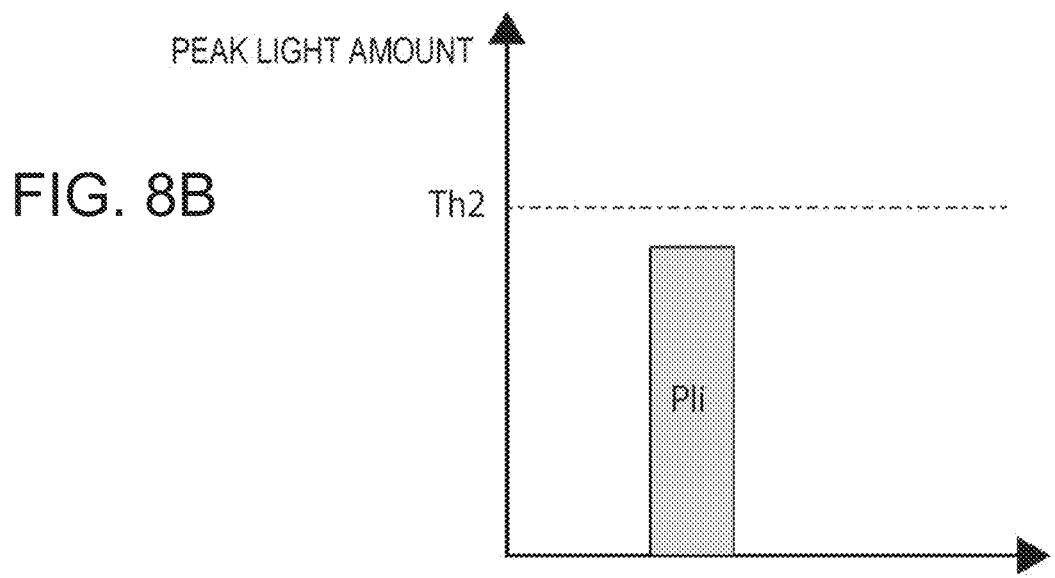

In next step S2.23, as illustrated in FIG. 8A and FIG. 8B, the light amount adjustment unit 210-2 adjusts the signal value such that the total light amount Tli becomes equal to or lower than the first threshold value Th1 (preferably, the total light amount Tli becomes a target value equal to or lower than the first threshold value Th1) and such that the peak light amount Pli becomes equal to or lower than the second threshold value Th2 (preferably, the peak light amount Pli becomes a target value equal to or lower than the second threshold value Th2), the total light amount Tli being a sum of the light amounts corresponding to the signal values for each pixel of the n-th frame, and the peak light amount Pli being a light amount corresponding to the maximum value of the signal values.

In next step S2.24, the light amount adjustment unit 210-2 outputs the adjustment values of the signal values of all the pixels of the n-th frame.

In next step S2.25, the light amount adjustment unit 210-2 determines whether or not n<N (total number of frames of image data) is satisfied. In a case where the determination in this step is YES, the flow proceeds to step S2.26, and in a case where the determination in this step is NO, the flow is ended.

In step S2.26, the light amount adjustment unit 210-2 increments n. In a case where step S2.26 is executed, the flow returns to step S2.22.

As described above, in the image display device 10-2, the total light amount Tli is adjusted to be equal to or lower than the first threshold value Th1, and the peak light amount Pli is adjusted to be equal to or lower than the second threshold value Th2, the total light amount Tli being a sum of the light amounts corresponding to the signal values for each pixel of each frame of the image data, and the peak light amount Pli being a light amount corresponding to the maximum value of the signal values. Therefore, even in a case where a size of the image (a size of the angle of view of the image light IL incident on the eyeball 1) changes between frames (for example, even in a case where switching from a large image to a small image is performed), the light amount is prevented from being excessive both as a whole and as a local part in an image of a subsequent frame in addition to an image of a previous frame, and thus the user is more reliably prevented from feeling glare as much as possible.

Image Display Device According to Example 3 of First Embodiment of Present Technology By the way, even in a case where the total light amount of the image light IL with which the image is formed is adjusted to be equal to or lower than the first threshold value Th1 and the peak light amount of the image light IL is adjusted to be equal to or lower than the second threshold value Th2 regardless of the size of the image as in the image display device 10-2 according to Example 2, the total light amount may be insufficient depending on the frame, and as a result, visibility may be deteriorated. For example, in a state where the total light amount is appropriately set for a small image, in a case where switching is performed from a frame of the small image to a frame of a large image, the total light amount is constant, and an area is enlarged. Thus, the light amount is insufficient, and as a result, it may difficult to visually recognize the image.

Therefore, in the image display device 10-3 according to Example 3, a lower limit value of the total light amount is set.

In the image display device 10-3 according to Example 3, as illustrated in FIG. 11, the light amount adjustment system 200-3 adjusts the total light amount of the image light IL with which the image is formed to be equal to or lower than the first threshold value Th1 and equal to or higher than a third threshold value Th3 regardless of the size of the image, and adjusts the peak light amount of the image light IL with which the image is formed to be equal to or lower than a second threshold value Th2 regardless of the size of the image.

Figure 9:
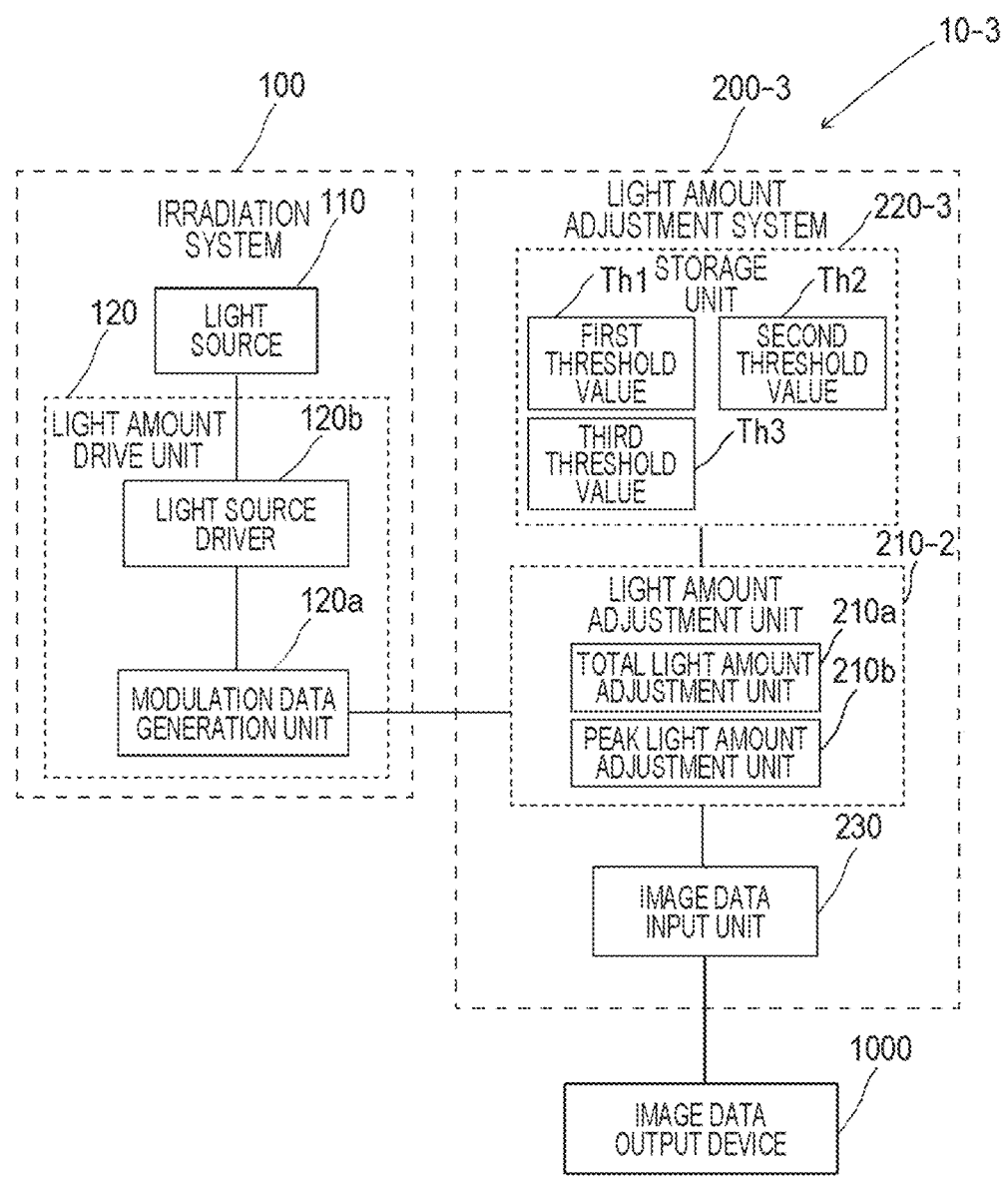
FIG. 9 is a block diagram illustrating functions of the image display device according to Example 3 of the first embodiment.

As illustrated in FIG. 9, the light amount adjustment unit 210-2 of the light amount adjustment system 200-3 includes the total light amount adjustment unit 210a and the peak light amount adjustment unit 210b.

The peak light amount adjustment unit 210b acquires a maximum value of the signal values of all the pixels of the image of each frame of the image data, adjusts the maximum value such that the light amount according to the maximum value becomes a predetermined value equal to or lower than the second threshold value Th2, and transmits the adjustment value to the total light amount adjustment unit 210a. The total light amount adjustment unit 210a adjusts the signal value such that the maximum value of the signal values of the image of the frame matches with the adjustment value transmitted from the peak light amount adjustment unit 210b and such that the sum of the light amounts corresponding to the signal values of the pixels of the image becomes a predetermined value equal to or lower than the first threshold value Th1 and equal to or higher than the third threshold value Th3, and transmits the adjustment value to the modulation data generation unit 110c.

The storage unit 220-3 of the light amount adjustment system 200-3 stores the first threshold value Th1, the second threshold value Th2, and the third threshold value Th3.

As an example, the third threshold value Th3 is a lower limit value of the total light amount at which a person does not feel poor visibility (a person feels good visibility). The third threshold value Th3 is based on a standardized sensitivity (standard sensitivity) of a human to light.

From a viewpoint of ensuring visibility, the third threshold value Th3 is preferably higher than at least luminance of ambient light. Therefore, for example, the luminance of the ambient light may be acquired using an illuminance sensor, and the third threshold value Th3 may be set to be higher than at least the luminance.

The third threshold value Th3 may be set by performing a sensitivity test regarding total light amounts of the image light IL on a plurality of subjects and detecting a total light amount (boundary value of the total light amount) at a boundary between the total light amount at which the subjects feel good visibility and the total light amount at which the subjects feel poor visibility. For example, the third threshold value Th3 may be set by gradually increasing the total light amount of the image light IL from a relatively low value, and detecting an average value, a median value, or a mode value of the total light amounts at which the plurality of subjects starts to feel good visibility. For example, the third threshold value Th3 may be set by gradually decreasing the total light amount of the image light IL from a relatively high value, and detecting an average value, a median value, or a mode value of the total light amounts at which the plurality of subjects starts to feel poor visibility.

For example, the sensitivity test as described above may be periodically performed, and the third threshold value Th3 may be updated in the storage unit 220-3 every time the boundary value of the total light amount is obtained.

By using the image display device 10-3 according to Example 3, it is possible to perform image display processing similar to the image display processing (refer to FIG. 3) performed using the image display device 10-1 according to Example 1. In the image display processing, light amount adjustment processing 3 as an example of the light amount adjustment processing (step S2 in FIG. 3) is performed.

(Light Amount Adjustment Processing 3)

Figure 10:
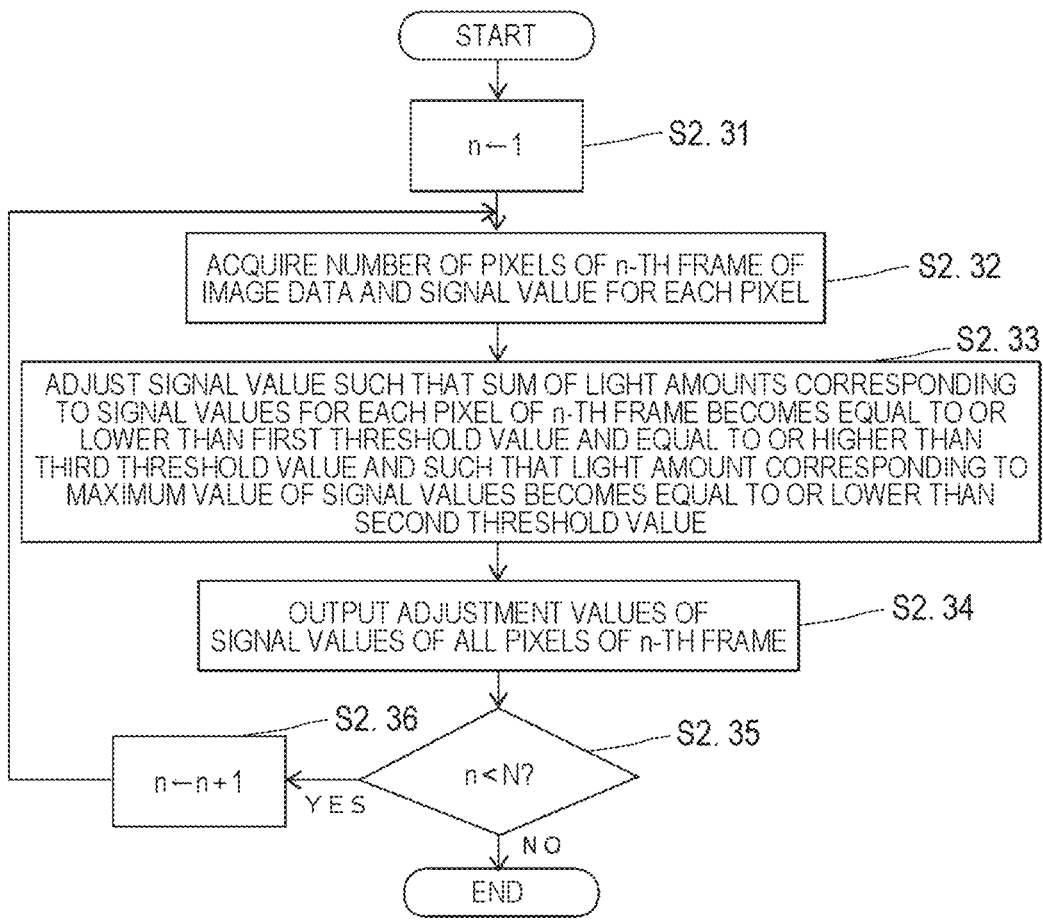
FIG. 10 is a flowchart for explaining light amount adjustment processing 3.

Hereinafter, the light amount adjustment processing 3 will be described with reference to a flowchart of FIG. 10. The light amount adjustment processing 3 is performed by the light amount adjustment system 200-3.

In first step S2.31, the light amount adjustment unit 210-2 sets n to 1.

In next step S2.32, the light amount adjustment unit 210-2 acquires the number of pixels of an n-th frame of the image data and the signal value for each pixel.

Figure 11A:
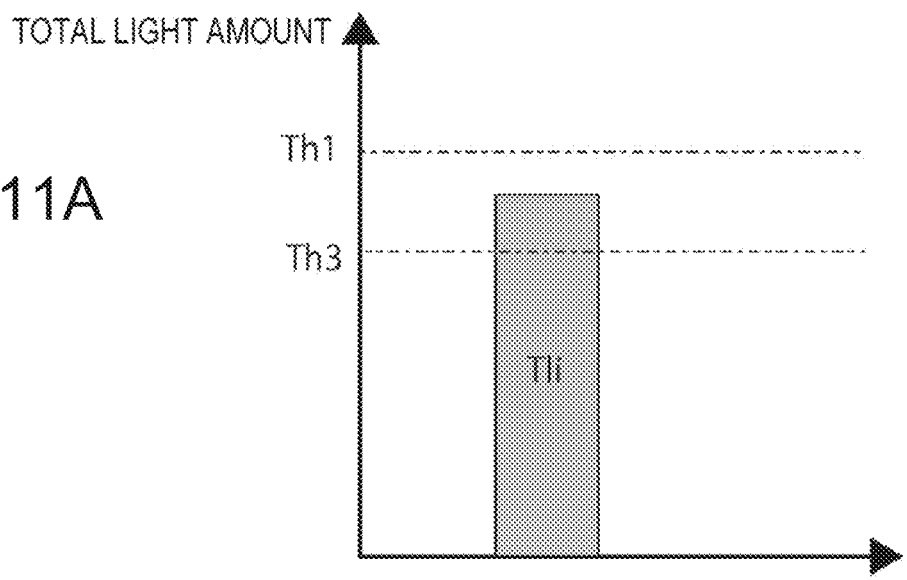
FIG. 11A and FIG. 11B are diagrams for explaining light amount adjustment processing 3.
Figure 11B:
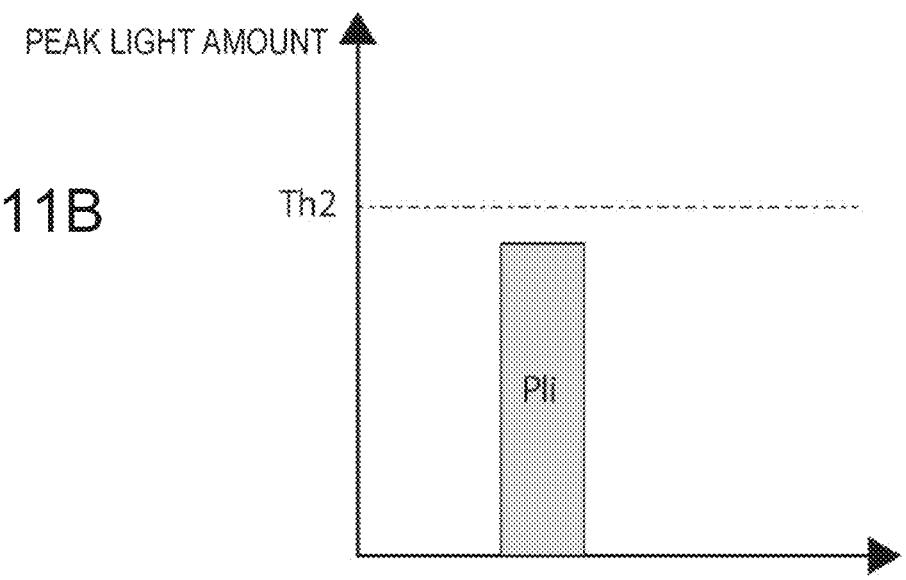

In next step S2.33, as illustrated in FIG. 11A and FIG. 11B, the light amount adjustment unit 210-2 adjusts the signal value such that the total light amount Tli becomes equal to or lower than the first threshold value Th1 and equal to or higher than the third threshold value Th3 (preferably, the total light amount Tli becomes a target value equal to or lower than the first threshold value Th1 and equal to or higher than the third threshold value Th3) and such that the peak light amount Pli becomes equal to or lower than the second threshold value Th2 (preferably, the peak light amount Pli becomes a target value equal to or lower than the second threshold value Th2), the total light amount Tli being a sum of the light amounts corresponding to the signal values for each pixel of the n-th frame, and the peak light amount Pli being a light amount corresponding to the maximum value of the signal values.

In next step S2.34, the light amount adjustment unit 210-2 outputs the adjustment values of the signal values of all the pixels of the n-th frame.

In next step S2.35, the light amount adjustment unit 210-2 determines whether or not n<N (total number of frames of image data) is satisfied. In a case where the determination in this step is YES, the flow proceeds to step S2.36, and in a case where the determination in this step is NO, the flow is ended.

In step S2.36, the light amount adjustment unit 210-2 increments n. In a case where step S2.36 is executed, the flow returns to step S2.32.

As described above, in the image display device 10-3, the total light amount Tli is adjusted to be equal to or lower than the first threshold value Th1 and equal to or higher than the third threshold value Th3, and the peak light amount Pli is adjusted to be equal to or lower than the second threshold value Th2, the total light amount Tli being a sum of the light amounts corresponding to the signal values for each pixel of each frame of the image data, and the peak light amount Pli being a light amount corresponding to the maximum value of the signal values. Therefore, even in a case where a size of the image (a size of the angle of view of the image light IL incident on the eyeball 1) changes between frames, in an image of a subsequent frame in addition to an image of a previous frame, the light amount is prevented from being excessive both as a whole and as a local part, and the light amount is prevented from being insufficient as a whole. Thus, the user is more reliably prevented from feeling glare, and the user is prevented from feeling poor visibility due to darkness as much as possible.

Image Display Device According to Example 4 of First Embodiment of Present Technology By the way, even in a case where the total light amount of the image light IL with which the image is formed is adjusted to be equal to or lower than the first threshold value Th1 and equal to or lower than the third threshold value Th3 and the peak light amount of the image light IL is adjusted to be equal to or lower than the second threshold value Th2 regardless of the size of the image as in the image display device 10-3 according to Example 3, depending on the frame, the peak light amount may be insufficient and a contrast ratio may be decreased. As a result, visibility may be deteriorated.

Therefore, in the image display device 10-4 according to Example 4, a lower limit value of the peak light amount is set.

Specifically, in the image display device 10-4 according to Example 4, the light amount adjustment system 200-4 adjusts the total light amount of the image light TL with which the image is formed to be equal to or lower than the first threshold value Th1 and equal to or higher than the third threshold value Th3 regardless of the size of the image, and adjusts the peak light amount of the image light IL with which the image is formed to be equal to or lower than the second threshold value Th2 and equal to or higher than a fourth threshold value Th4 regardless of the size of the image.

Figure 12:
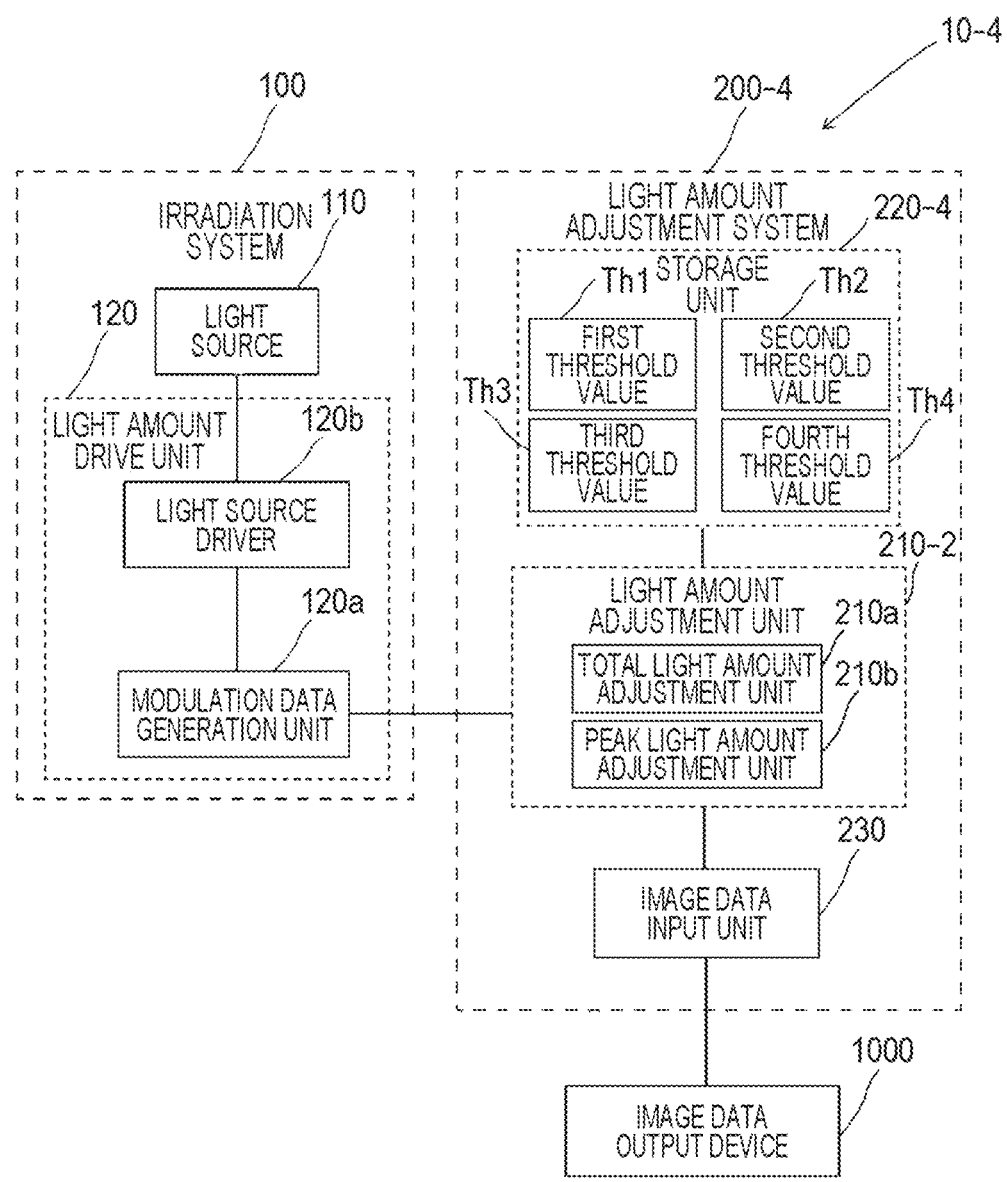
FIG. 12 is a block diagram illustrating functions of the image display device according to Example 4 of the first embodiment.

As illustrated in FIG. 12, the light amount adjustment unit 210-2 of the light amount adjustment system 200-4 includes the total light amount adjustment unit 210a and the peak light amount adjustment unit 210b.

The peak light amount adjustment unit 210b acquires a maximum value of the signal values of all the pixels of the image of each frame of the image data, adjusts the maximum value such that the light amount according to the maximum value becomes a predetermined value equal to or lower than the second threshold value Th2 and equal to or higher than the fourth threshold value Th4, and transmits the adjustment value to the total light amount adjustment unit 210a. The total light amount adjustment unit 210a adjusts the signal value such that the maximum value of the signal values of the image of the frame matches with the adjustment value transmitted from the peak light amount adjustment unit 210b and such that the sum of the light amounts corresponding to the signal values of the pixels of the image becomes a predetermined value equal to or lower than the first threshold value Th1 and equal to or higher than the third threshold value Th3, and transmits the adjustment value to the modulation data generation unit 110c.

The storage unit 220-4 of the light amount adjustment system 200-4 stores the first threshold value Th1, the second threshold value Th2, the third threshold value Th3, and the fourth threshold value Th4.

As an example, the fourth threshold value Th4 is a lower limit value of the peak light amount at which a person does not feel poor visibility (a person feels good visibility). The fourth threshold value Th4 is based on a standardized sensitivity (standard sensitivity) of a human to light.

From a viewpoint of ensuring visibility, the fourth threshold value Th4 is preferably higher than at least luminance of ambient light. Therefore, for example, the luminance of the ambient light may be acquired using an illuminance sensor, and the fourth threshold value Th4 may be set to be higher than at least the luminance.

The fourth threshold value Th4 may be set by performing a sensitivity test regarding peak light amounts of the image light IL on a plurality of subjects and detecting a peak light amount (boundary value of the peak light amount) at a boundary between the peak light amount at which the subjects feel good visibility and the peak light amount at which the subjects feel poor visibility. For example, the fourth threshold value Th4 may be set by gradually increasing the peak light amount of the image light IL from a relatively low value, and detecting an average value, a median value, or a mode value of the peak light amounts at which the plurality of subjects starts to feel good visibility.

For example, the fourth threshold value Th4 may be set by gradually decreasing the peak light amount of the image light IL from a relatively high value, and detecting an average value, a median value, or a mode value of the peak light amounts at which the plurality of subjects starts to feel poor visibility.

For example, the sensitivity test as described above may be periodically performed, and the fourth threshold value Th4 may be updated in the storage unit 220-4 every time the boundary value of the peak light amount is obtained.

By using the image display device 10-4 according to Example 4, it is possible to perform image display processing similar to the image display processing (refer to FIG. 3) performed using the image display device 10-1 according to Example 1. In the image display processing, light amount adjustment processing 4 as an example of the light amount adjustment processing (step S2 in FIG. 3) is performed.

(Light Amount Adjustment Processing 4)

Figure 13:
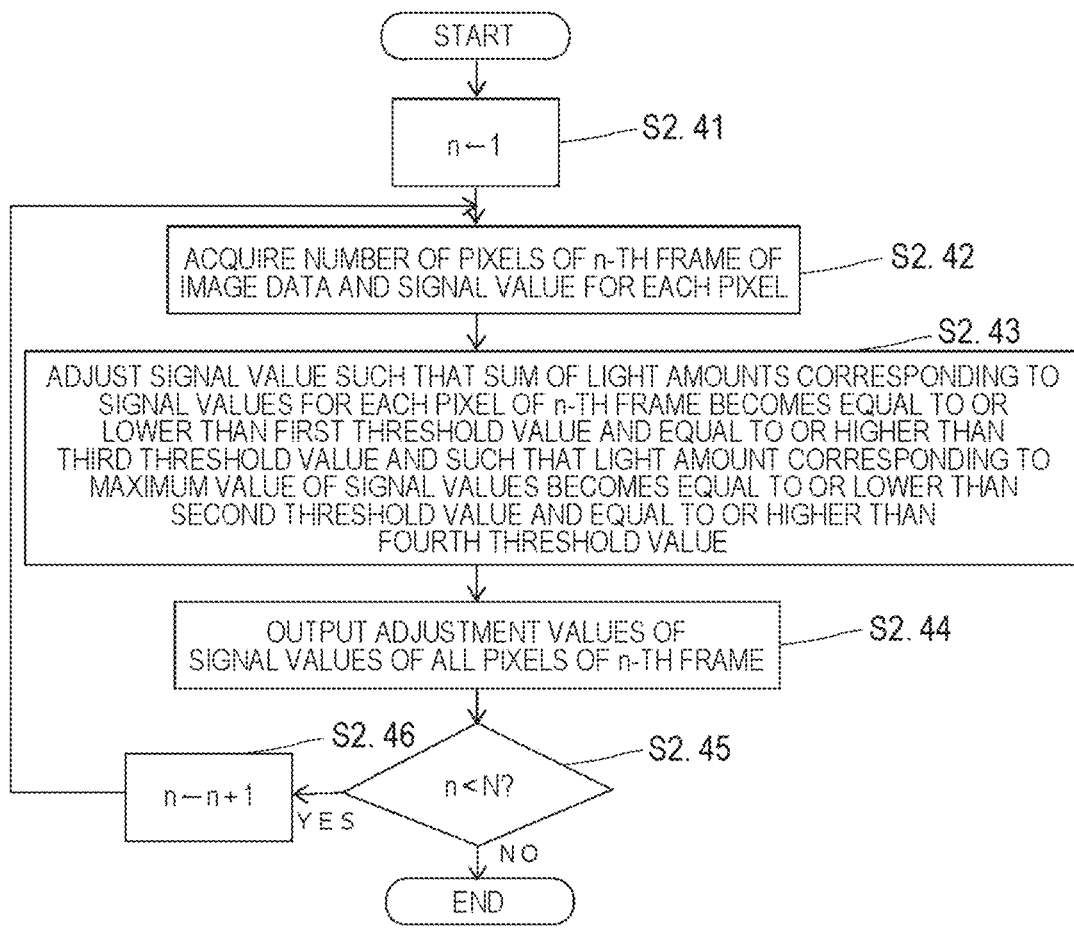
FIG. 13 is a flowchart for explaining light amount adjustment processing 4.

Hereinafter, the light amount adjustment processing 4 will be described with reference to a flowchart of FIG. 13. The light amount adjustment processing 3 is performed by the light amount adjustment system 200-4.

In first step S2.41, the light amount adjustment unit 210-2 sets n to 1.

In next step S2.42, the light amount adjustment unit 210-2 acquires the number of pixels of an n-th frame of the image data and the signal value for each pixel.

Figure 14A:
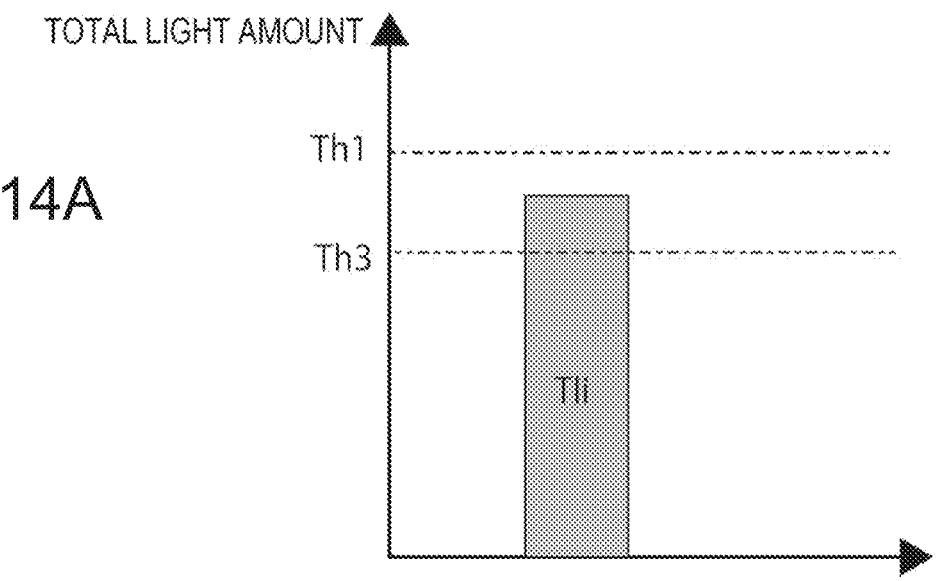
FIG. 14A and FIG. 14B are diagrams for explaining light amount adjustment processing 4.
Figure 14B:
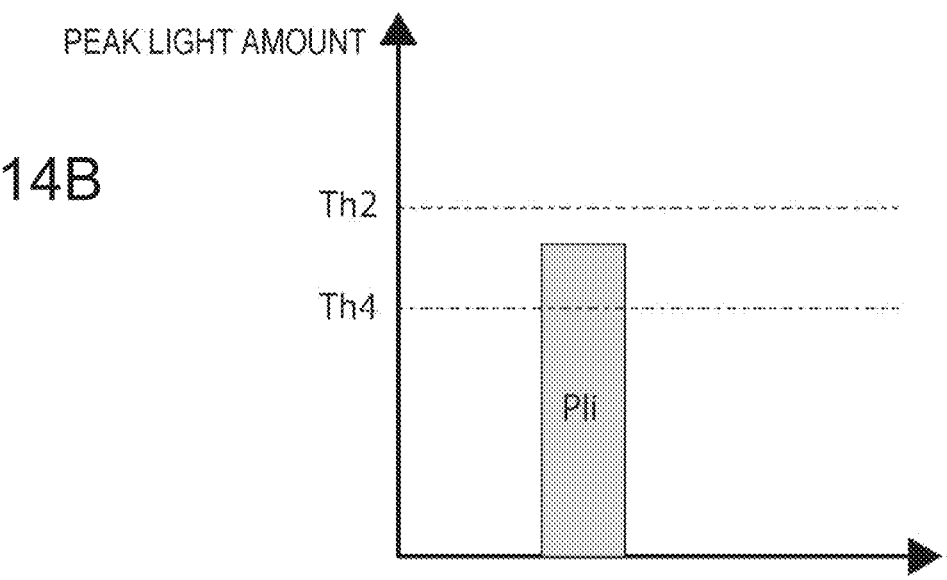

In next step S2.43, as illustrated in FIG. 14A and FIG. 14B, the light amount adjustment unit 210-2 adjusts the signal value such that the total light amount Tli becomes equal to or lower than the first threshold value Th1 and equal to or higher than the third threshold value Th3 (preferably, the total light amount Tli becomes a target value equal to or lower than the first threshold value Th1 and equal to or higher than the third threshold value Th3) and such that the peak light amount Pli becomes equal to or lower than the second threshold value Th2 and equal to or higher than the fourth threshold value Th4 (preferably, the peak light amount Pli becomes a target value equal to or lower than the second threshold value Th2 and equal to or higher than the fourth threshold value Th4), the total light amount Tli being a sum of the light amounts corresponding to the signal values for each pixel of the n-th frame, and the peak light amount Pli being a light amount corresponding to the maximum value of the signal values.

In next step S2.44, the light amount adjustment unit 210-2 outputs the adjustment values of the signal values of all the pixels of the n-th frame.

In next step S2.45, the light amount adjustment unit 210-2 determines whether or not n<N (total number of frames of image data) is satisfied. In a case where the determination in this step is YES, the flow proceeds to step S2.46, and in a case where the determination in this step is NO, the flow is ended.

In step S2.46, the light amount adjustment unit 210-2 increments n. In a case where step S2.46 is executed, the flow returns to step S2.42.

As described above, in the image display device 10-4, the total light amount Tli is adjusted to be equal to or lower than the first threshold value Th1 and equal to or higher than the third threshold value Th3, and the peak light amount Pli is adjusted to be equal to or lower than the second threshold value Th2 and equal to or higher than the fourth threshold value Th4, the total light amount Tli being a sum of the light amounts corresponding to the signal values for each pixel of each frame of the image data, and the peak light amount Pli being a light amount corresponding to the maximum value of the signal values. Therefore, even in a case where a size of the image (a size of the angle of view of the image light IL incident on the eyeball 1) changes between frames, in an image of a subsequent frame in addition to an image of a previous frame, the light amount is prevented from being excessive both as a whole and as a local part, and the light amount is prevented from being insufficient both as a whole and as a local part. Thus, the user is more reliably prevented from feeling glare, and the user is more reliably prevented from feeling poor visibility due to darkness.

Image Display Device According to Example 5 of First Embodiment of Present Technology By the way, even in a case where the total light amount of the image light IL with which the image is formed is adjusted to be equal to or lower than the first threshold value Th1 regardless of the size of the image as in the image display device 10-1 according to Example 1, the total light amount may be insufficient depending on the frame, and as a result, visibility may be deteriorated. For example, in a state where the total light amount is appropriately set for a small image, in a case where switching is performed from a frame of the small image to a frame of a large image, the total light amount is constant, and an area is enlarged. Thus, the light amount is insufficient, and as a result, it may difficult to visually recognize the image.

Therefore, in the image display device 10-5 according to Example 5, a lower limit value of the total light amount is set.

Figure 17:
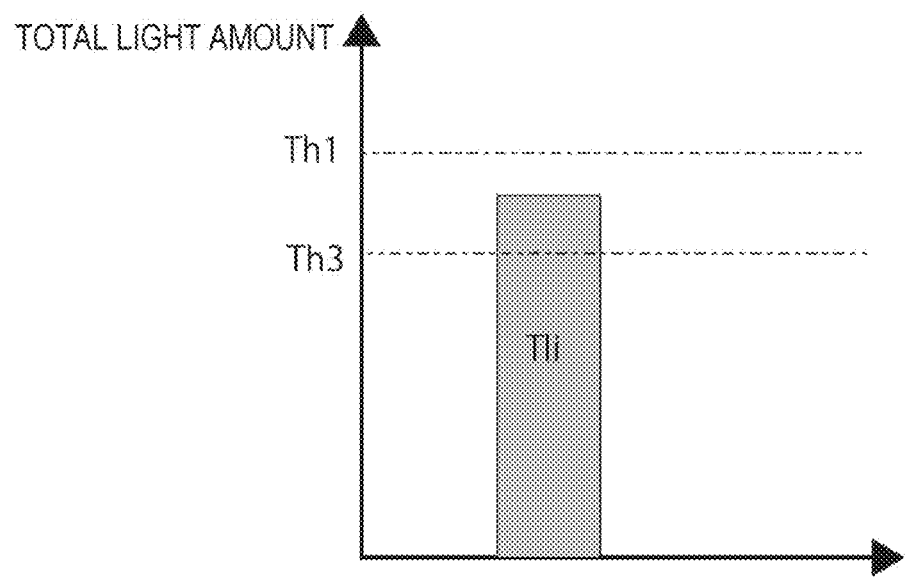
FIG. 17 is a diagram for explaining light amount adjustment processing 5.

In the image display device 10-5 according to Example 5, as illustrated in FIG. 17, the light amount adjustment system 200-5 adjusts the total light amount of the image light IL with which the image is formed to be equal to or lower than the first threshold value Th1 and equal to or higher than the third threshold value Th3 regardless of the size of the image.

Figure 15:
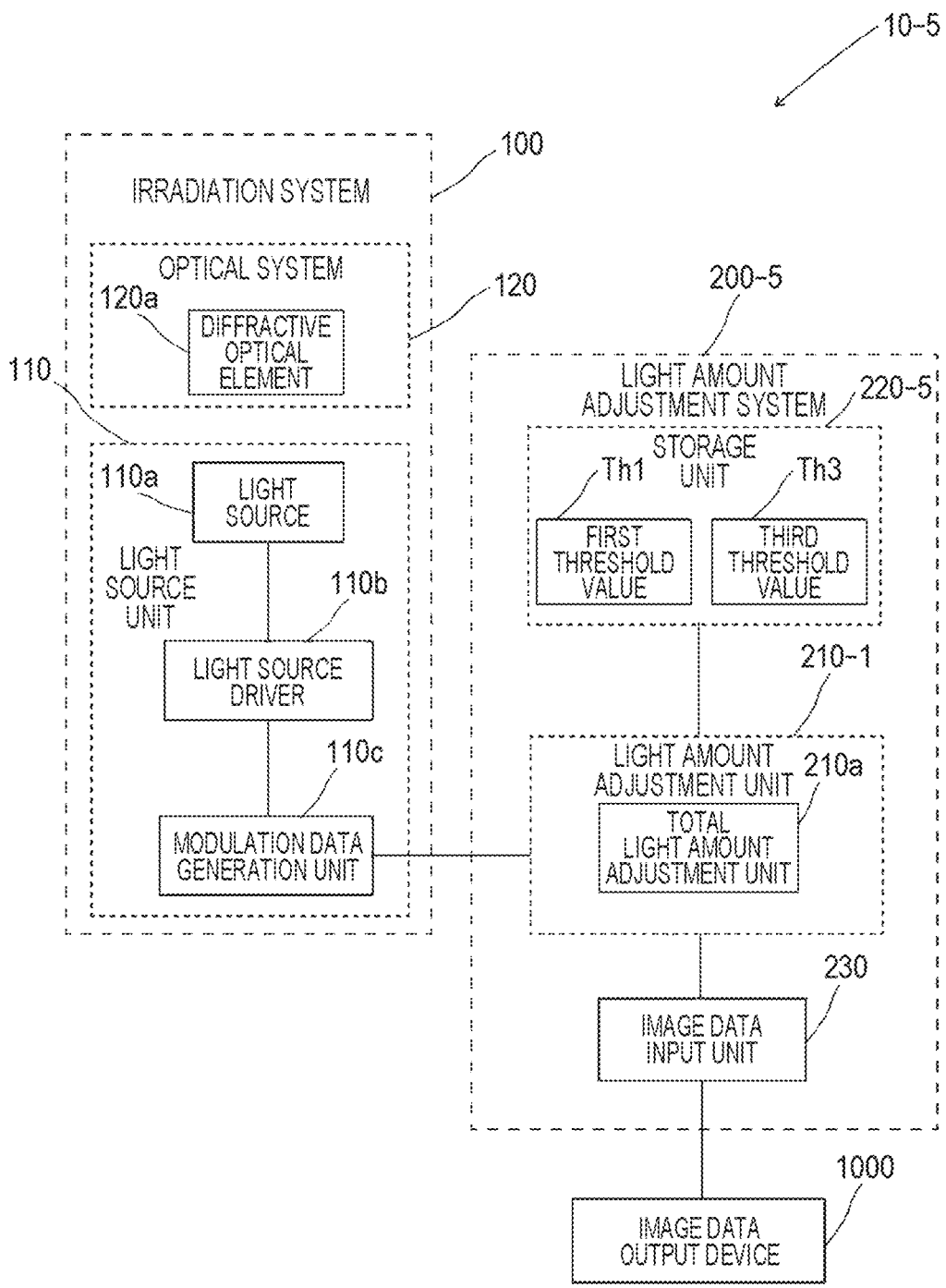
FIG. 15 is a block diagram illustrating functions of the image display device according to Example 5 of the first embodiment.

As illustrated in FIG. 15, the light amount adjustment unit 210-1 of the light amount adjustment system 200-5 includes the total light amount adjustment unit 210a.

The total light amount adjustment unit 210a adjusts the signal value such that the sum of the light amounts corresponding to the signal values of the pixels of the image of each frame of the image data becomes a predetermined value equal to or lower than the first threshold value Th1 and equal to or higher than the third threshold value Th3, and transmits the adjustment value to the modulation data generation unit 110c.

The storage unit 220-5 of the light amount adjustment system 200-5 stores the first threshold value Th1 and the third threshold value Th3.

By using the image display device 10-5 according to Example 5, it is possible to perform image display processing similar to the image display processing (refer to FIG. 3) performed using the image display device 10-1 according to Example 1. In the image display processing, light amount adjustment processing 5 as an example of the light amount adjustment processing (step S2 in FIG. 3) is performed.

(Light Amount Adjustment Processing 5)

Figure 16:
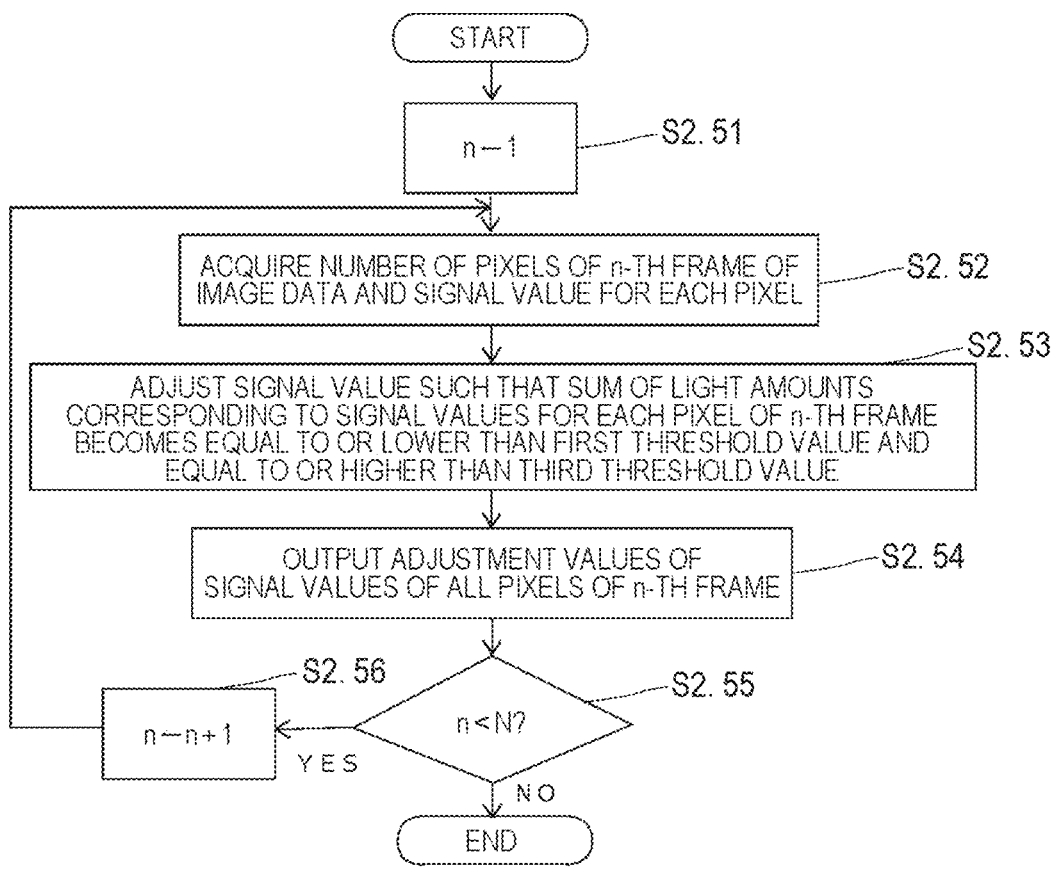
FIG. 16 is a flowchart for explaining light amount adjustment processing 5.

Hereinafter, the light amount adjustment processing 5 will be described with reference to a flowchart of FIG. 16. The light amount adjustment processing 5 is performed by the light amount adjustment system 200-5.

In first step S2.51, the light amount adjustment unit 210-1 sets n to 1.

In next step S2.52, the light amount adjustment unit 210-1 acquires the number of pixels of an n-th frame of the image data and the signal value for each pixel.

In next step S2.53, as illustrated in FIG. 17, the light amount adjustment unit 210-1 adjusts the signal value such that the total light amount Tli becomes equal to or lower than the first threshold value Th1 and equal to or higher than the third threshold value Th3 (preferably, the total light amount Tli becomes a target value equal to or lower than the first threshold value Th1 and equal to or higher than the third threshold value Th3), the total light amount Tli being a sum of the light amounts corresponding to the signal values for each pixel of the n-th frame.

In next step S2.54, the light amount adjustment unit 210-1 outputs the adjustment values of the signal values of all the pixels of the n-th frame.

In next step S2.55, the light amount adjustment unit 210-1 determines whether or not n<N is satisfied. In a case where the determination in this step is YES, the flow proceeds to step S2.56, and in a case where the determination in this step is NO, the flow is ended.

In step S2.56, the light amount adjustment unit 210-1 increments n. In a case where step S2.56 is executed, the flow returns to step S2.52.

As described above, in the image display device 10-5, the total light amount Tli is adjusted to be equal to or lower than the first threshold value Th1 and equal to or higher than the third threshold value Th3, the total light amount Tli being a sum of the light amounts corresponding to the signal values for each pixel of each frame of the image data. Therefore, even in a case where a size of the image (a size of the angle of view of the image light IL incident on the eyeball 1) changes between frames, in an image of a subsequent frame in addition to an image of a previous frame, the light amount is prevented from being excessive as a whole, and the light amount is prevented from being insufficient as a whole. Thus, the user is prevented from feeling glare as much as possible, and the user is prevented from feeling poor visibility due to darkness as much as possible.

6. <Image Display Device According to Examples 1 to 5 of Second Embodiment of Present Technology>

Hereinafter, image display devices 20-1 to 20-5 according to Examples 1 to 5 of a second embodiment of the present technology will be described.

By the way, the first threshold value Th1 used in the image display devices 10-1 to 10-5 according to Examples 1 to 5 of the first embodiment is set on the basis of, for example, a human standard sensitivity based on a spatial glare index or the like, an average value of sensitivities of a plurality of persons, or the like. As a result, the first threshold value Th1 is not necessarily an appropriate value depending on the user. The second threshold value Th2 used in the image display devices 10-2 to 10-4 according to Examples 2 to 4 of the first embodiment, the third threshold value Th3 used in the image display devices 10-3 and 10-4 according to Examples 3 and 4 of the first embodiment, and the fourth threshold value Th4 used in the image display device 10-4 according to Example 4 of the first embodiment have a limit similar to the limit of the first threshold value Th1.

Therefore, in the image display devices 20-1 to 20-5 according to Examples 1 to 5 of the second embodiment, the total light amount is adjusted to be equal to or lower than a value which is appropriate (preferably, optimum) for each user and is based on the first threshold value Th1. In the image display devices 20-2 to 20-4 according to Examples 2 to 4 of the second embodiment, the peak light amount is adjusted to be equal to or lower than a value which is appropriate (preferably, optimum) for each user and is based on the second threshold value Th2. In the image display devices 20-3 and 20-4 according to Examples 3 and 4 of the second embodiment, the total light amount is adjusted to be equal to or higher than a value which is appropriate (preferably, optimum) for each user and is based on the third threshold value Th3. In the image display device 20-4 according to Example 4 of the second embodiment, the peak light amount is adjusted to be equal to or higher than a value which is appropriate (preferably, optimum) for each user and is based on the fourth threshold value Th4.

Figure 18:
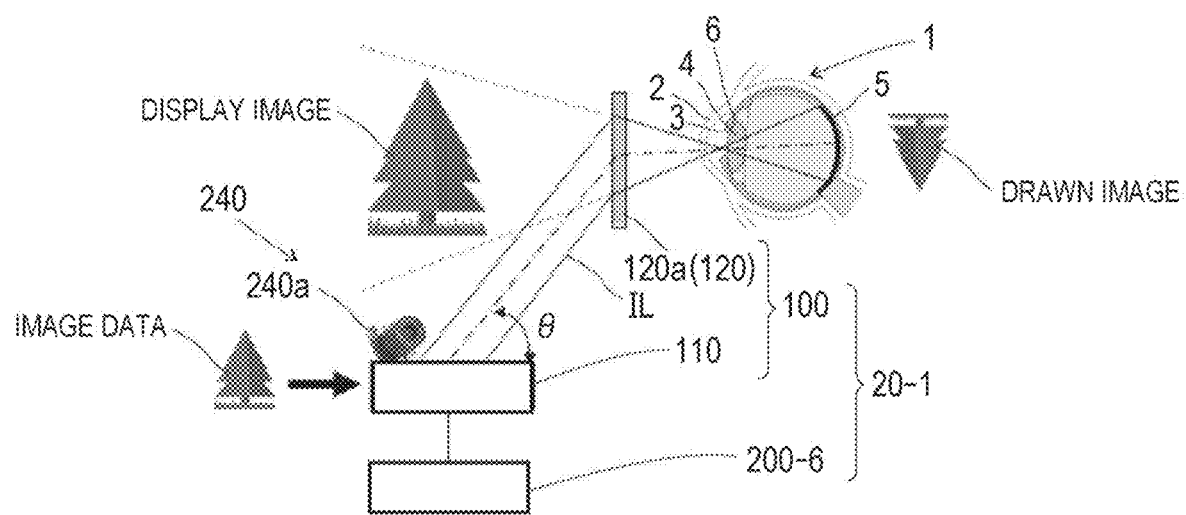
FIG. 18 is a diagram schematically illustrating a configuration example of an image display device according to a second embodiment.
Figure 19:
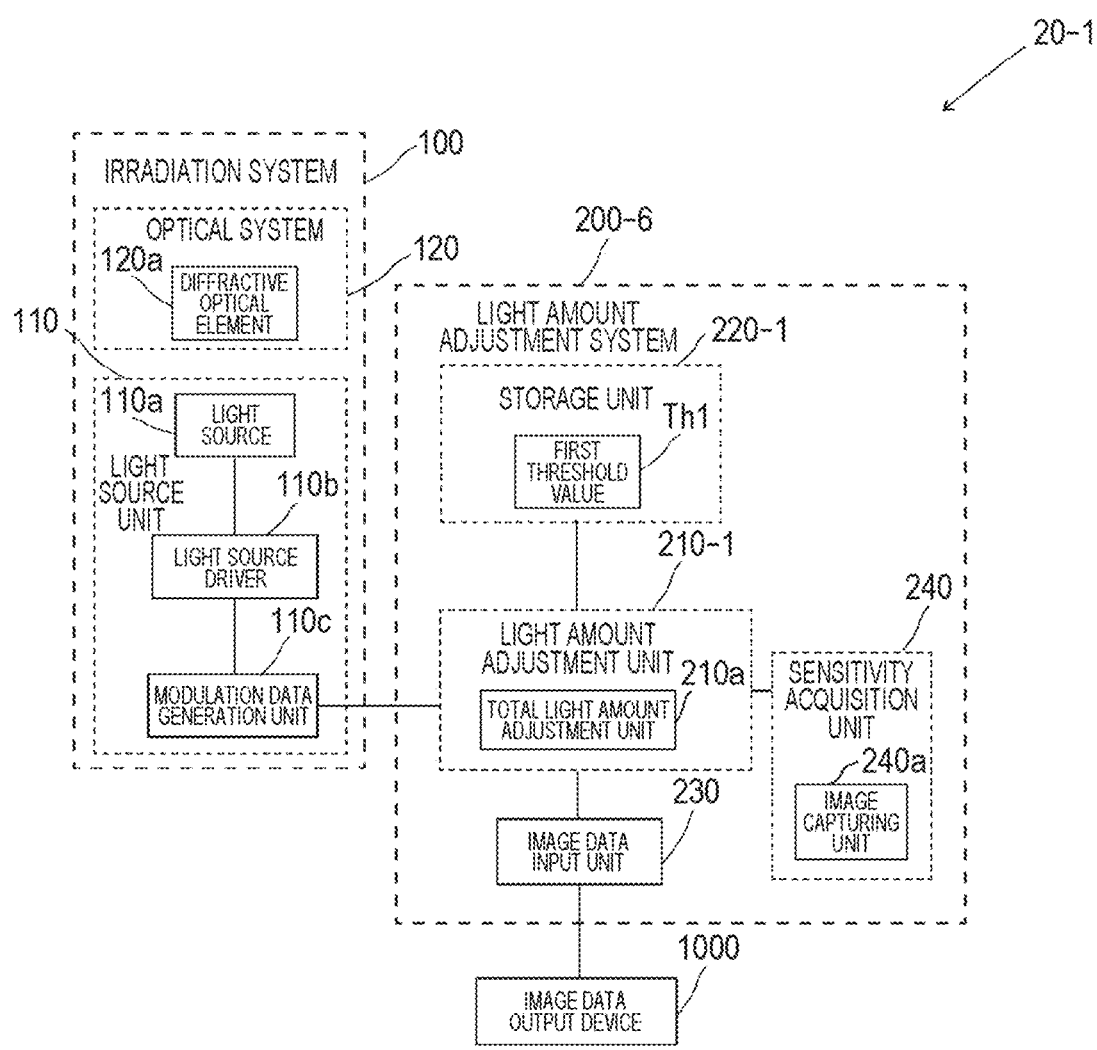
FIG. 19 is a block diagram illustrating functions of the image display device according to Example 1 of the second embodiment.

Image Display Device According to Example 1 of Second Embodiment of Present Technology As illustrated in FIG. 18 and FIG. 19, the image display device 20-1 according to Example 1 of the second embodiment has substantially the similar configuration as the image display device 10-1 according to Example 1 of the first embodiment except that the light amount adjustment system 200-6 includes a sensitivity acquisition unit 240 that acquires a sensitivity of the user's eye to light.

By the way, in general, in a case where a pupil of a person is a brown color, as the brown color is darker, the person has a lower sensitivity to light. In a case where a pupil of a person is a blue color, as the blue color is lighter, the person has a higher sensitivity to light.

In addition, a sensitivity of an iris of a human to light sequentially increases in order of brown (dark brown), hazel (light brown), amber, green, grey, and blue, and a blue iris has a sensitivity of up to 1.5 times to 2 times the sensitivity of a brown iris. In addition to the iris colors, although rare, albino red, violet (blue-purple), and heterochromia iridis (odd eye) are present. Even in this case, it is considered that, as the iris has a dark blue color and a light color, the iris has a higher sensitivity and that, as the iris has a dark red color and a dark color, the iris has a lower sensitivity.

In addition, under an environment of constant brightness, a person with a larger pupil has a lower sensitivity to light, and a person with a smaller pupil has a higher sensitivity to light.

As described above, the sensitivity of the user's eye to light (for example, a relative sensitivity that is a sensitivity relative to a standard sensitivity) can be acquired by at least one of a hue, a shade, or a size of the pupil 3 and/or the iris 6 of the user.

In the light amount adjustment system 200-6, as an example, as illustrated in FIG. 19, the light amount adjustment unit 210-1 adjusts the total light amount on the basis of the acquisition result of the sensitivity acquisition unit 240.

As an example, the sensitivity acquisition unit 240 includes an image capturing unit 240a that captures images of the eyeball 1 of the user and/or a surrounding environment of the eyeball 1 of the user, and acquires a feature amount of the pupil 3 of the user and/or a feature amount of the iris 6 of the user from the image capturing result of the image capturing unit 240a. The image capturing unit 240a is, for example, a camera that captures an image of the eyeball 1 of the user and outputs a color image of the eyeball 1. The camera includes, for example, an image sensor.

As an example, the sensitivity acquisition unit 240 acquires a sensitivity of the user's eye to light from the acquired feature amount of the pupil 3 of the eyeball 1 and/or the acquired feature amount of the iris 6 of the eyeball 1. The feature amount of the pupil 3 is, for example, at least one of a hue, a shade, or a size of the pupil 3. The feature amount of the iris 6 is, for example, at least one of a hue, a shade, or a size of the iris 6.

(1) For example, the sensitivity acquisition unit 240 sets detection values of the hue and the shade of the pupil 3 to 1 to 5 (for example, a darkest brown color is set to 1, a second darkest brown color is set to 2, an intermediate color between a brown color and a blue color is set to 3, a second lightest blue color is set to 4, and a lightest blue color is set to 5), the detection values being obtained from the image capturing result of the image capturing unit 240a.

(2) For example, the sensitivity acquisition unit 240 sets detection values of the hue of the iris 6 to 1 to 6 (for example, brown is set to 1, hazel is set to 2, amber is set to 3, green is set to 4, grey is set to 5, and blue is set to 6), the detection values being obtained from the image capturing result of the image capturing unit 240a.

(3) For example, the sensitivity acquisition unit 240 sets detection values of the size of the pupil 3 under predetermined illuminance to 1 to 5 (for example, a standard value of a size of a pupil of a human under the predetermined illuminance is set to 3), the detection values being obtained from the image capturing result of the image capturing unit 240a. In this case, for example, by adjusting a light amount of light from the light source using the illuminance sensor, the surrounding environment of the pupil 3 can be set as the illuminance.

The sensitivity acquisition unit 240 may output, as a sensitivity of the user, a sum value of the detection values of (1) to (3), or may output, as a sensitivity of the user, a relative sensitivity $\alpha$ which is a value obtained by dividing the sum value by the standard sensitivity (for example, a value between 9 and 10).

Note that, for example, any one detection value of (1) to (3) may be output as a sensitivity of the user, or a relative sensitivity $\alpha$ which is a value obtained by dividing the detection value by the standard sensitivity (for example, a value between 3 and 4) may be output as a sensitivity of the user. For example, a sum value of any two detection values of (1) to (3) may be output as a sensitivity of the user, or a relative sensitivity $\alpha$ which is a value obtained by dividing the sum value by the standard sensitivity (for example, a value between 6 and 7) may be output as a sensitivity of the user.

By using the image display device 20-1 according to Example 1 of the second embodiment, it is possible to perform image display processing similar to the image display processing (refer to FIG. 3) performed using the image display device 10-1 according to Example 1 of the first embodiment. In the image display processing, light amount adjustment processing 6 as an example of the light amount adjustment processing (step S2 in FIG. 3) is performed.

(Light Amount Adjustment Processing 6)

Hereinafter, the light amount adjustment processing 6 will be described with reference to a flowchart of FIG. 20. The light amount adjustment processing 6 is performed by the light amount adjustment system 200-6.

In first step S2.61, the light amount adjustment unit 210-1 sets n to 1.

In next step S2.62, the light amount adjustment unit 210-1 acquires the number of pixels of an n-th frame of the image data and the signal value for each pixel.

In next step S2.63, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity of the user's eye to light from the acquired feature amount. The sensitivity acquisition unit 240 acquires, as the sensitivity, for example, a relative sensitivity α in a case where a standardized sensitivity (standard sensitivity) of a human to light is set to 1.

Figure 21A:
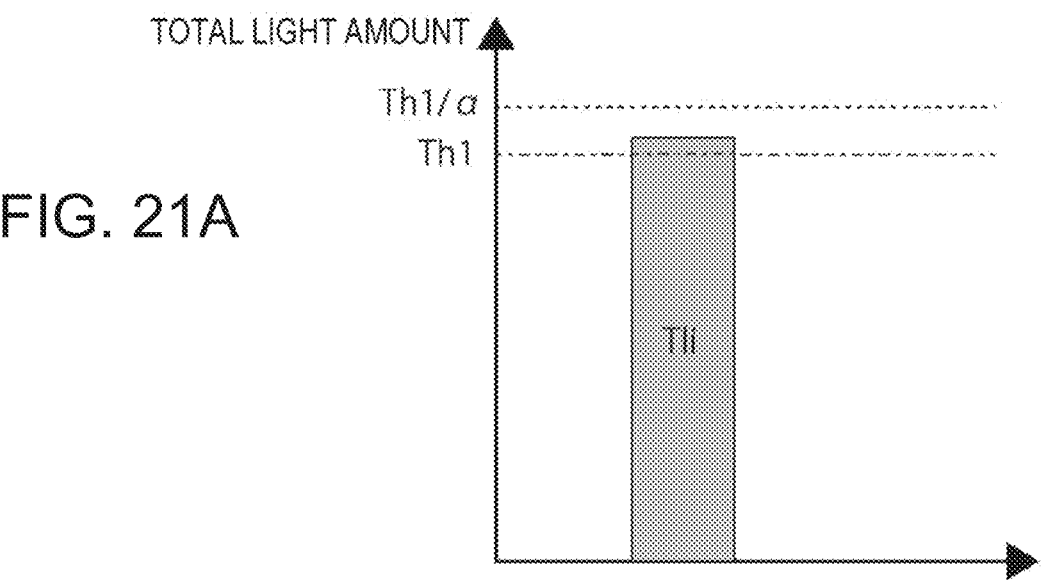
FIG. 21A and FIG. 21B are diagrams for explaining light amount adjustment processing 6.
Figure 21B:
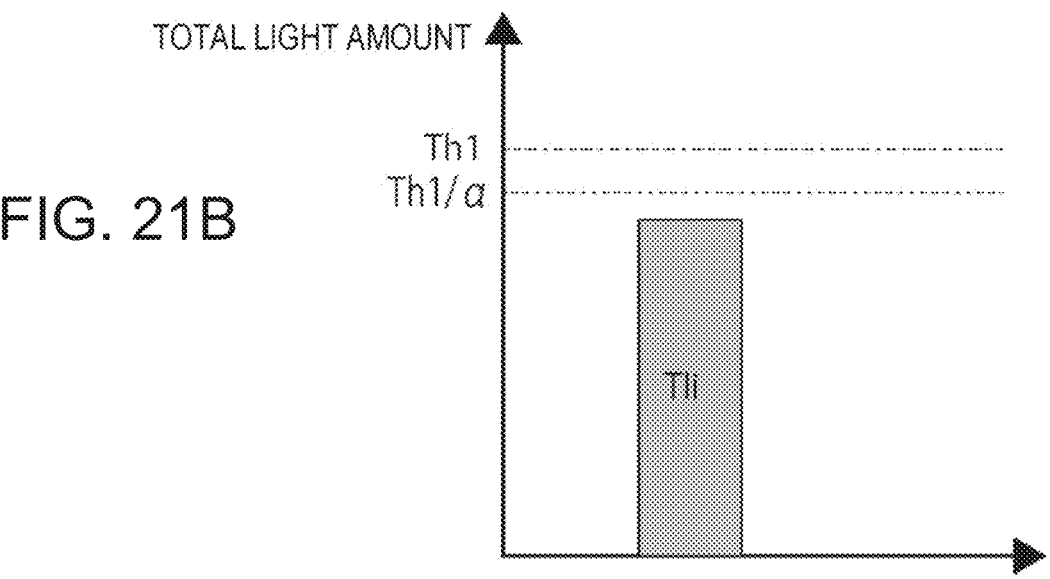

In next step S2.64, as illustrated in FIG. 21A and FIG. 21B, the light amount adjustment unit 210-1 adjusts the signal value such that the total light amount Tli becomes equal to or lower than a value (for example, Th1/α) based on the first threshold value Th1 and the sensitivity acquired in step S2.63, the total light amount Tli being a sum of the light amounts corresponding to the signal values for each pixel of the n-th frame.

Specifically, the light amount adjustment unit 210-1 adjusts the total light amount Tli on the basis of the value Th1/α obtained by dividing the first threshold value Th1 by the relative sensitivity α. For example, as illustrated in FIG. 21A, in a case where the sensitivity of the user's eye to light is lower than the standard sensitivity (in a case of α<1), the light amount adjustment unit 210-1 adjusts the total light amount Tli to, for example, a predetermined value equal to or lower than Th1/α (>Th1). For example, as illustrated in FIG. 21B, in a case where the sensitivity of the user's eye to light is equal to or higher than the standard sensitivity (in a case of α≥1), the light amount adjustment unit 210-1 adjusts the total light amount Tli to, for example, a predetermined value equal to or lower than Th1/α (≤Th1).

In next step S2.65, the light amount adjustment unit 210-1 outputs the adjustment values of the signal values of all the pixels of the n-th frame.

In next step S2.66, the light amount adjustment unit 210-1 determines whether or not n<N (total number of frames of image data) is satisfied. In a case where the determination in this step is YES, the flow proceeds to step S2.67, and in a case where the determination in this step is NO, the flow is ended.

In step S2.67, the light amount adjustment unit 210-1 increments n. In a case where step S2.67 is executed, the flow returns to step S2.62.

As described above, in the image display device 20-1, the total light amount Tli is adjusted to be equal to or lower than the value Th1/α obtained by reflecting the sensitivity of the user to the first threshold value Th1, the total light amount Tli being a sum of the light amounts corresponding to the signal values for each pixel of each frame of the image data. Therefore, even in a case where a size of the image (a size of the angle of view of the image light IL incident on the eyeball 1) changes between frames (for example, even in a case where switching from a large image to a small image is performed), the light amount is prevented from being excessive as a whole regardless of the user in an image of a subsequent frame in addition to an image of a previous frame, and thus any user is prevented from feeling glare as much as possible.

Figure 22:
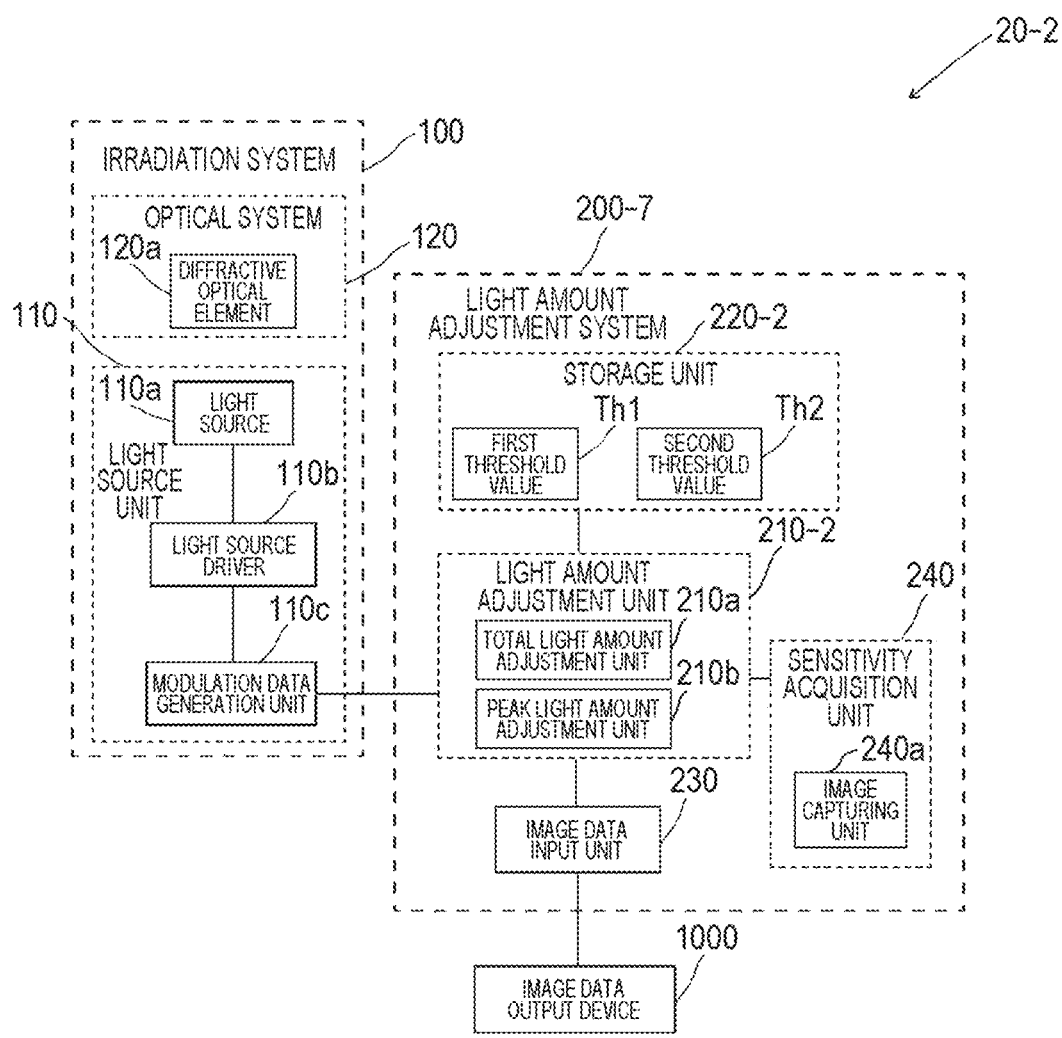
FIG. 22 is a block diagram illustrating functions of the image display device according to Example 2 of the second embodiment.

Image Display Device According to Example 2 of Second Embodiment of Present Technology As illustrated in FIG. 22, the image display device 20-2 according to Example 2 of the second embodiment has substantially the same configuration as the image display device 10-2 according to Example 2 of the first embodiment except that the light amount adjustment system 200-7 includes a sensitivity acquisition unit 240 that acquires a sensitivity of the user's eye to light.

In the light amount adjustment system 200-7, as an example, the light amount adjustment unit 210-2 adjusts the total light amount and the peak light amount on the basis of the acquisition result of the sensitivity acquisition unit 240.

By using the image display device 20-2 according to Example 2 of the second embodiment, it is possible to perform image display processing similar to the image display processing (refer to FIG. 3) performed using the image display device 10-1 according to Example 1 of the first embodiment. In the image display processing, light amount adjustment processing 7 as an example of the light amount adjustment processing (step S2 in FIG. 3) is performed.

(Light Amount Adjustment Processing 7)

Figure 23:
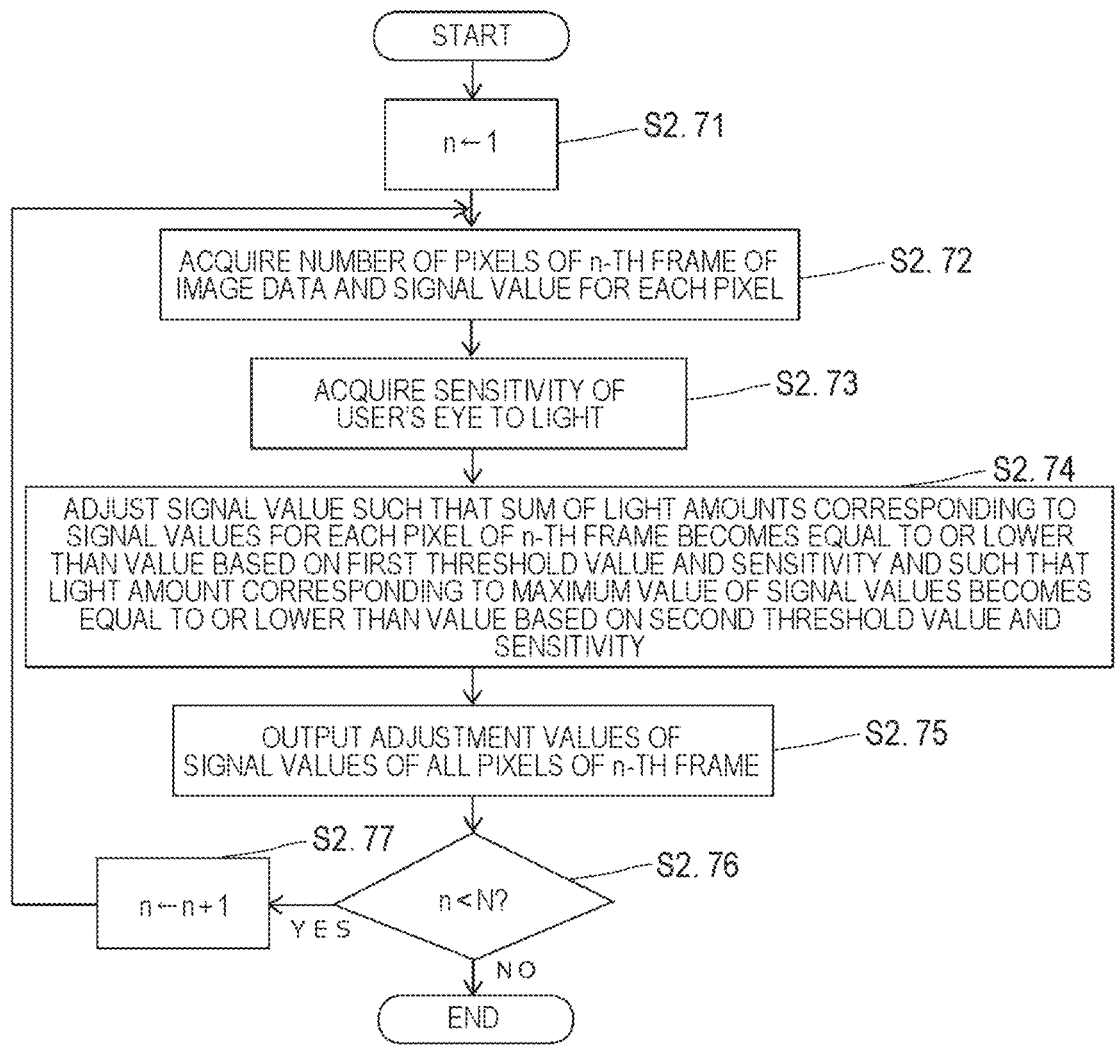
FIG. 23 is a flowchart for explaining light amount adjustment processing 7.

Hereinafter, the light amount adjustment processing 7 will be described with reference to a flowchart of FIG. 23. The light amount adjustment processing 7 is performed by the light amount adjustment system 200-7.

In first step S2.71, the light amount adjustment unit 210-2 sets n to 1.

In next step S2.72, the light amount adjustment unit 210-2 acquires the number of pixels of an n-th frame of the image data and the signal value for each pixel.

In next step S2.73, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity (for example, a relative sensitivity α) of the user's eye to light from the acquired feature amount.

In next step S2.74, as illustrated in FIG. 24, the light amount adjustment unit 210-2 adjusts the signal value such that the total light amount Tli becomes equal to or lower than a value (for example, Th1/α) based on the first threshold value Vth and the sensitivity acquired in step S2.73 and such that the peak light amount Pli becomes equal to or lower than a value (for example, Th2/α) based on the second threshold value Th2 and the sensitivity, the total light amount Tli being a sum of the light amounts corresponding to the signal values for each pixel of the n-th frame, and the peak light amount Pli being a light amount corresponding to the maximum value of the signal values.

Figure 24A:
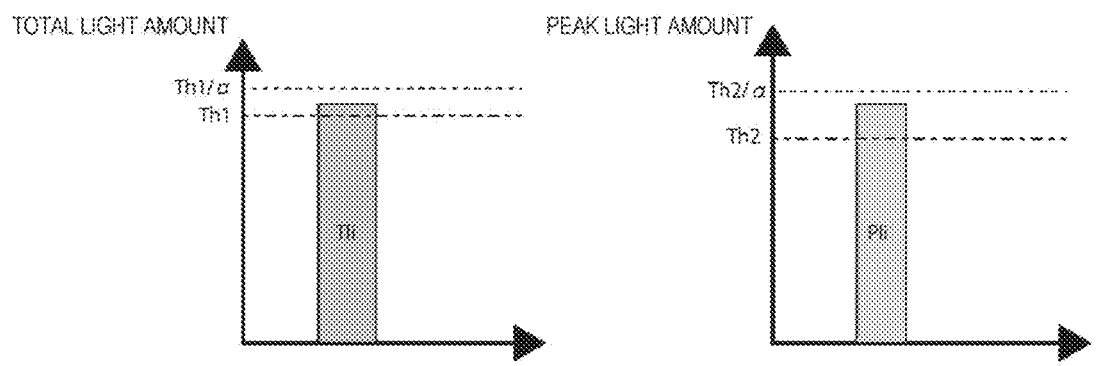
FIG. 24A and FIG. 24B are diagrams for explaining light amount adjustment processing 7.
Figure 24B:
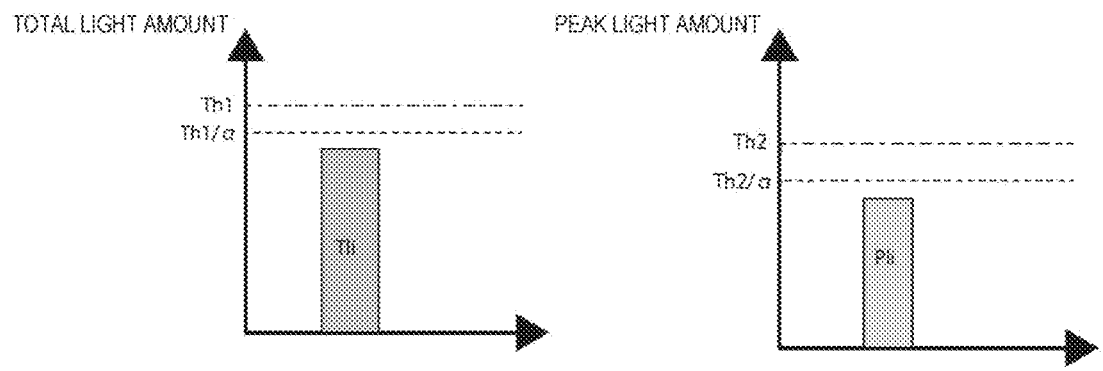

Specifically, as illustrated in FIG. 24, the light amount adjustment unit 210-2 adjusts the total light amount Tli on the basis of a value Th1/α obtained by dividing the first threshold value Th1 by the relative sensitivity α, and adjusts the peak light amount Pli on the basis of a value Th2/α obtained by dividing the second threshold value Th2 by the relative sensitivity α. For example, as illustrated in FIG. 24A, in a case where the sensitivity of the user's eye to light is low (in a case of α<1), the light amount adjustment unit 210-2 adjusts the total light amount Tli to a predetermined value equal to or lower than Th1/α (>Th1), and adjusts the peak light amount Pli to a predetermined value equal to or lower than Th2/α (>Th2). For example, as illustrated in FIG. 24B, in a case where the sensitivity of the user's eye to light is high (in a case of α≥1), the light amount adjustment unit 210-2 adjusts the total light amount Tli to a predetermined value equal to or lower than Th1/α (≤Th1), and adjusts the peak light amount Pli to a predetermined value equal to or lower than Th2/α (≤Th2).

In next step S2.75, the light amount adjustment unit 210-2 outputs the adjustment values of the signal values of all the pixels of the n-th frame.

In next step S2.76, the light amount adjustment unit 210-2 determines whether or not n<N (total number of frames of image data) is satisfied. In a case where the determination in this step is YES, the flow proceeds to step S2.77, and in a case where the determination in this step is NO, the flow is ended.

In step S2.77, the light amount adjustment unit 210-2 increments n. In a case where step S2.77 is executed, the flow returns to step S2.72.

As described above, in the image display device 20-2, the total light amount Tli is adjusted to be equal to or lower than the value Th1/α obtained by reflecting the sensitivity of the user to the first threshold value Th1, and the peak light amount Pli is adjusted to be equal to or lower than the value Th2/α obtained by reflecting the sensitivity of the user to the second threshold value Th2, the total light amount Tli being a sum of the light amounts corresponding to the signal values for each pixel of each frame of the image data, and the peak light amount Pli being a light amount corresponding to the maximum value of the signal values. Therefore, even in a case where a size of the image (a size of the angle of view of the image light IL incident on the eyeball 1) changes between frames (for example, even in a case where switching from a large image to a small image is performed), the light amount is prevented from being excessive both as a whole and as a local part regardless of the user in an image of a subsequent frame in addition to an image of a previous frame, and thus any user is more reliably prevented from feeling glare as much as possible.

Figure 25:
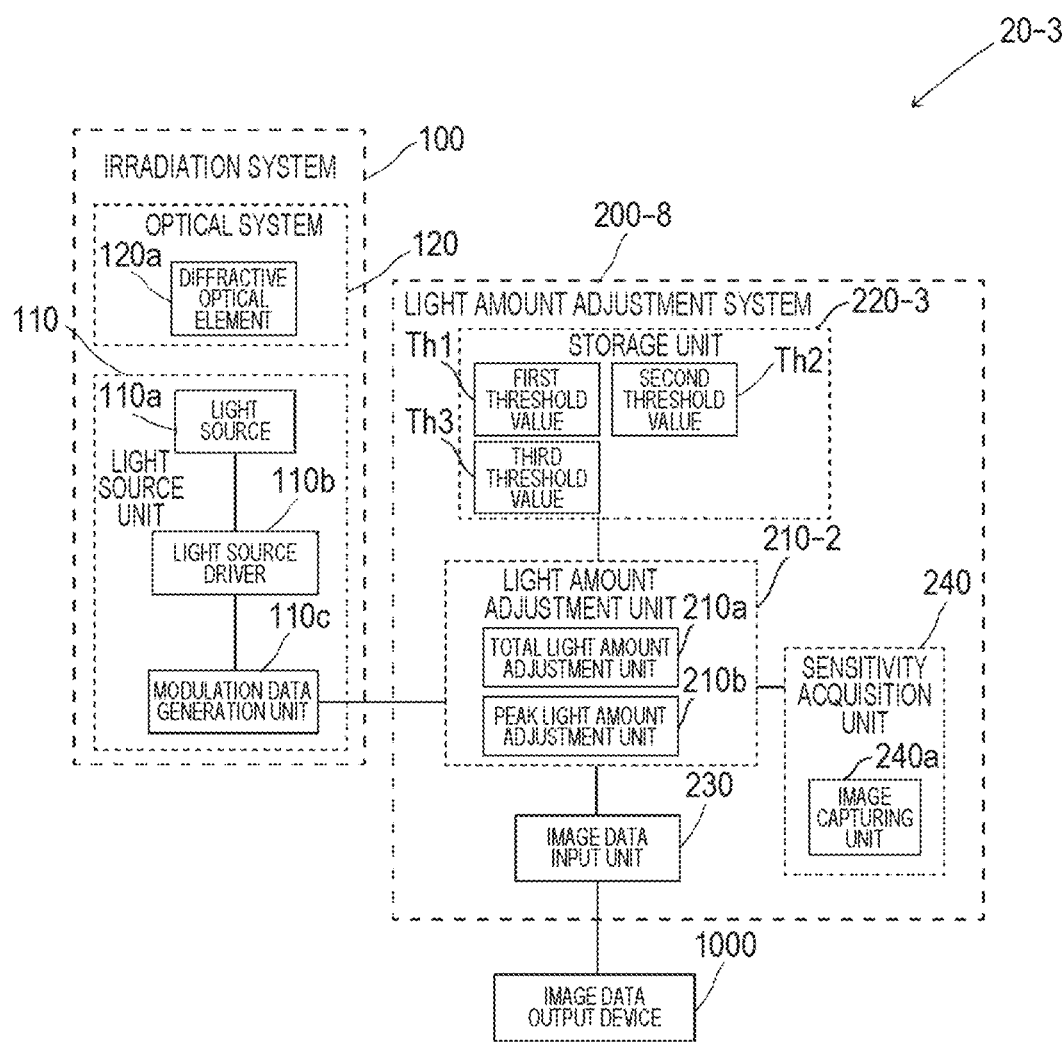
FIG. 25 is a block diagram illustrating functions of the image display device according to Example 3 of the second embodiment.

Image Display Device According to Example 3 of Second Embodiment of Present Technology As illustrated in FIG. 25, the image display device 20-3 according to Example 3 of the second embodiment has substantially the same configuration as the image display device 10-3 according to Example 3 of the first embodiment except that the light amount adjustment system 200-8 includes a sensitivity acquisition unit 240 that acquires a sensitivity of the user's eye to light.

In the light amount adjustment system 200-8, as an example, the light amount adjustment unit 210-2 adjusts the total light amount and the peak light amount on the basis of the acquisition result of the sensitivity acquisition unit 240.

By using the image display device 20-3 according to Example 3 of the second embodiment, it is possible to perform image display processing similar to the image display processing (refer to FIG. 3) performed using the image display device 10-1 according to Example 1 of the first embodiment. In the image display processing, light amount adjustment processing 8 as an example of the light amount adjustment processing (step S2 in FIG. 3) is performed.

(Light Amount Adjustment Processing 8)

Figure 26:
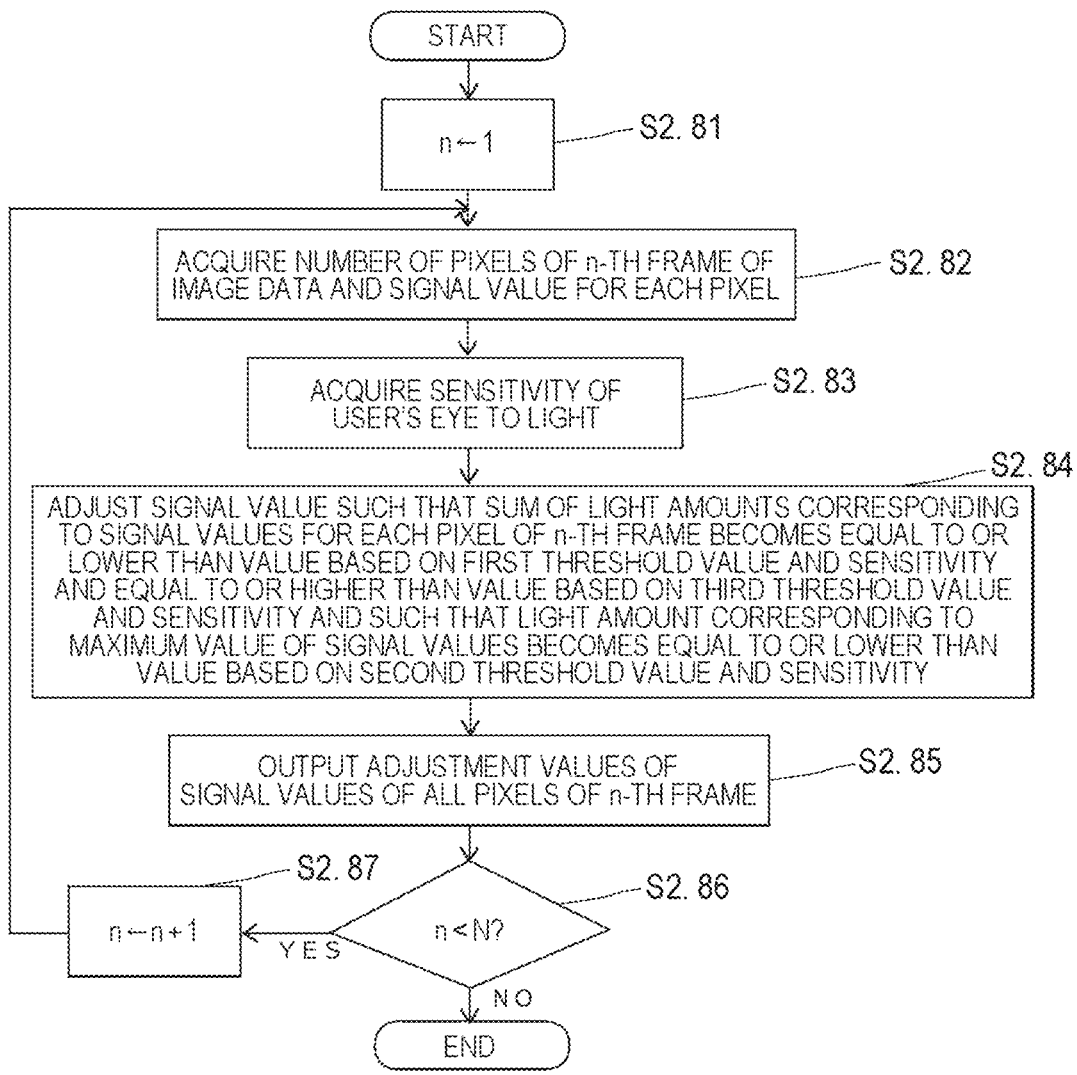
FIG. 26 is a flowchart for explaining light amount adjustment processing 8.

Hereinafter, the light amount adjustment processing 8 will be described with reference to a flowchart of FIG. 26. The light amount adjustment processing 8 is performed by the light amount adjustment system 200-8.

In first step S2.81, the light amount adjustment unit 210-2 sets n to 1.

In next step S2.82, the light amount adjustment unit 210-2 acquires the number of pixels of an n-th frame of the image data and the signal value for each pixel.

In next step S2.83, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity (for example, a relative sensitivity α) of the user's eye to light from the acquired feature amount.

In next step S2.84, as illustrated in FIG. 27, the light amount adjustment unit 210-2 adjusts the signal value such that the total light amount Tli becomes equal to or lower than a value (for example, Th1/α) based on the first threshold value Th1 and the sensitivity acquired in step S2.83 and equal to or higher than a value (for example, Th3/α) based on the third threshold value Th3 and the sensitivity and such that the light amount becomes equal to or lower than a value (for example, Th2/α) based on the second threshold value Th2 and the sensitivity, the total light amount Tli being a sum of the light amounts corresponding to the signal values for each pixel of the n-th frame, and the light amount being a light amount corresponding to the maximum value of the signal values.

Figure 27A:
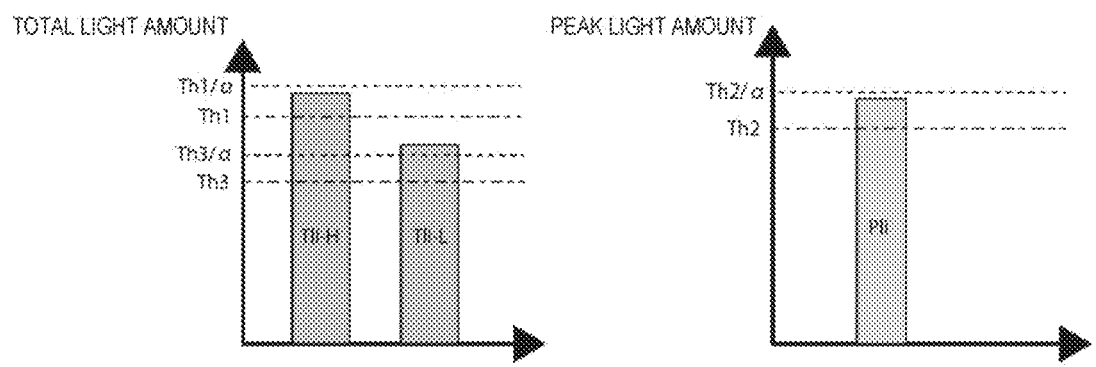
FIG. 27A and FIG. 27B are diagrams for explaining light amount adjustment processing 8.
Figure 27B:
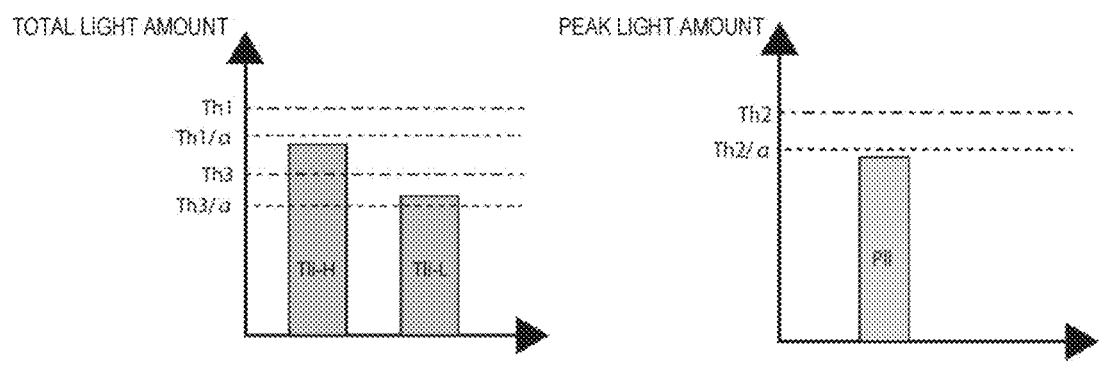

Specifically, as illustrated in FIG. 27, the light amount adjustment unit 210-2 adjusts the total light amount Tli on the basis of a value Th1/α obtained by dividing the first threshold value Th1 by the relative sensitivity α and a value Th3/α obtained by dividing the third threshold value Th3 by the relative sensitivity α, and adjusts the peak light amount Pli on the basis of a value Th2/α obtained by dividing the second threshold value Th2 by the relative sensitivity α. For example, as illustrated in FIG. 27A, in a case where the sensitivity of the user's eye to light is low (in a case of α<1), the light amount adjustment unit 210-2 adjusts the total light amount Tli to a target value equal to or lower than Th1/α (>Th1) and equal to or higher than Th3/α (>Th3) (for example, an intermediate value between Th1/α and Th3/α, a value Tli-H between the intermediate value and Th1/α, or a value Tli-L between the intermediate value and Th3/α), and adjusts the peak light amount Pli to a predetermined value equal to or lower than Th2/α (>Th2). For example, as illustrated in FIG. 27B, in a case where the sensitivity of the user's eye to light is high (in a case of α≥1), the light amount adjustment unit 210-2 adjusts the total light amount Tli to a target value equal to or lower than Th1/α (Th1) and equal to or higher than Th3/α (Th3) (for example, an intermediate value between Th1/α and Th3/α, a value Tli-H between the intermediate value and Th1/α, or a value Tli-L between the intermediate value and Th3/α), and adjusts the peak light amount Pli to a predetermined value equal to or lower than Th2/α (Th2).

In next step S2.85, the light amount adjustment unit 210-2 outputs the adjustment values of the signal values of all the pixels of the n-th frame.

In next step S2.86, the light amount adjustment unit 210-2 determines whether or not n<N (total number of frames of image data) is satisfied. In a case where the determination in this step is YES, the flow proceeds to step S2.87, and in a case where the determination in this step is NO, the flow is ended.

In step S2.87, the light amount adjustment unit 210-2 increments n. In a case where step S2.87 is executed, the flow returns to step S2.82.

As described above, in the image display device 20-3, the total light amount Tli is adjusted to be equal to or lower than the value Th1/α obtained by reflecting the sensitivity of the user to the first threshold value Th1 and equal to or higher than the value Th3/α obtained by reflecting the sensitivity of the user to the third threshold value Th3, and the peak light amount Pli is adjusted to be equal to or lower than the value Th2/α obtained by reflecting the sensitivity of the user to the second threshold value Th2, the total light amount Tli being a sum of the light amounts corresponding to the signal values for each pixel of each frame of the image data, and the peak light amount Pli being a light amount corresponding to the maximum value of the signal values. Therefore, even in a case where a size of the image (a size of the angle of view of the image light IL incident on the eyeball 1) changes between frames (for example, even in a case where switching is performed from a large image to a small image), in an image of a subsequent frame in addition to an image of a previous frame, the light amount is prevented from being excessive both as a whole and as a local part, and the light amount is prevented from being insufficient as a whole regardless of the user. Thus, any user is more reliably prevented from feeling glare, and any user is prevented from feeling poor visibility due to darkness as much as possible.

Figure 28:
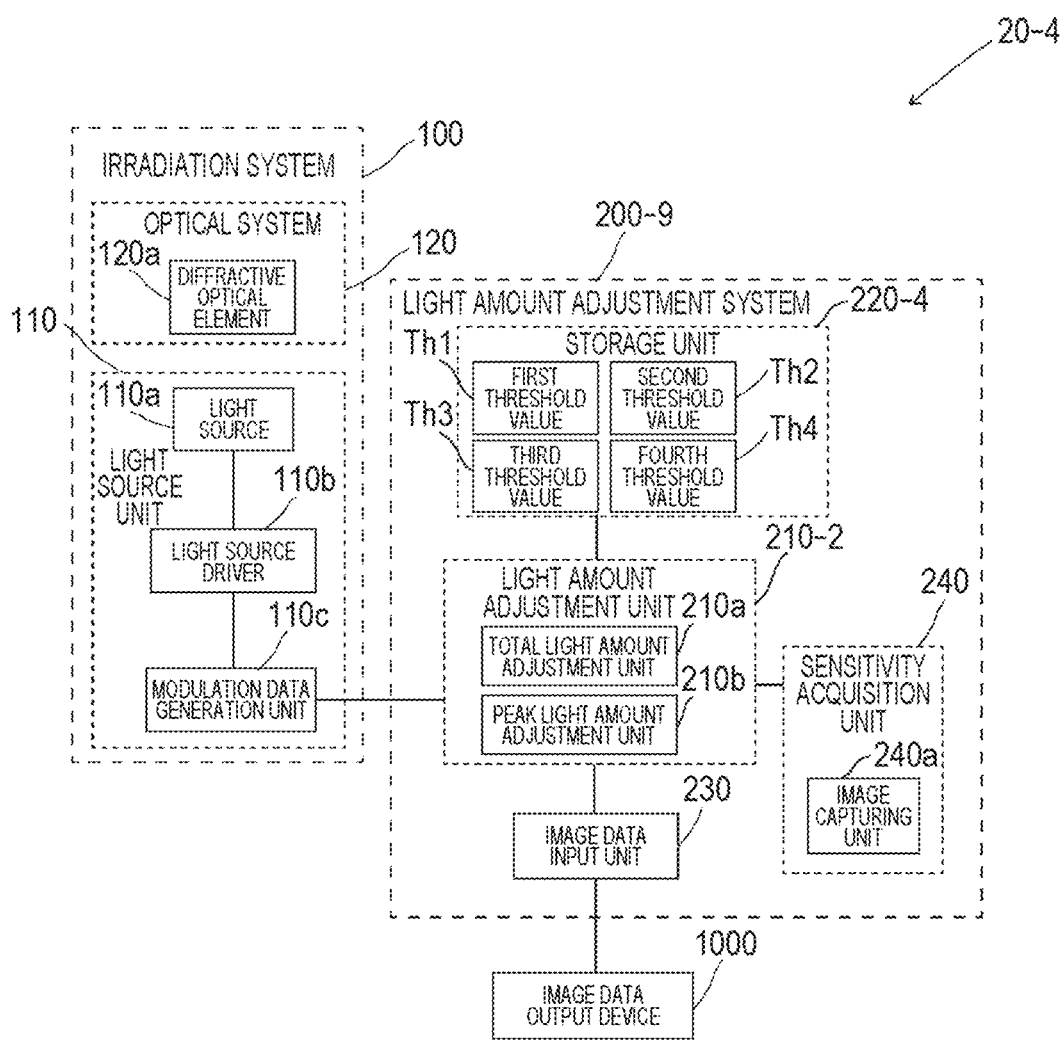
FIG. 28 is a block diagram illustrating functions of the image display device according to Example 4 of the second embodiment.

Image Display Device According to Example 4 of Second Embodiment of Present Technology As illustrated in FIG. 28, the image display device 20-4 according to Example 4 of the second embodiment has substantially the same configuration as the image display device 10-4 according to Example 4 of the first embodiment except that the light amount adjustment system 200-9 includes a sensitivity acquisition unit 240 that acquires a sensitivity of the user's eye to light.

In the light amount adjustment system 200-9, as an example, the light amount adjustment unit 210-2 adjusts the total light amount and the peak light amount on the basis of the acquisition result of the sensitivity acquisition unit 240.

By using the image display device 20-4 according to Example 4 of the second embodiment, it is possible to perform image display processing similar to the image display processing (refer to FIG. 3) performed using the image display device 10-1 according to Example 1 of the first embodiment. In the image display processing, light amount adjustment processing 9 as an example of the light amount adjustment processing (step S2 in FIG. 3) is performed.

(Light Amount Adjustment Processing 9)

Figure 29:
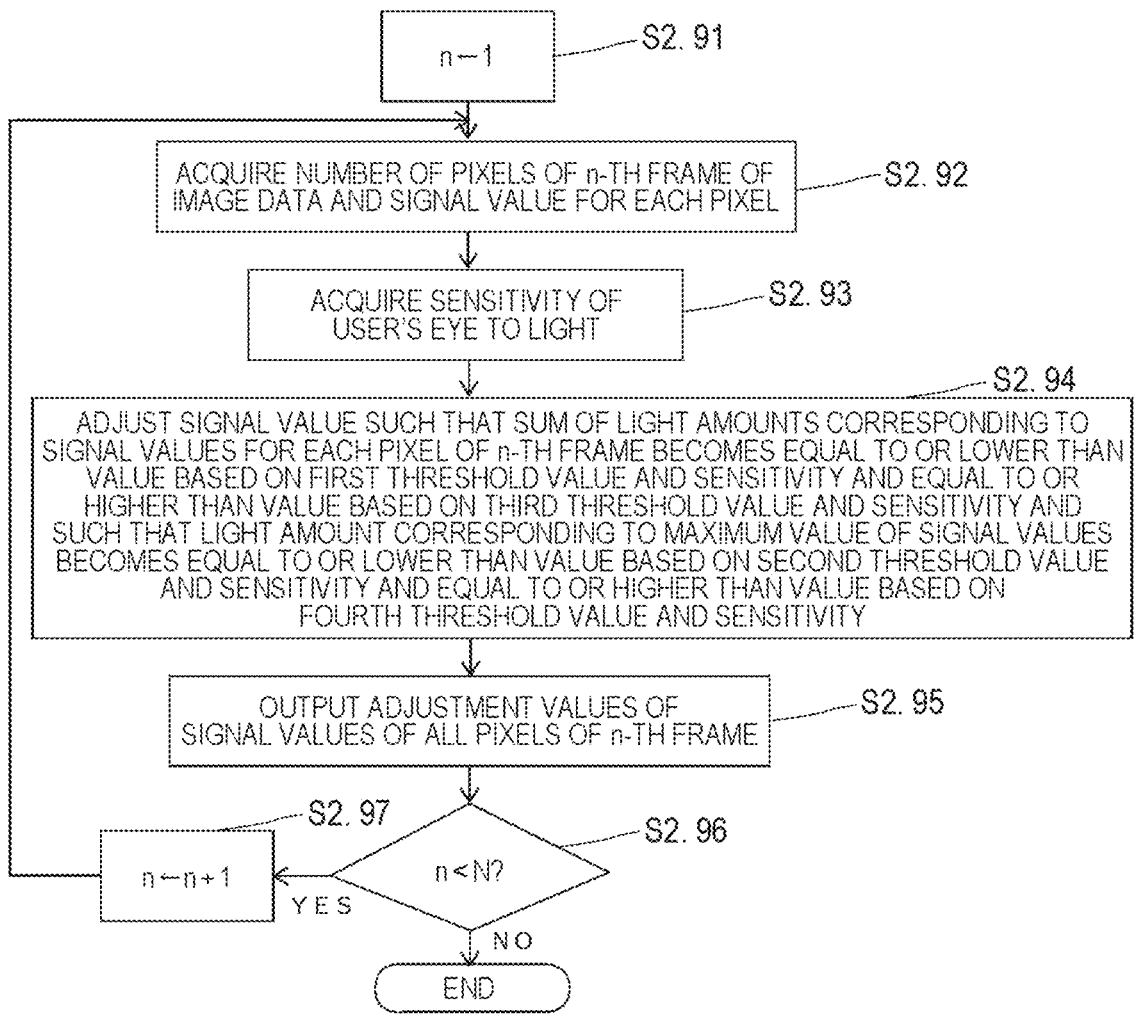
FIG. 29 is a flowchart for explaining light amount adjustment processing 9.

Hereinafter, the light amount adjustment processing 9 will be described with reference to a flowchart of FIG. 29. The light amount adjustment processing 8 is performed by the light amount adjustment system 200-9.

In first step S2.91, the light amount adjustment unit 210-2 sets n to 1.

In next step S2.92, the light amount adjustment unit 210-2 acquires the number of pixels of an n-th frame of the image data and the signal value for each pixel.

In next step S2.93, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240*a*, and acquires a sensitivity (for example, a relative sensitivity $\alpha$) of the user's eye to light from the acquired feature amount.

In next step S2.94, as illustrated in FIG. 30, the light amount adjustment unit 210-2 adjusts the signal value such that the total light amount Tli becomes equal to or lower than a value (for example, Th1/$\alpha$) based on the first threshold value Th1 and the sensitivity acquired in step S2.93 and equal to or higher than a value (for example, Th3/$\alpha$) based on the third threshold value Th3 and the sensitivity and such that the light amount becomes equal to or lower than a value (for example, Th2/$\alpha$) based on the second threshold value Th2 and the sensitivity and equal to or higher than a value (for example, Th4/$\alpha$) based on the fourth threshold value Th4 and the sensitivity, the total light amount Tli being a sum of the light amounts corresponding to the signal values for each pixel of the n-th frame, and the light amount being a light amount corresponding to the maximum value of the signal values.

Figure 30A:
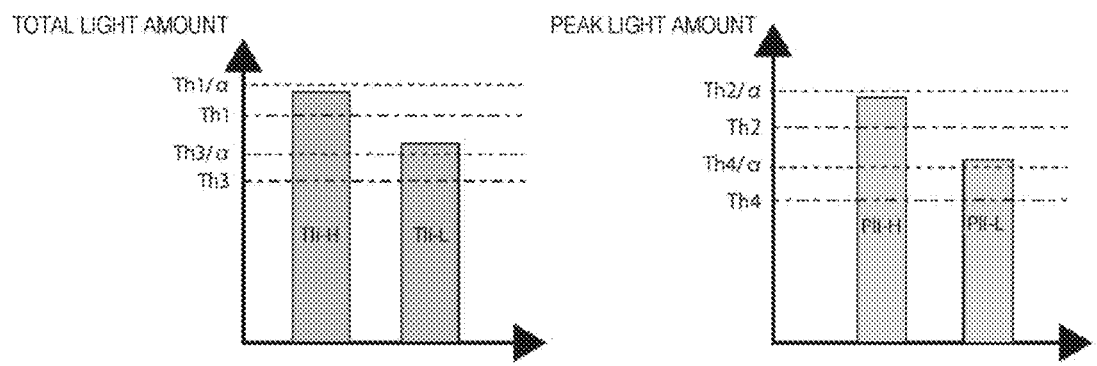
FIG. 30A and FIG. 30B are diagrams for explaining light amount adjustment processing 9.
Figure 30B:
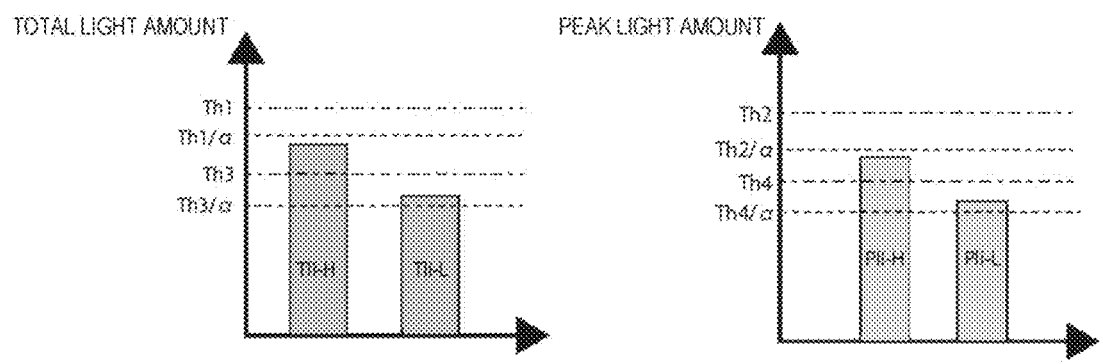

Specifically, as illustrated in FIG. 30, the light amount adjustment unit 210-2 adjusts the total light amount Tli on the basis of a value Th1/$\alpha$ obtained by dividing the first threshold value Th1 by the relative sensitivity $\alpha$ and a value Th3/$\alpha$ obtained by dividing the third threshold value Th3 by the relative sensitivity $\alpha$, and adjusts the peak light amount Pli on the basis of a value Th2/$\alpha$ obtained by dividing the second threshold value Th2 by the relative sensitivity $\alpha$ and a value Th4/$\alpha$ obtained by dividing the fourth threshold value Th4 by the relative sensitivity $\alpha$. For example, as illustrated in FIG. 30A, in a case where the sensitivity of the user's eye to light is low, the light amount adjustment unit 210-2 adjusts the total light amount Tli to a target value equal to or lower than Th1/$\alpha$ and equal to or higher than Th3/$\alpha$ (for example, an intermediate value between Th1/$\alpha$ and Th3/$\alpha$, a value Tli-H between the intermediate value and Th1/$\alpha$, a value Tli-L between the intermediate value and Th3/$\alpha$, or the like), and adjusts the peak light amount Pli to a target value equal to or lower than Th2/$\alpha$ and equal to or higher than Th4/$\alpha$ (for example, an intermediate value between Th2/$\alpha$ and Th4/$\alpha$, a value Pli-H between the intermediate value and Th2/$\alpha$, a value Pli-L between the intermediate value and Th4/$\alpha$, or the like). For example, as illustrated in FIG. 30B, in a case where the sensitivity of the user's eye to light is high, the light amount adjustment unit 210-2 adjusts the total light amount Tli to a target value equal to or lower than Th1/$\alpha$ and equal to or higher than Th3/$\alpha$ (for example, an intermediate value between Th1/$\alpha$ and Th3/$\alpha$, a value Tli-H between the intermediate value and Th1/$\alpha$, a value Tli-L between the intermediate value and Th3/$\alpha$, or the like), and adjusts the peak light amount Pli to a target value equal to or lower than Th2/$\alpha$ and equal to or higher than Th4/$\alpha$ (for example, an intermediate value between Th2/$\alpha$ and Th4/$\alpha$, a value Pli-H between the intermediate value and Th2/$\alpha$, a value Pli-L between the intermediate value and Th4/$\alpha$, or the like). Note that each of the target values is, for example, an appropriate value (preferably, an optimum value) regarding visibility of the user.

In next step S2.95, the light amount adjustment unit 210-2 outputs the adjustment values of the signal values of all the pixels of the n-th frame.

In next step S2.96, the light amount adjustment unit 210-2 determines whether or not n<N (total number of frames of image data) is satisfied. In a case where the determination in this step is YES, the flow proceeds to step S2.97, and in a case where the determination in this step is NO, the flow is ended.

In step S2.97, the light amount adjustment unit 210-2 increments n. In a case where step S2.97 is executed, the flow returns to step S2.92.

As described above, the total light amount Tli is adjusted to be equal to or lower than the value Th1/$\alpha$ obtained by reflecting the sensitivity of the user to the first threshold value Th1 and equal to or higher than the value Th3/$\alpha$ obtained by reflecting the sensitivity of the user to the third threshold value Th3, and the peak light amount Pli is adjusted to be equal to or lower than the value Th2/$\alpha$ obtained by reflecting the sensitivity of the user to the second threshold value Th2 and equal to or higher than the value Th4/$\alpha$ obtained by reflecting the sensitivity of the user to the fourth threshold value Th4, the total light amount Tli being a sum of the light amounts corresponding to the signal values for each pixel of each frame of the image data, and the peak light amount Pli being a light amount corresponding to the maximum value of the signal values. Therefore, even in a case where a size of the image (a size of the angle of view of the image light IL incident on the eyeball 1) changes between frames (for example, even in a case where switching is performed from a large image to a small image), in an image of a subsequent frame in addition to an image of a previous frame, the light amount is prevented from being excessive both as a whole and as a local part, and the light amount is prevented from being insufficient both as a whole and as a local part regardless of the user. Thus, any user is more reliably prevented from feeling glare, and any user is more reliably prevented from feeling poor visibility due to darkness.

Figure 31:
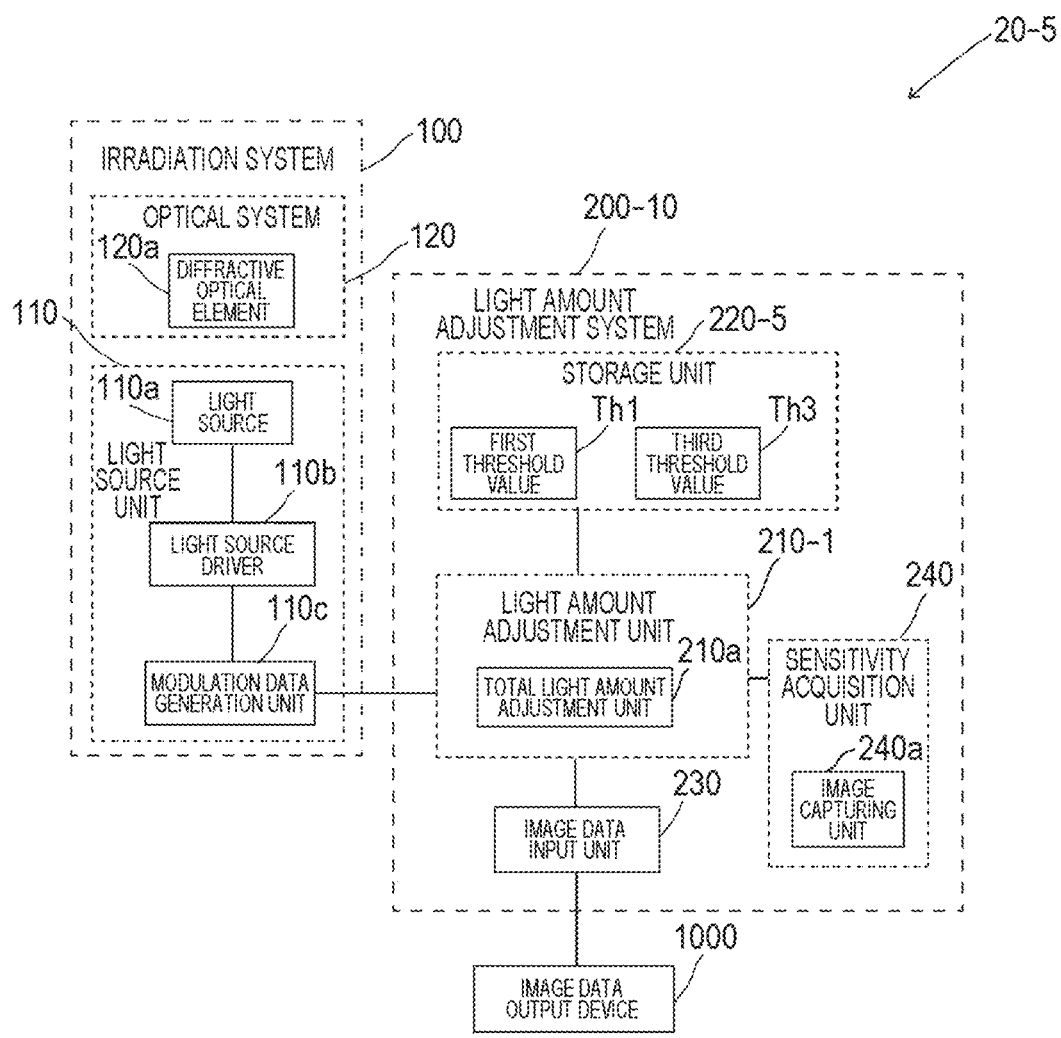
FIG. 31 is a block diagram illustrating functions of the image display device according to Example 5 of the second embodiment.

Image Display Device According to Example 5 of Second Embodiment of Present Technology As illustrated in FIG. 31, the image display device 20-5 according to Example 5 of the second embodiment has substantially the same configuration as the image display device 10-5 according to Example 5 of the first embodiment except that the light amount adjustment system 200-10 includes a sensitivity acquisition unit 240 that acquires a sensitivity of the user's eye to light.

In the light amount adjustment system 200-10, as an example, the light amount adjustment unit 210-1 adjusts the total light amount on the basis of the acquisition result of the sensitivity acquisition unit 240.

By using the image display device 20-5 according to Example 5 of the second embodiment, it is possible to perform image display processing similar to the image display processing (refer to FIG. 3) performed using the image display device 10-1 according to Example 1 of the first embodiment. In the image display processing, light amount adjustment processing 10 as an example of the light amount adjustment processing (step S2 in FIG. 3) is performed.

(Light Amount Adjustment Processing 10)

Figure 32:
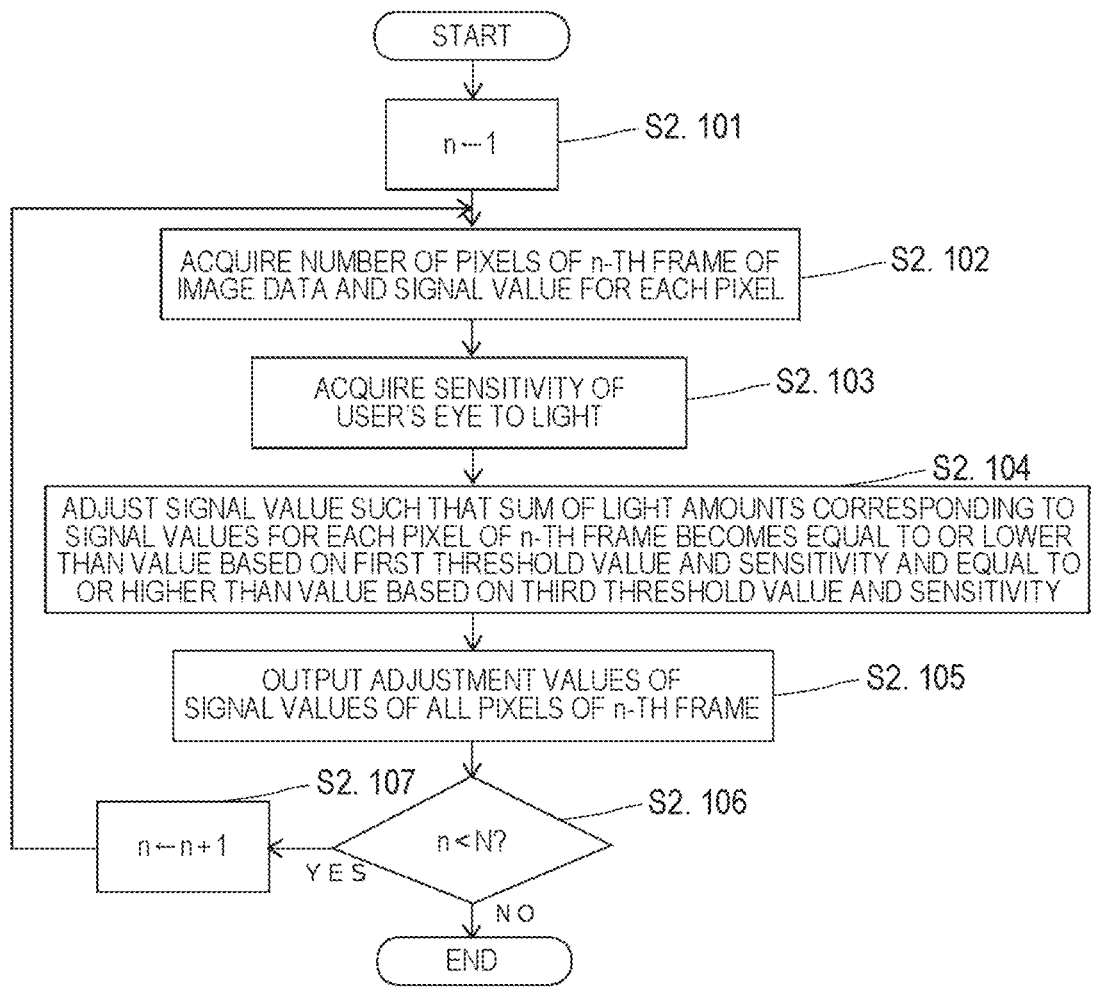
FIG. 32 is a flowchart for explaining light amount adjustment processing 10.

Hereinafter, the light amount adjustment processing 10 will be described with reference to a flowchart of FIG. 32. The light amount adjustment processing 10 is performed by the light amount adjustment system 200-10.

In first step S2.101, the light amount adjustment unit 210-1 sets n to 1.

In next step S2.102, the light amount adjustment unit 210-1 acquires the number of pixels of an n-th frame of the image data and the signal value for each pixel.

In next step S2.103, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity (for example, a relative sensitivity $\alpha$) of the user's eye to light from the acquired feature amount.

In next step S2.104, as illustrated in FIG. 33, the light amount adjustment unit 210-1 adjusts the signal value such that the total light amount Tli becomes equal to or lower than a value (for example, Th1/$\alpha$) based on the first threshold value Th1 and the sensitivity acquired in step S2.103 and equal to or higher than a value (for example, Th3/$\alpha$) based on the third threshold value Th3 and the sensitivity, the total light amount Tli being a sum of the light amounts corresponding to the signal values for each pixel of the n-th frame.

Figure 33A:
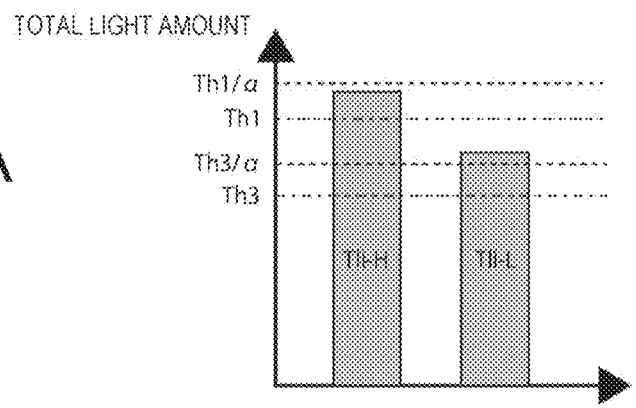
FIG. 33A and FIG. 33B are diagrams for explaining light amount adjustment processing 10.
Figure 33B:
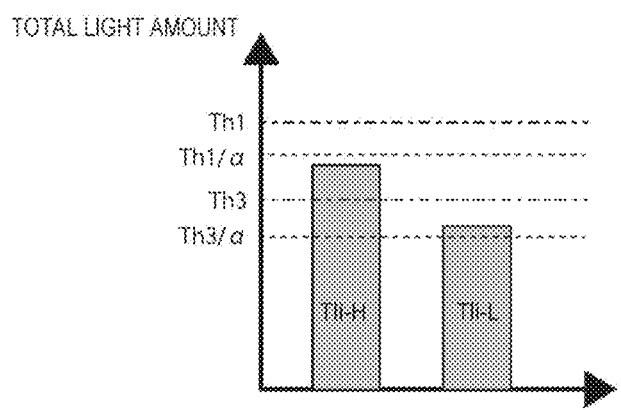

Specifically, the light amount adjustment unit 210-1 adjusts the total light amount Tli on the basis of a value Th1/$\alpha$ obtained by dividing the first threshold value Th1 by the relative sensitivity $\alpha$ and a value obtained by dividing the third threshold value Th3 by the relative sensitivity $\alpha$. For example, as illustrated in FIG. 33A, in a case where the sensitivity of the user's eye to light is low (in a case of $\alpha$<1), the light amount adjustment unit 210-1 adjusts the total light amount Tli to a target value equal to or lower than Th1/$\alpha$ (>Th1) and equal to or higher than Th3/$\alpha$ (>Th3) (for example, an intermediate value between Th1/$\alpha$ and Th3/$\alpha$, a value Tli-H between the intermediate value and Th1/$\alpha$, a value Tli-L between the intermediate value and Th3/$\alpha$, or the like). For example, as illustrated in FIG. 33B, in a case where the sensitivity of the user's eye to light is high (in a case of $\alpha \geq 1$), the light amount adjustment unit 210-1 adjusts the total light amount Tli to a target value equal to or lower than Th1/$\alpha$ (Th1) and equal to or higher than Th3/$\alpha$ (Th3) (for example, an intermediate value between Th1/$\alpha$ and Th3/$\alpha$, a value Tli-H between the intermediate value and Th1/$\alpha$, a value Tli-L between the intermediate value and Th3/$\alpha$, or the like). Note that each of the target values is, for example, an appropriate value (preferably, an optimum value) regarding visibility of the user.

In next step S2.105, the light amount adjustment unit 210-1 outputs the adjustment values of the signal values of all the pixels of the n-th frame.

In next step S2.106, the light amount adjustment unit 210-1 determines whether or not n<N (total number of frames of image data) is satisfied. In a case where the determination in this step is YES, the flow proceeds to step S2.107, and in a case where the determination in this step is NO, the flow is ended.

In step S2.107, the light amount adjustment unit 210-1 increments n. In a case where step S2.107 is executed, the flow returns to step S2.102.

As described above, in the image display device 20-5, the total light amount Tli is adjusted to be equal to or lower than the value Th1/$\alpha$ obtained by reflecting the sensitivity of the user to the first threshold value Th1 and equal to or higher than the value Th3/$\alpha$ obtained by reflecting the sensitivity of the user to the third threshold value Th3, the total light amount Tli being a sum of the light amounts corresponding to the signal values for each pixel of each frame of the image data. Therefore, even in a case where a size of the image (a size of the angle of view of the image light IL incident on the eyeball 1) changes between frames (for example, even in a case where switching from a large image to a small image is performed), the light amount is prevented from being excessive as a whole and the light amount is prevented from being insufficient as a whole regardless of the user in an image of a subsequent frame in addition to an image of a previous frame. Thus, any user is more reliably prevented from feeling glare as much as possible.

7. <Image Display Device According to Examples 1 to 5 of Third Embodiment of Present Technology>

Hereinafter, image display devices 30-1 to 30-5 according to Examples 1 to 5 of a third embodiment of the present technology will be described.

By the way, the first threshold value Th1 used in the image display devices 10-1 to 10-5 and 20-1 to 20-5 according to Examples 1 to 5 of the first and second embodiments is set on the basis of, for example, a human standard sensitivity based on a spatial glare index or the like, an average value of sensitivities of a plurality of persons, or the like. As a result, the first threshold value Th1 is not necessarily an appropriate value depending on the user. The second threshold value Th2 used in the image display devices 10-2 to 10-4 and 20-2 to 20-4 according to Examples 2 to 4 of the first and second embodiments, the third threshold value Th3 used in the image display devices 10-3, 10-4, 20-3, and 20-4 according to Examples 3 and 4 of the first and second embodiments, and the fourth threshold value Th4 used in the image display devices 10-4 and 20-4 according to Example 4 of the first and second embodiments have a limit similar to the limit of the first threshold value Th1.

Therefore, in the image display devices 30-1 to 30-5 according to Examples 1 to 5 of the third embodiment, the first threshold value Th1 is changed to a value appropriate (preferably, optimum) for the user as necessary. In the image display devices 30-2 to 30-4 according to Examples 2 to 4 of the third embodiment, the second threshold value Th2 is changed to a value appropriate (preferably, optimum) for the user as necessary. In the image display devices 30-3 and 30-4 according to Examples 3 and 4 of the third embodiment, the third threshold value Th3 is changed to a value appropriate (preferably, optimum) for the user as necessary. In the image display device 30-4 according to Example 4 of the third embodiment, the fourth threshold value Th4 is changed to a value appropriate (preferably, optimum) for the user as necessary.

Figure 34:
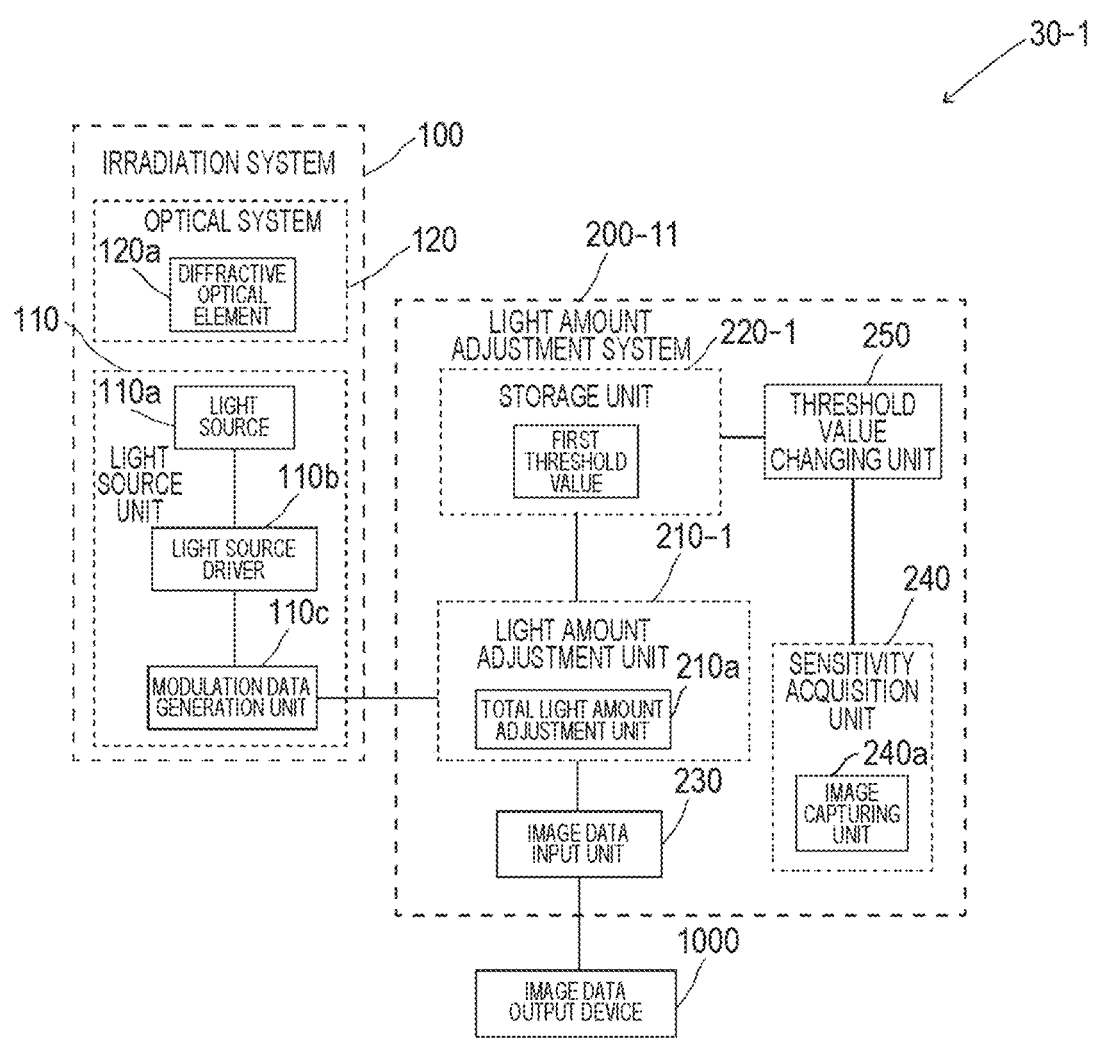
FIG. 34 is a block diagram illustrating functions of the image display device according to Example 1 of a third embodiment.

Image Display Device According to Example 1 of Third Embodiment of Present Technology As illustrated in FIG. 34, the image display device 30-1 according to Example 1 of the third embodiment has substantially the same configuration as the image display device 20-1 according to Example 1 of the second embodiment except that the light amount adjustment system 200-11 includes a threshold value changing unit 250. The threshold value changing unit 250 is configured by, for example, a CPU, an FPGA, or the like.

In the light amount adjustment system 200-11, as an example, the threshold value changing unit 250 changes the first threshold value according to the acquisition result of the sensitivity acquisition unit 240, and the light amount adjustment unit 210-1 adjusts the total light amount to be equal to or lower than the changed first threshold value.

By using the image display device 30-1 according to Example 1 of the third embodiment, it is possible to perform image display processing similar to the image display processing (refer to FIG. 3) performed using the image display device 10-1 according to Example 1 of the first embodiment. In the image display processing, light amount adjustment processing 11 as an example of the light amount adjustment processing (step S2 in FIG. 3) is performed.

(Light Amount Adjustment Processing 11)

Figure 35:
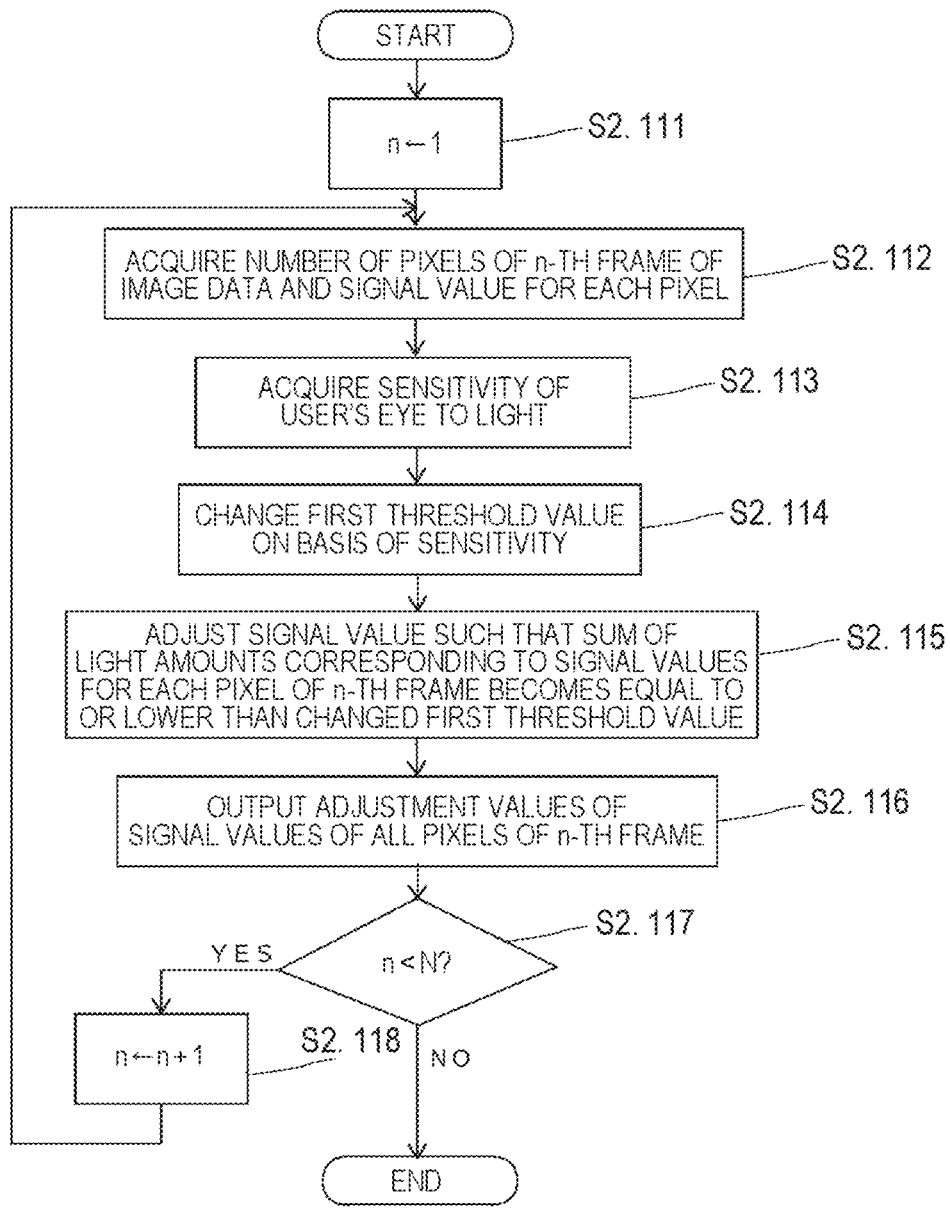
FIG. 35 is a flowchart for explaining light amount adjustment processing 11.

Hereinafter, the light amount adjustment processing 11 will be described with reference to a flowchart of FIG. 35. The light amount adjustment processing 11 is performed by the light amount adjustment system 200-11.

In first step S2.111, the light amount adjustment unit 210-1 sets n to 1.

In next step S2.112, the light amount adjustment unit 210-1 acquires the number of pixels of an n-th frame of the image data and the signal value for each pixel.

In next step S2.113, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity (for example, a relative sensitivity α) of the user's eye to light from the acquired feature amount.

In next step S2.114, the threshold value changing unit 250 changes the first threshold value on the basis of the sensitivity acquired in step S2.113. Specifically, as illustrated in FIG. 36, the first threshold value is changed from Th1 to Th1' (for example, Th1/α). Note that, for example, in a case where the relative sensitivity α is 1, the first threshold value is substantially unchanged.

In next step S2.115, as illustrated in FIG. 36, the light amount adjustment unit 210-1 adjusts the signal value such that the total light amount Tli becomes equal to or lower than the changed first threshold value Th1', the total light amount Tli being a sum of the light amounts corresponding to the signal values for each pixel of the n-th frame.

Figure 36A:
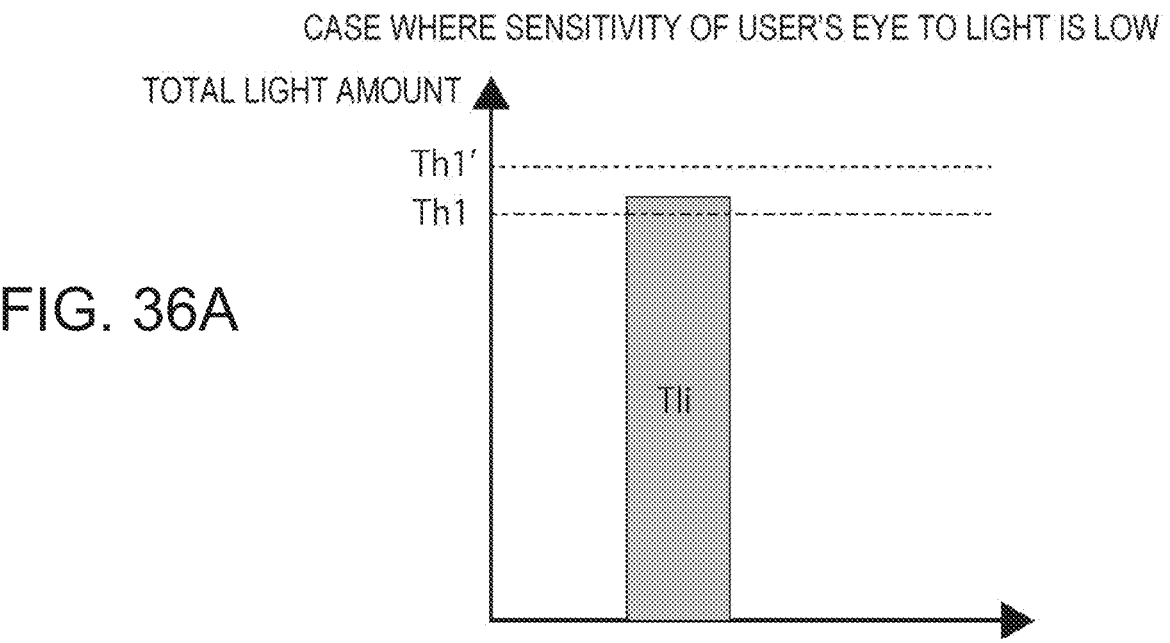
FIG. 36A and FIG. 36B are diagrams for explaining light amount adjustment processing 11.
Figure 36B:
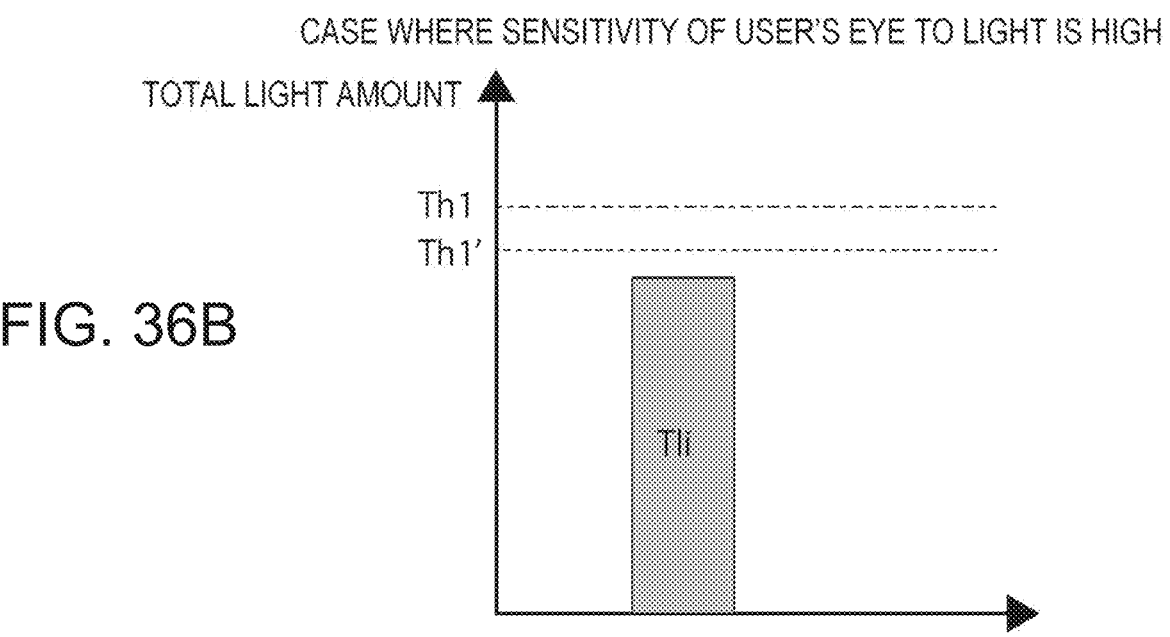

For example, as illustrated in FIG. 36A, in a case where the sensitivity of the user's eye to light is low (in a case of α<1), the light amount adjustment unit 210-1 adjusts the total light amount Tli to a predetermined value equal to or lower than the changed first threshold value Th1' (for example, Th1/α>Th1). For example, as illustrated in FIG. 36B, in a case where the sensitivity of the user's eye to light is high (in a case of α≥1), the light amount adjustment unit 210-1 adjusts the total light amount Tli to a predetermined value equal to or lower than the changed first threshold value Th1' (for example, Th1/α≤Th1).

In next step S2.116, the light amount adjustment unit 210-1 outputs the adjustment values of the signal values of all the pixels of the n-th frame.

In next step S2.117, the light amount adjustment unit 210-1 determines whether or not n<N (total number of frames of image data) is satisfied. In a case where the determination in this step is YES, the flow proceeds to step S2.118, and in a case where the determination in this step is NO, the flow is ended.

In step S2.118, the light amount adjustment unit 210-1 increments n. In a case where step S2.118 is executed, the flow returns to step S2.112.

Even in the image display device 30-1 described above and the image display method using the image display device 30-1, the same effects as the effects of the image display device 20-1 according to Example 1 of the second embodiment and the image display method using the image display device 20-1 can be obtained.

Figure 37:
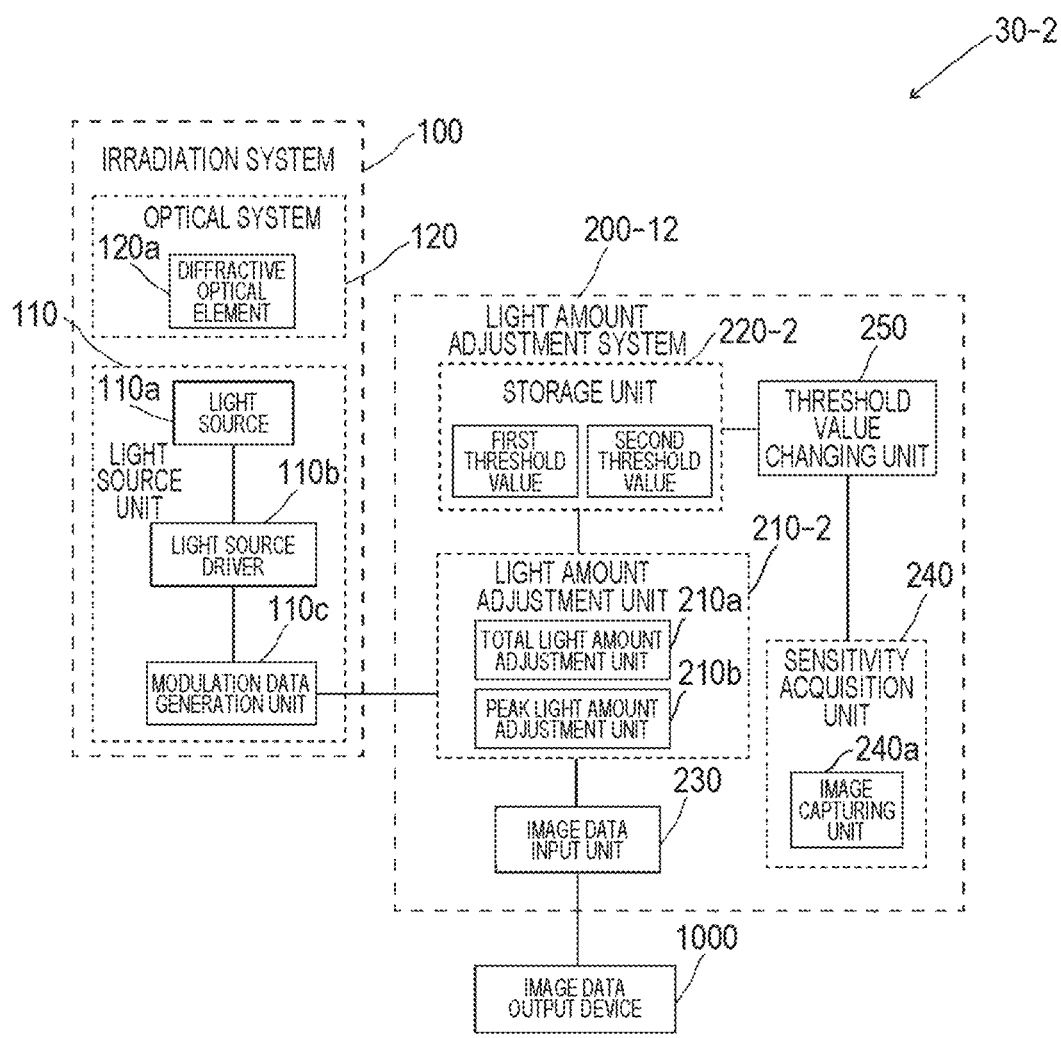
FIG. 37 is a block diagram illustrating functions of the image display device according to Example 2 of the third embodiment.

Image Display Device According to Example 2 of Third Embodiment of Present Technology As illustrated in FIG. 37, the image display device 30-2 according to Example 2 of the third embodiment has substantially the same configuration as the image display device 20-2 according to Example 2 of the second embodiment except that the light amount adjustment system 200-12 includes the threshold value changing unit 250. The threshold value changing unit 250 is configured by, for example, a CPU, an FPGA, or the like.

In the light amount adjustment system 200-12, as an example, the threshold value changing unit 250 changes the first threshold value Th1 and the second threshold value Th2 according to the acquisition result of the sensitivity acquisition unit 240, and the light amount adjustment unit 210-2 adjusts the total light amount to be equal to or lower than the changed first threshold value and adjusts the peak light amount to be equal to or lower than the changed second threshold value.

By using the image display device 30-2 according to Example 2 of the third embodiment, it is possible to perform image display processing similar to the image display processing (refer to FIG. 3) performed using the image display device 10-1 according to Example 1 of the first embodiment. In the image display processing, light amount adjustment processing 12 as an example of the light amount adjustment processing (step S2 in FIG. 3) is performed.

(Light Amount Adjustment Processing 12)

Figure 38:
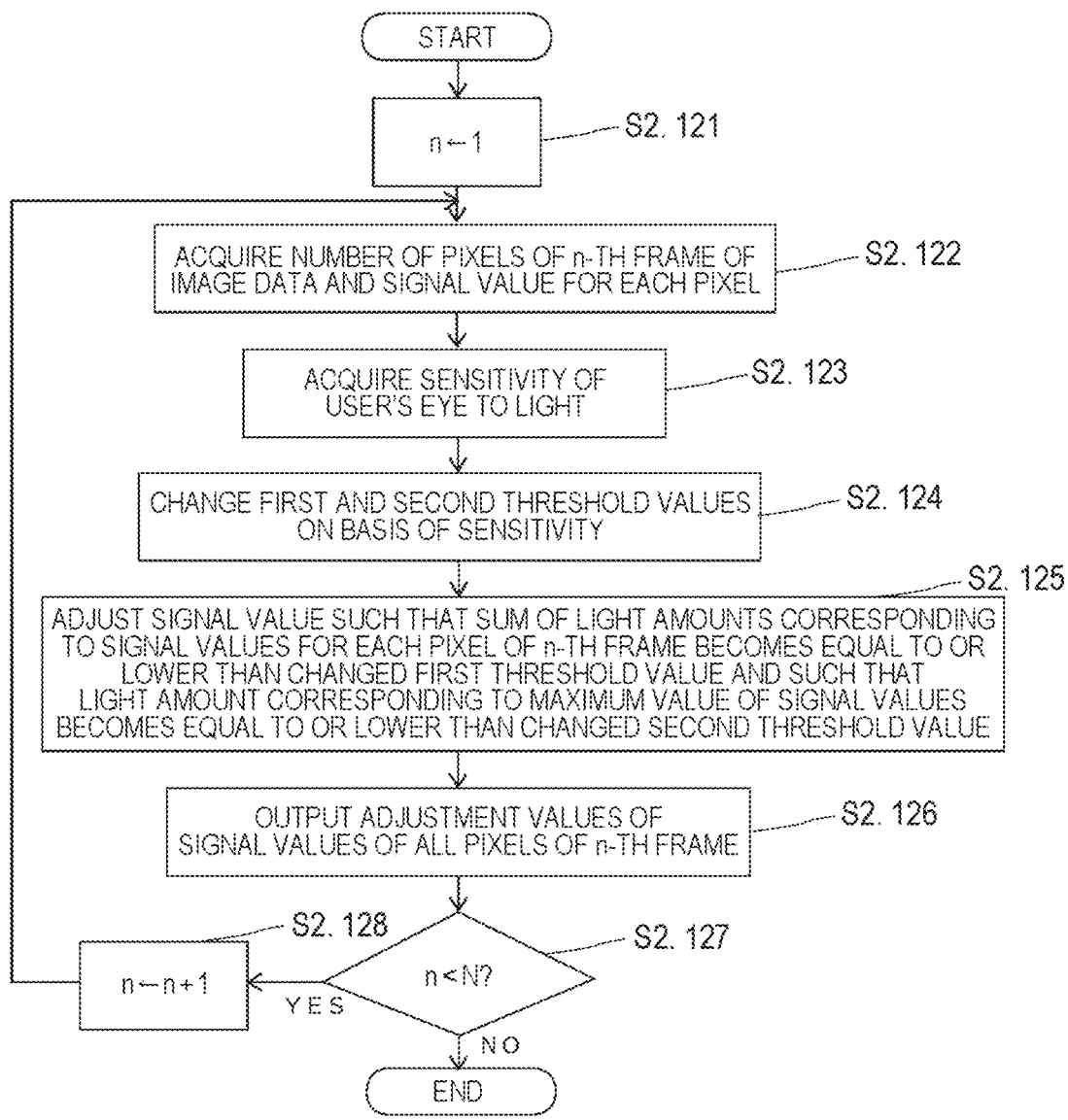
FIG. 38 is a flowchart for explaining light amount adjustment processing 12.

Hereinafter, the light amount adjustment processing 12 will be described with reference to a flowchart of FIG. 38. The light amount adjustment processing 12 is performed by the light amount adjustment system 200-12.

In first step S2.121, the light amount adjustment unit 210-2 sets n to 1.

In next step S2.122, the light amount adjustment unit 210-2 acquires the number of pixels of an n-th frame of the image data and the signal value for each pixel.

In next step S2.123, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity (for example, a relative sensitivity $\alpha$) of the user's eye to light from the acquired feature amount.

In next step S2.124, the threshold value changing unit 250 changes the first and second threshold values Th1 and Th2 on the basis of the sensitivity acquired in step S2.123.

Specifically, as illustrated in FIG. 39, the first threshold value is changed from Th1 to Th1' (for example, Th1/$\alpha$), and the second threshold value is changed from Th2 to Th2' (for example, Th2/$\alpha$). Note that, for example, in a case where the relative sensitivity $\alpha$ is 1, the first threshold value and the second threshold value are substantially unchanged.

In next step S2.125, as illustrated in FIG. 39, the light amount adjustment unit 210-2 adjusts the signal value such that the total light amount Tli becomes equal to or lower than the changed first threshold value Th1' and such that the light amount becomes equal to or lower than the changed second threshold value Th2', the total light amount Tli being a sum of the light amounts corresponding to the signal values for each pixel of the n-th frame, and the light amount being a light amount corresponding to the maximum value of the signal values.

Figure 39A:
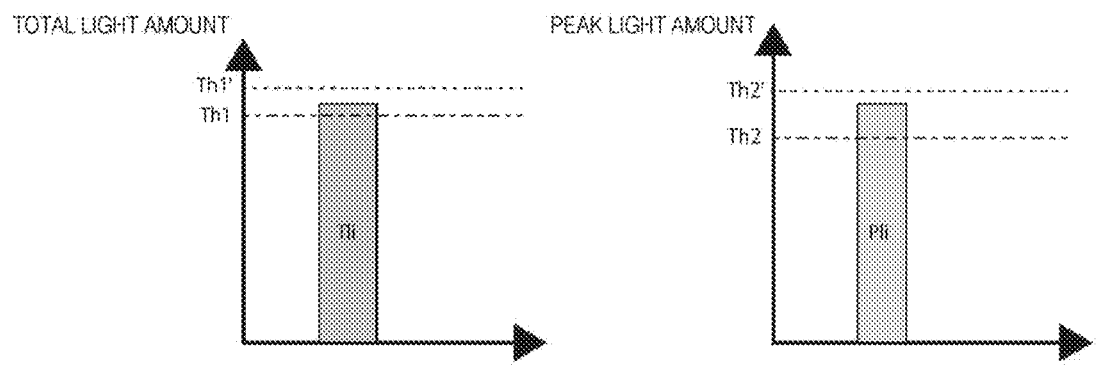
FIG. 39A and FIG. 39B are diagrams for explaining light amount adjustment processing 12.
Figure 39B:
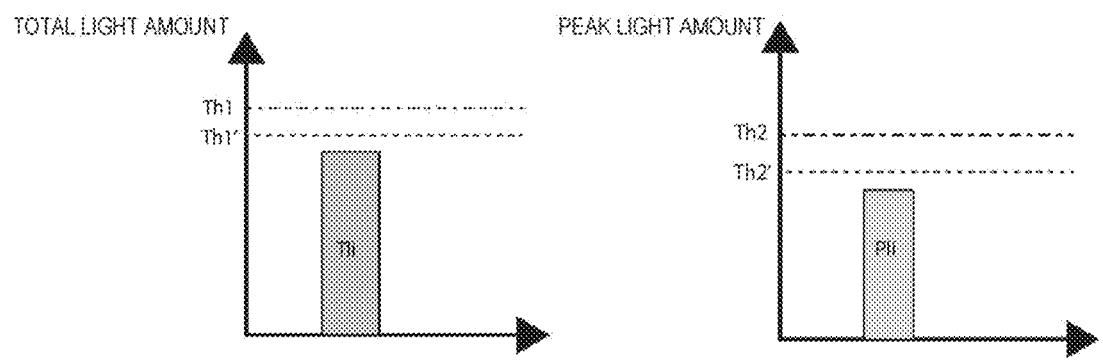

For example, as illustrated in FIG. 39A, in a case where the sensitivity of the user's eye to light is low (in a case of $\alpha<1$), the light amount adjustment unit 210-2 adjusts the total light amount Tli to a predetermined value equal to or lower than the changed first threshold value Th1' (for example, Th1/$\alpha$>Th1), and adjusts the peak light amount Pli to a predetermined value equal to or lower than the changed second threshold value Th2' (for example, Th2/$\alpha$>Th2). For example, as illustrated in FIG. 39B, in a case where the sensitivity of the user's eye to light is high (in a case of $\alpha\geq1$), the light amount adjustment unit 210-2 adjusts the total light amount Tli to a predetermined value equal to or lower than the changed first threshold value Th1' (for example, Th1/$\alpha\leq$Th1), and adjusts the peak light amount Pli to a predetermined value equal to or lower than the changed second threshold value Th2' (for example, Th2/$\alpha\leq$Th2).

In next step S2.126, the light amount adjustment unit 210-2 outputs the adjustment values of the signal values of all the pixels of the n-th frame.

In next step S2.127, the light amount adjustment unit 210-2 determines whether or not n<N (total number of frames of image data) is satisfied. In a case where the determination in this step is YES, the flow proceeds to step S2.128, and in a case where the determination in this step is NO, the flow is ended.

In step S2.128, the light amount adjustment unit 210-2 increments n. In a case where step S2.128 is executed, the flow returns to step S2.122.

Even in the image display device 30-2 described above and the image display method using the image display device 30-2, the same effects as the effects of the image display device 20-2 according to Example 2 of the second embodiment and the image display method using the image display device 20-2 can be obtained.

Figure 40:
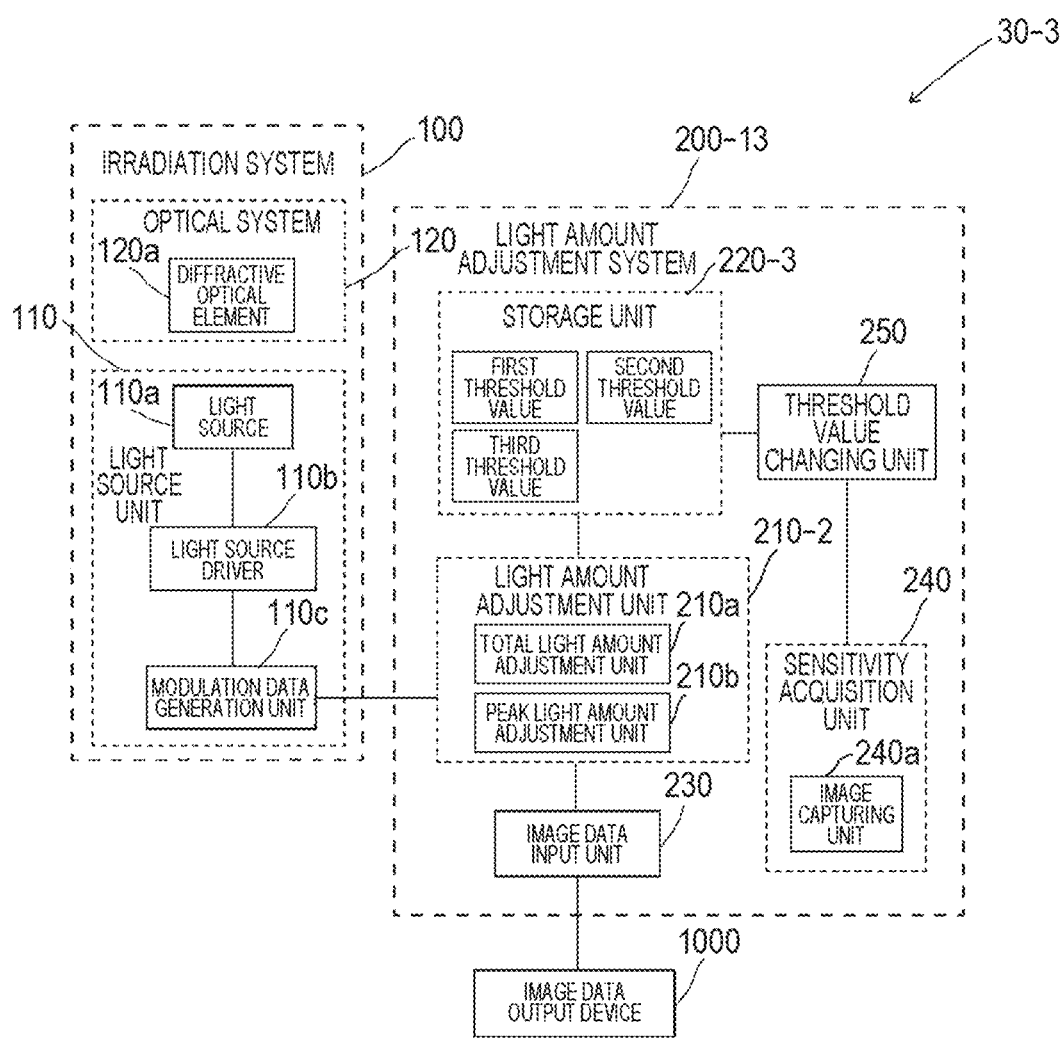
FIG. 40 is a block diagram illustrating functions of the image display device according to Example 3 of the third embodiment.

Image Display Device According to Example 3 of Third Embodiment of Present Technology As illustrated in FIG. 40, the image display device 30-3 according to Example 3 of the third embodiment has substantially the same configuration as the image display device 20-3 according to Example 3 of the second embodiment except that the light amount adjustment system 200-13 includes the threshold value changing unit 250. The threshold value changing unit 250 is configured by, for example, a CPU, an FPGA, or the like.

In the light amount adjustment system 200-13, as an example, the threshold value changing unit 250 changes the first threshold value, the second threshold value, and the third threshold value according to the acquisition result of the sensitivity acquisition unit 240, and the light amount adjustment unit 210-2 adjusts the total light amount to be equal to or lower than the changed first threshold value and equal to or higher than the changed third threshold value and adjusts the peak light amount to be equal to or lower than the changed second threshold value.

By using the image display device 30-3 according to Example 3 of the third embodiment, it is possible to perform image display processing similar to the image display processing (refer to FIG. 3) performed using the image display device 10-1 according to Example 1 of the first embodiment. In the image display processing, light amount adjustment processing 13 as an example of the light amount adjustment processing (step S2 in FIG. 3) is performed.

(Light Amount Adjustment Processing 13)

Hereinafter, the light amount adjustment processing 13 will be described with reference to a flowchart of FIG. 41. The light amount adjustment processing 13 is performed by the light amount adjustment system 200-13.

In first step S2.131, the light amount adjustment unit 210-2 sets n to 1.

In next step S2.132, the light amount adjustment unit 210-2 acquires the number of pixels of an n-th frame of the image data and the signal value for each pixel.

In next step S2.133, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity (for example, a relative sensitivity $\alpha$) of the user's eye to light from the acquired feature amount.

In next step S2.134, the threshold value changing unit 250 changes the first threshold value, the second threshold value, and the third threshold value on the basis of the sensitivity acquired in step S2.133.

Specifically, as illustrated in FIG. 42, the first threshold value is changed from Th1 to Th1' (for example, Th1/$\alpha$), the second threshold value is changed from Th2 to Th2' (for example, Th2/$\alpha$), and the third threshold value is changed from Th3 to Th3' (for example, Th3/$\alpha$). Note that, for example, in a case where the relative sensitivity $\alpha$ is 1, the first to third threshold values are substantially unchanged.

In next step S2.135, as illustrated in FIG. 42, the light amount adjustment unit 210-2 adjusts the signal value such that the total light amount Tli becomes equal to or lower than the changed first threshold value Th1' and equal to or higher than the changed third threshold value Th3' and such that the light amount becomes equal to or lower than the changed second threshold value Th2', the total light amount Tli being a sum of the light amounts corresponding to the signal values for each pixel of the n-th frame, and the light amount being a light amount corresponding to the maximum value of the signal values.

Figure 42A:
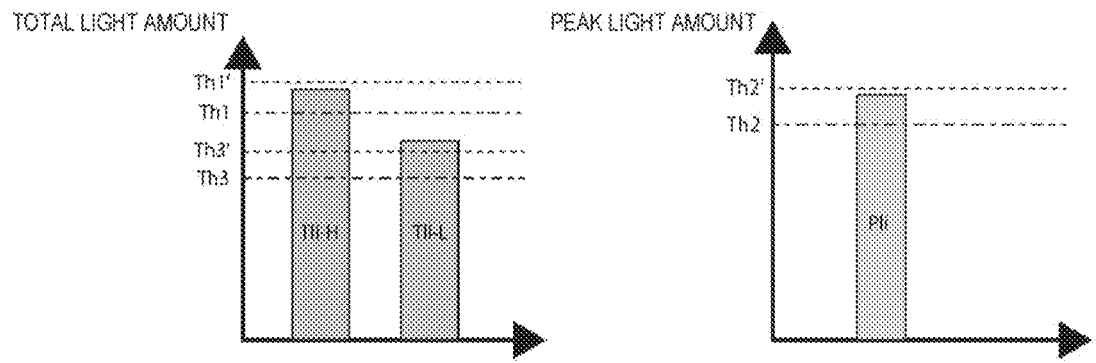
FIG. 42A and FIG. 42B are diagrams for explaining light amount adjustment processing 13.
Figure 42B:
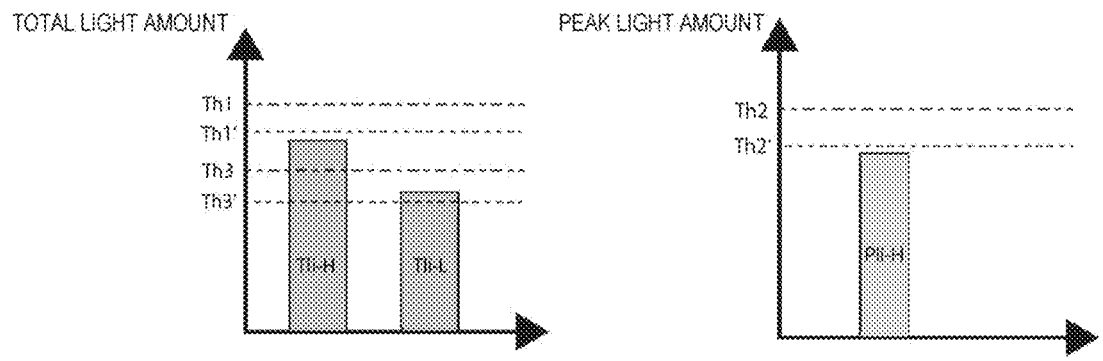

For example, as illustrated in FIG. 42A, in a case where the sensitivity of the user's eye to light is low (in a case of α<1), the light amount adjustment unit 210-2 adjusts the total light amount Tli to a target value equal to or lower than the changed first threshold value Th1' (for example, Th1/α>Th1) and equal to or higher than the changed third threshold value Th3' (for example, Th3/α>Th3) (for example, an intermediate value between Th1' and Th3', a value Tli-H between the intermediate value and Th1', a value Tli-L between the intermediate value and Th3', or the like), and adjusts the peak light amount Pli to a predetermined value equal to or lower than the changed second threshold value Th2' (for example, Th2/α>Th2). For example, as illustrated in FIG. 42B, in a case where the sensitivity of the user's eye to light is high (in a case of α≥1), the light amount adjustment unit 210-2 adjusts the total light amount Tli to a target value equal to or lower than the changed first threshold value Th1' (for example, Th1/α≤Th1) and equal to or higher than the changed third threshold value Th3' (for example, Th3/α≤Th3) (for example, an intermediate value between Th1' and Th3', a value Tli-H between the intermediate value and Th1', a value Tli-L between the intermediate value and Th3', or the like), and adjusts the peak light amount Pli to a predetermined value equal to or lower than the changed second threshold value Th2' (for example, Th2/α≤Th2).

In next step S2.136, the light amount adjustment unit 210-2 outputs the adjustment values of the signal values of all the pixels of the n-th frame.

In next step S2.137, the light amount adjustment unit 210-2 determines whether or not n<N (total number of frames of image data) is satisfied. In a case where the determination in this step is YES, the flow proceeds to step S2.138, and in a case where the determination in this step is NO, the flow is ended.

In step S2.138, the light amount adjustment unit 210-2 increments n. In a case where step S2.138 is executed, the flow returns to step S2.132.

Even in the image display device 30-3 described above and the image display method using the image display device 30-3, the same effects as the effects of the image display device 20-3 according to Example 3 of the second embodiment and the image display method using the image display device 20-3 can be obtained.

Figure 43:
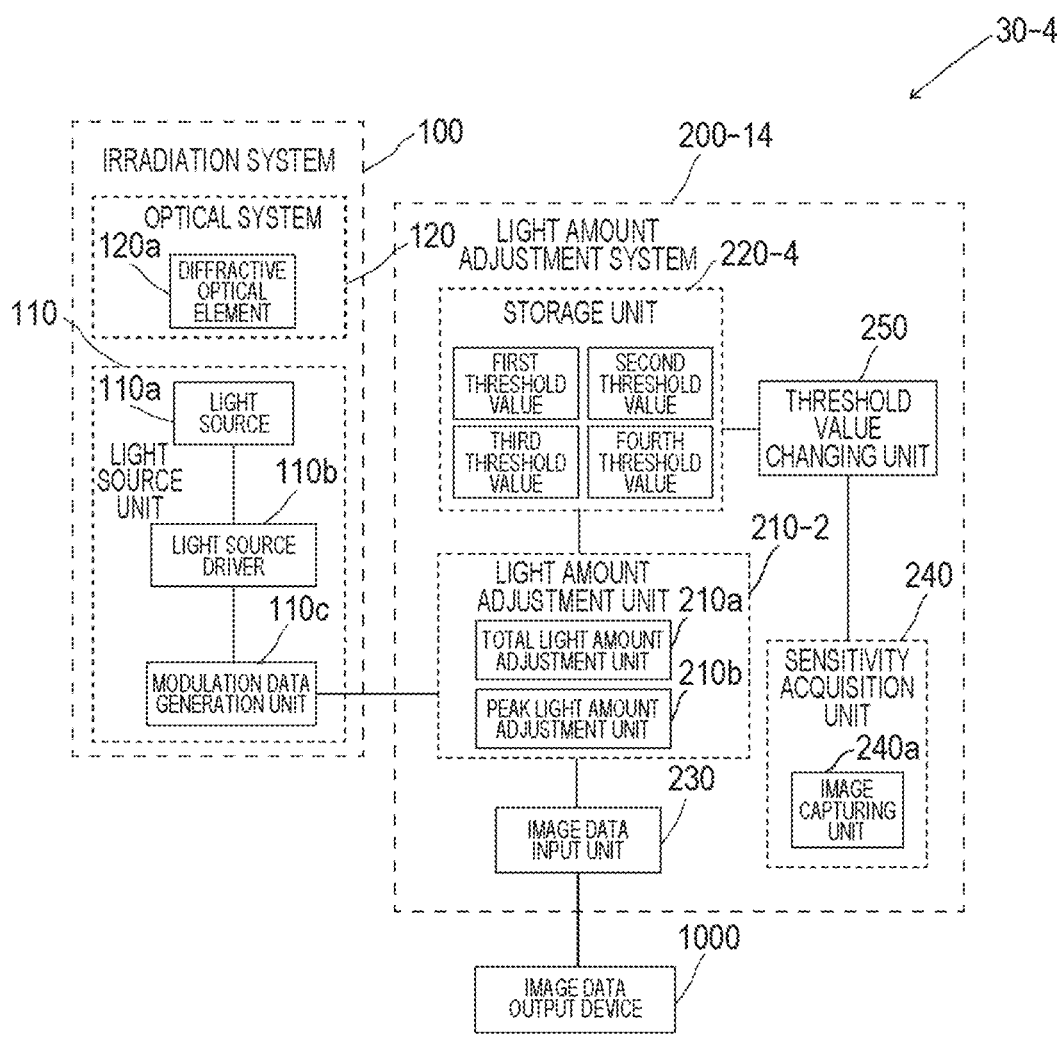
FIG. 43 is a block diagram illustrating functions of the image display device according to Example 4 of the third embodiment.

Image Display Device According to Example 4 of Third Embodiment of Present Technology As illustrated in FIG. 43, the image display device 30-4 according to Example 4 of the third embodiment has substantially the same configuration as the image display device 20-4 according to Example 4 of the second embodiment except that the light amount adjustment system 200-14 includes the threshold value changing unit 250. The threshold value changing unit 250 is configured by, for example, a CPU, an FPGA, or the like.

In the light amount adjustment system 200-14, as an example, the threshold value changing unit 250 changes the first threshold value, the second threshold value, the third threshold value, and the fourth threshold value according to the acquisition result of the sensitivity acquisition unit 240, and the light amount adjustment unit 210-2 adjusts the total light amount to be equal to or lower than the changed first threshold value and equal to or higher than the changed third threshold value and adjusts the peak light amount to be equal to or lower than the changed second threshold value and equal to or higher than the changed fourth threshold value.

By using the image display device 30-4 according to Example 4 of the third embodiment, it is possible to perform image display processing similar to the image display processing (refer to FIG. 3) performed using the image display device 10-1 according to Example 1 of the first embodiment. In the image display processing, light amount adjustment processing 14 as an example of the light amount adjustment processing (step S2 in FIG. 3) is performed.

(Light Amount Adjustment Processing 14)

Figure 44:
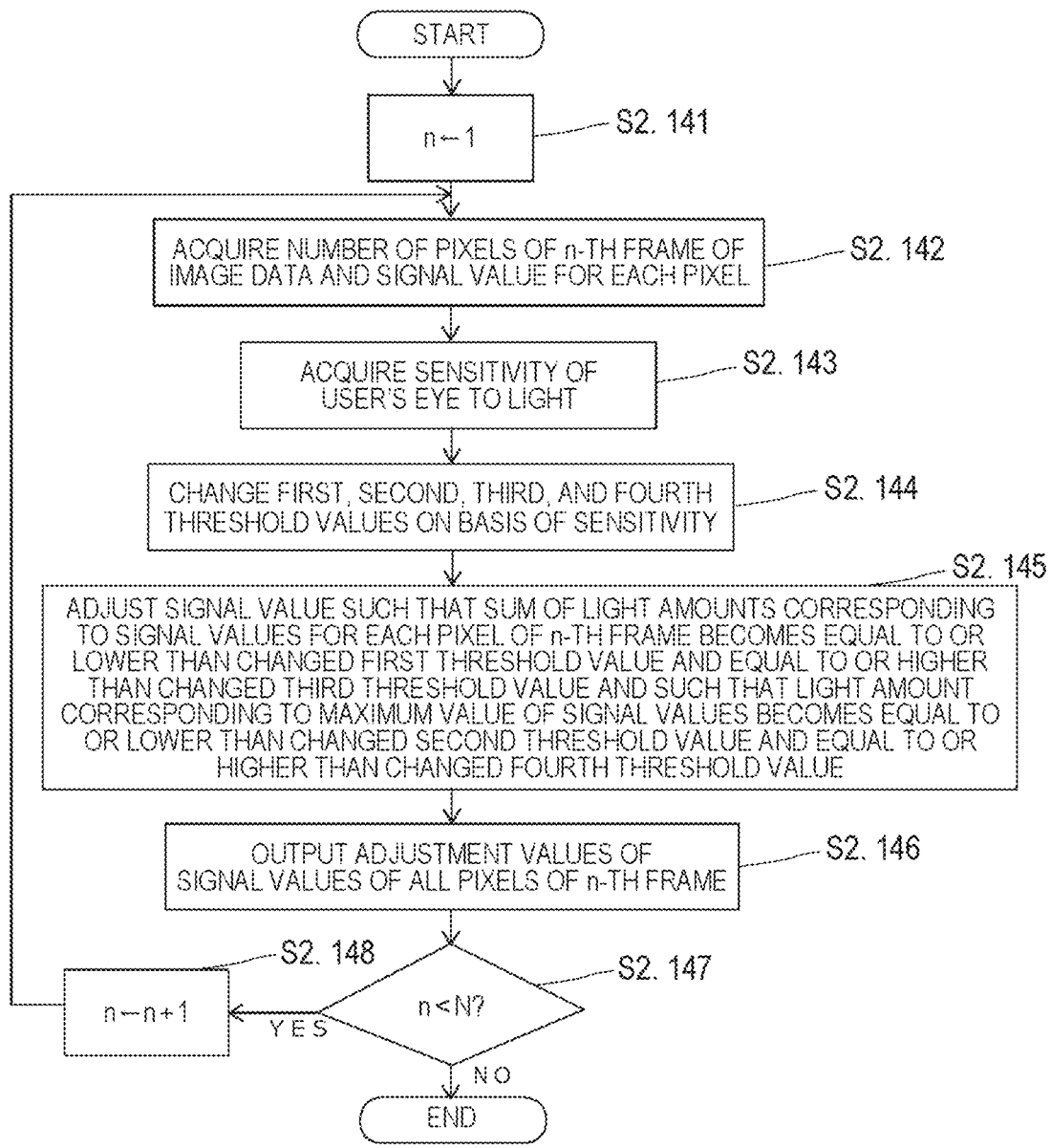
FIG. 44 is a flowchart for explaining light amount adjustment processing 14.

Hereinafter, the light amount adjustment processing 14 will be described with reference to a flowchart of FIG. 44. The light amount adjustment processing 14 is performed by the light amount adjustment system 200-14.

In first step S2.141, the light amount adjustment unit 210-2 sets n to 1.

In next step S2.142, the light amount adjustment unit 210-2 acquires the number of pixels of an n-th frame of the image data and the signal value for each pixel.

In next step S2.143, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity (for example, a relative sensitivity α) of the user's eye to light from the acquired feature amount.

In next step S2.144, the threshold value changing unit 250 changes the first threshold value, the second threshold value, the third threshold value, and the fourth threshold value on the basis of the sensitivity acquired in step S2.143.

Specifically, as illustrated in FIG. 45, the first threshold value is changed from Th1 to Th1' (for example, Th1/α), the second threshold value is changed from Th2 to Th2' (for example, Th2/α), the third threshold value is changed from Th3 to Th3' (for example, Th3/α), and the fourth threshold value is changed from Th4 to Th4' (for example, Th4/α). Note that, for example, in a case where the relative sensitivity α is 1, the first to fourth threshold values are substantially unchanged.

In next step S2.145, as illustrated in FIG. 45, the light amount adjustment unit 210-2 adjusts the signal value such that the total light amount Tli becomes equal to or lower than the changed first threshold value Th1' and equal to or higher than the changed third threshold value Th3' and such that the peak light amount Pli becomes equal to or lower than the changed second threshold value Th2' and equal to or higher than the changed fourth threshold value Th4', the total light amount Tli being a sum of the light amounts corresponding to the signal values for each pixel of the n-th frame, and the peak light amount Pli being a light amount corresponding to the maximum value of the signal values.

Figure 45A:
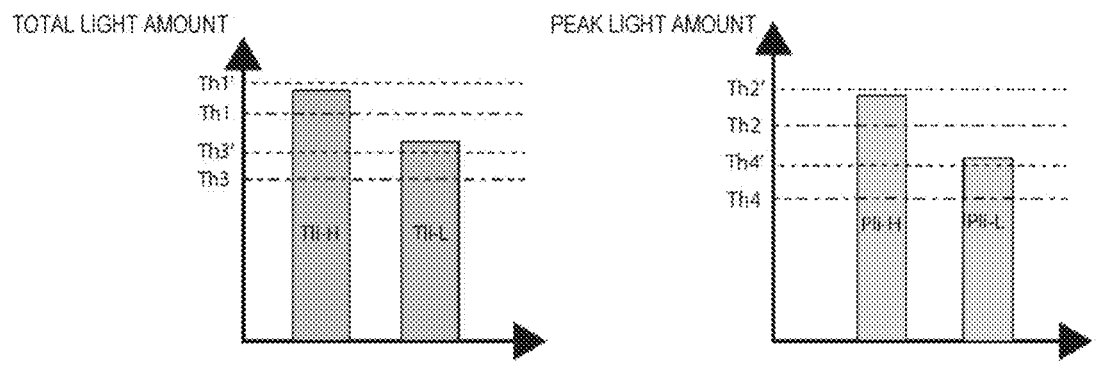
FIG. 45A and FIG. 45B are diagrams for explaining light amount adjustment processing 14.

For example, as illustrated in FIG. 45A, in a case where the sensitivity of the user's eye to light is low (in a case of α<1), the light amount adjustment unit 210-2 adjusts the total light amount Tli to a target value equal to or lower than the changed first threshold value Th1' (for example, Th1/α>Th1) and equal to or higher than the changed third threshold value Th3' (for example, Th3/α>Th3) (for example, an intermediate value between Th1' and Th3', a value Tli-H between the intermediate value and Th1', a value Tli-L between the intermediate value and Th3', or the like), and adjusts the peak light amount Pli to a target value equal to or lower than the changed second threshold value Th2' (for example, Th2/α>Th2) and equal to or higher than the changed fourth threshold value Th4' (for example, Th4/α>Th4) (for example, an intermediate value between Th2' and Th4', a value Pli-H between the intermediate value and Th2', a value Pli-L between the intermediate value and Th4', or the like).

Figure 45B:
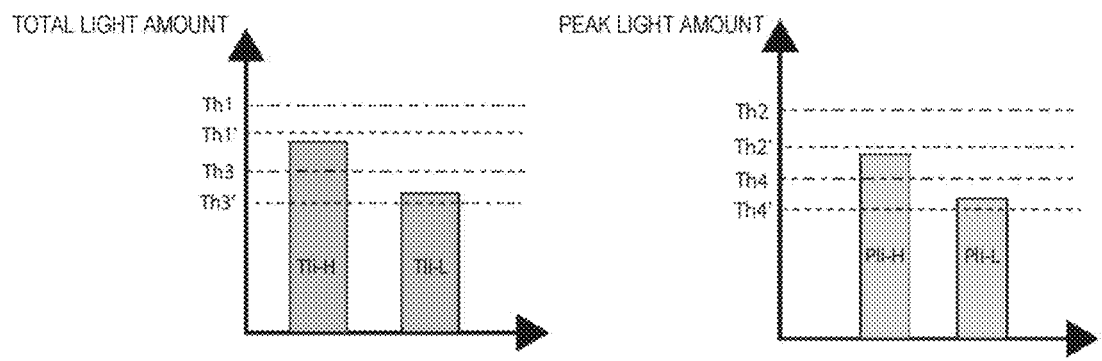

For example, as illustrated in FIG. 45B, in a case where the sensitivity of the user's eye to light is high (in a case of α≥1), the light amount adjustment unit 210-2 adjusts the total light amount Tli to a target value equal to or lower than the changed first threshold value Th1' (for example, Th1/α≤Th1) and equal to or higher than the changed third threshold value Th3' (for example, Th3/α≤Th3) (for example, an intermediate value between Th1' and Th3', a value Tli-H between the intermediate value and Th1', a value Tli-L between the intermediate value and Th3', or the like), and adjusts the peak light amount Pli to a target value equal to or lower than the changed second threshold value Th2' (for example, Th2/α≤Th2) and equal to or higher than the changed fourth threshold value Th4' (for example, Th4/α≤Th4) (for example, an intermediate value between Th2' and Th4', a value Pli-H between the intermediate value and Th2', a value Pli-L between the intermediate value and Th4', or the like).

In next step S2.146, the light amount adjustment unit 210-2 outputs the adjustment values of the signal values of all the pixels of the n-th frame.

In next step S2.147, the light amount adjustment unit 210-2 determines whether or not n<N (total number of frames of image data) is satisfied. In a case where the determination in this step is YES, the flow proceeds to step S2.148, and in a case where the determination in this step is NO, the flow is ended.

In step S2.148, the light amount adjustment unit 210-2 increments n. In a case where step S2.148 is executed, the flow returns to step S2.142.

Even in the image display device 30-4 described above and the image display method using the image display device 30-4, the same effects as the effects of the image display device 20-4 according to Example 4 of the second embodiment and the image display method using the image display device 20-4 can be obtained.

Figure 46:
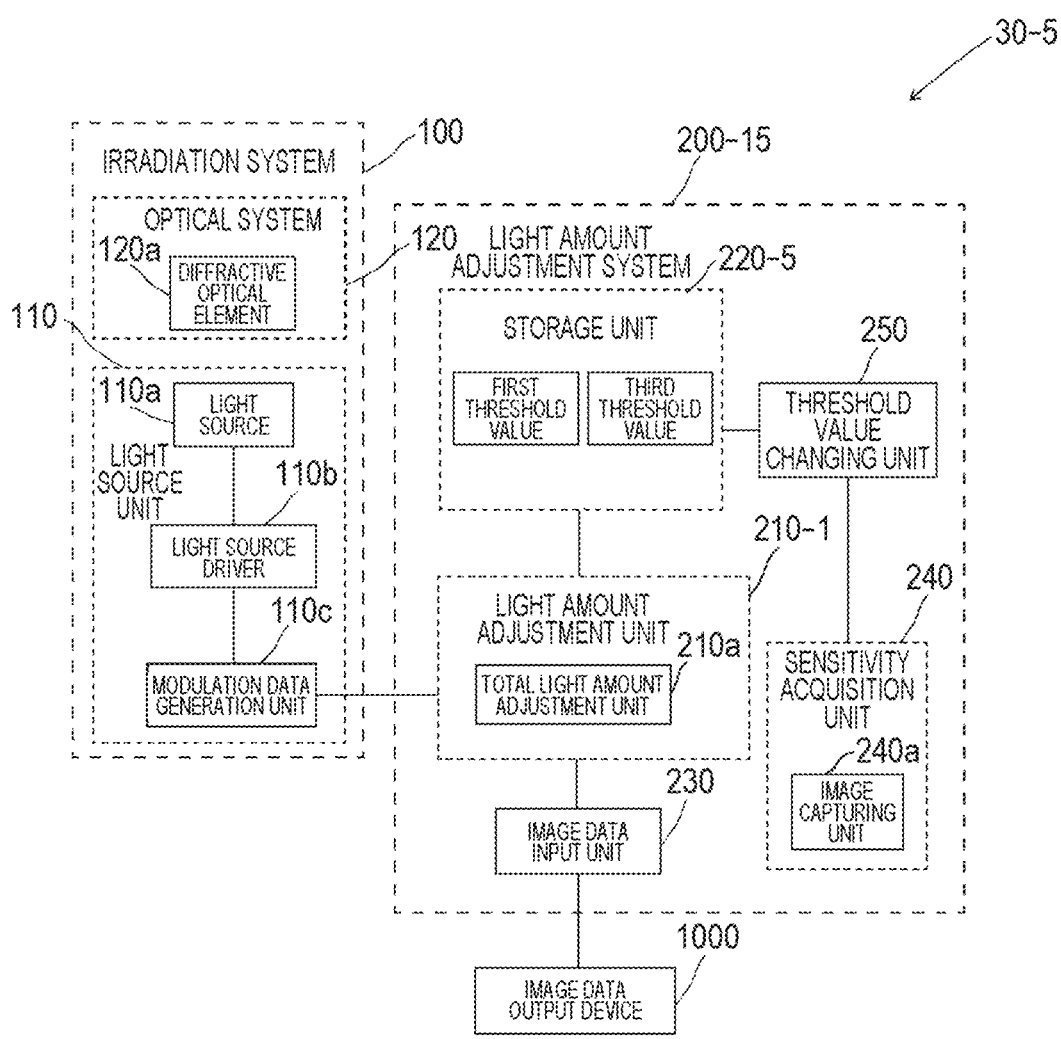
FIG. 46 is a block diagram illustrating functions of the image display device according to Example 5 of the third embodiment.

Image Display Device According to Example 5 of Third Embodiment of Present Technology As illustrated in FIG. 46, the image display device 30-5 according to Example 5 of the third embodiment has substantially the same configuration as the image display device 20-5 according to Example 5 of the second embodiment except that the light amount adjustment system 200-15 includes the threshold value changing unit 250. The threshold value changing unit 250 is configured by, for example, a CPU, an FPGA, or the like.

In the light amount adjustment system 200-15, as an example, the threshold value changing unit 250 changes the first and third threshold values according to the acquisition result of the sensitivity acquisition unit 240, and the light amount adjustment unit 210-1 adjusts the total light amount to be equal to or lower than the changed first threshold value and equal to or higher than the changed third threshold value.

By using the image display device 30-5 according to Example 5 of the third embodiment, it is possible to perform image display processing similar to the image display processing (refer to FIG. 3) performed using the image display device 10-1 according to Example 1 of the first embodiment. In the image display processing, light amount adjustment processing 15 as an example of the light amount adjustment processing (step S2 in FIG. 3) is performed.

(Light Amount Adjustment Processing 15)

Figure 47:
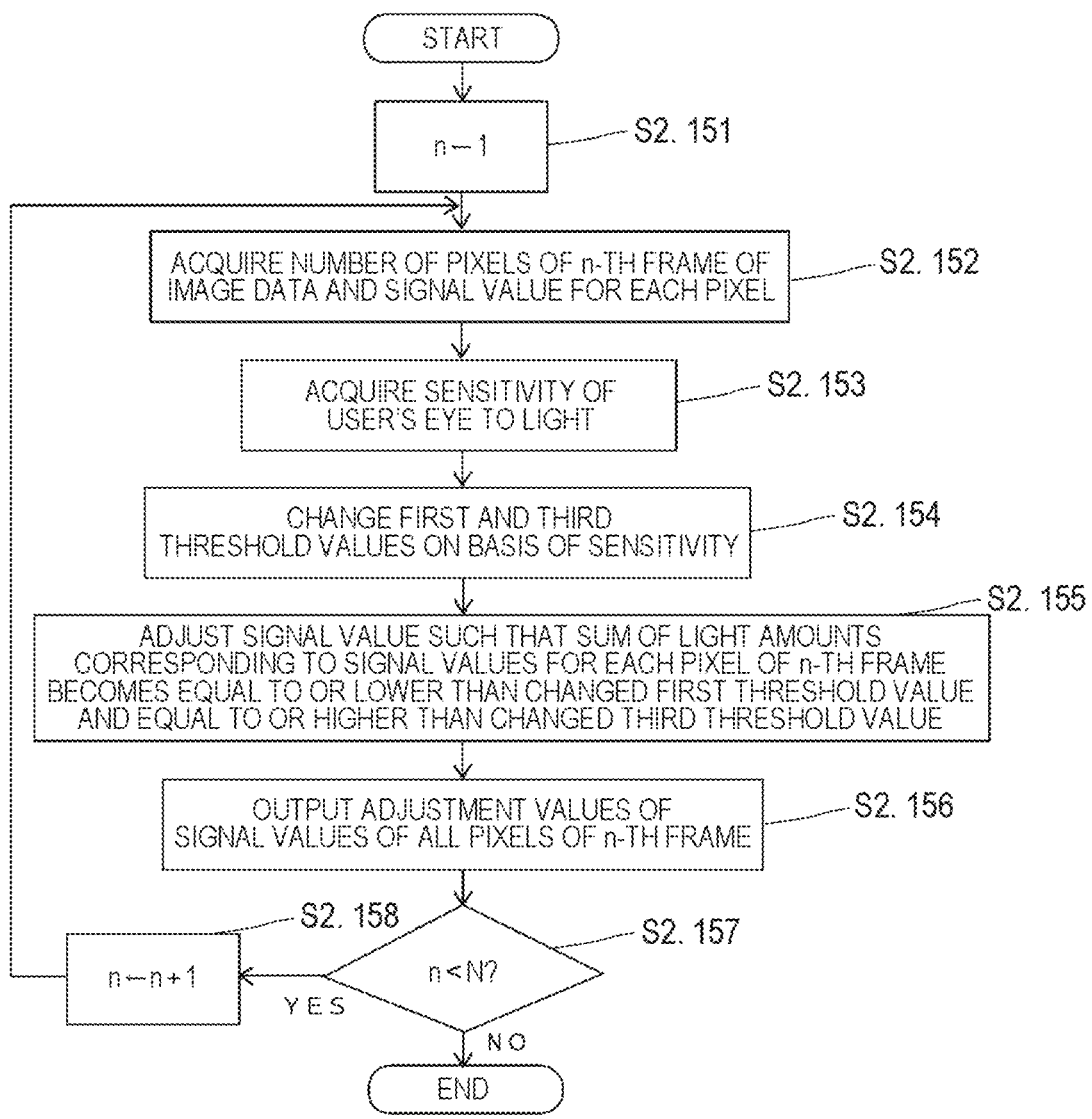
FIG. 47 is a flowchart for explaining light amount adjustment processing 15.

Hereinafter, the light amount adjustment processing 15 will be described with reference to a flowchart of FIG. 47. The light amount adjustment processing 15 is performed by the light amount adjustment system 200-15.

In first step S2.151, the light amount adjustment unit 210-1 sets n to 1.

In next step S2.152, the light amount adjustment unit 210-1 acquires the number of pixels of an n-th frame of the image data and the signal value for each pixel.

In next step S2.153, the sensitivity acquisition unit 240 acquires a sensitivity of the user's eye to light. Specifically, the sensitivity acquisition unit 240 acquires a feature amount of the pupil 3 and/or a feature amount of the iris 6 from the image capturing result of the image capturing unit 240a, and acquires a sensitivity (for example, a relative sensitivity α) of the user's eye to light from the acquired feature amount.

In next step S2.154, the threshold value changing unit 250 changes the first threshold value and the third threshold value on the basis of the sensitivity acquired in step S2.153.

Specifically, as illustrated in FIG. 48, the first threshold value is changed from Th1 to Th1' (for example, Th1/α), and the third threshold value is changed from Th3 to Th3' (for example, Th3/α). Note that, for example, in a case where the relative sensitivity α is 1, the first and third threshold values are substantially unchanged.

In next step S2.155, as illustrated in FIG. 48, the light amount adjustment unit 210-1 adjusts the signal value such that the total light amount Tli becomes equal to or lower than the changed first threshold value Th1' and equal to or higher than the changed third threshold value Th3', the total light amount Tli being a sum of the light amounts corresponding to the signal values for each pixel of the n-th frame.

Figure 48A:
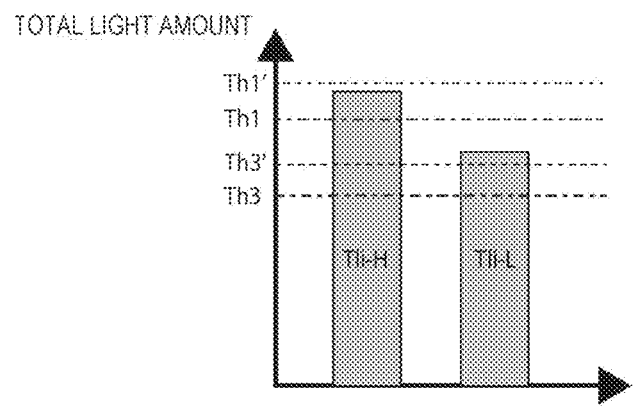
FIG. 48A and FIG. 48B are diagrams for explaining light amount adjustment processing 15.

For example, as illustrated in FIG. 48A, in a case where the sensitivity of the user's eye to light is low (in a case of α<1), the light amount adjustment unit 210-1 adjusts the total light amount Tli to a target value equal to or lower than the changed first threshold value Th1' (for example, Th1/α>Th1) and equal to or higher than the changed third threshold value Th3' (for example, Th3/α>Th3) (for example, an intermediate value between Th1' and Th3', a value Tli-H between the intermediate value and Th1', a value Tli-L between the intermediate value and Th3', or the like).

Figure 48B:
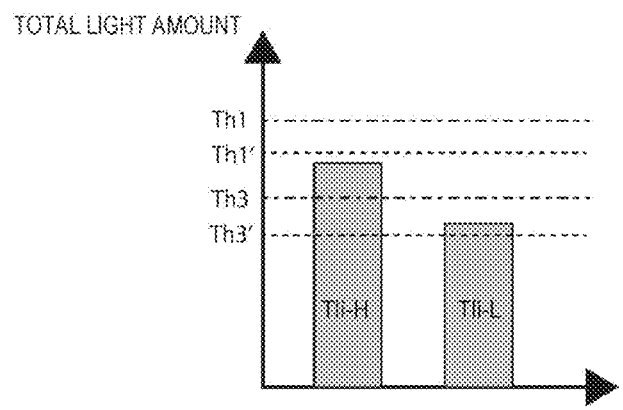

For example, as illustrated in FIG. 48B, in a case where the sensitivity of the user's eye to light is high (in a case of α≥1), the light amount adjustment unit 210-1 adjusts the total light amount Tli to a target value equal to or lower than the changed first threshold value Th1' (for example, Th1/α≤Th1) and equal to or higher than the changed third threshold value Th3' (for example, Th3/α≤Th3) (for example, an intermediate value between Th1' and Th3', a value Tli-H between the intermediate value and Th1', a value Tli-L between the intermediate value and Th3', or the like).

In next step S2.156, the light amount adjustment unit 210-1 outputs the adjustment values of the signal values of all the pixels of the n-th frame.

In next step S2.157, the light amount adjustment unit 210-1 determines whether or not n<N (total number of frames of image data) is satisfied. In a case where the determination in this step is YES, the flow proceeds to step S2.158, and in a case where the determination in this step is NO, the flow is ended.

In step S2.158, the light amount adjustment unit 210-1 increments n. In a case where step S2.158 is executed, the flow returns to step S2.152.

Even in the image display device 30-5 described above and the image display method using the image display device 30-5, the same effects as the effects of the image display device 20-5 according to Example 5 of the second embodiment and the image display method using the image display device 20-5 can be obtained.

8. <Image Display Device According to Examples 1 to 5 of Fourth Embodiment of Present Technology>

Hereinafter, image display devices 40-1 to 40-5 according to Examples 1 to 5 of a fourth embodiment of the present technology will be described.

Figure 49:
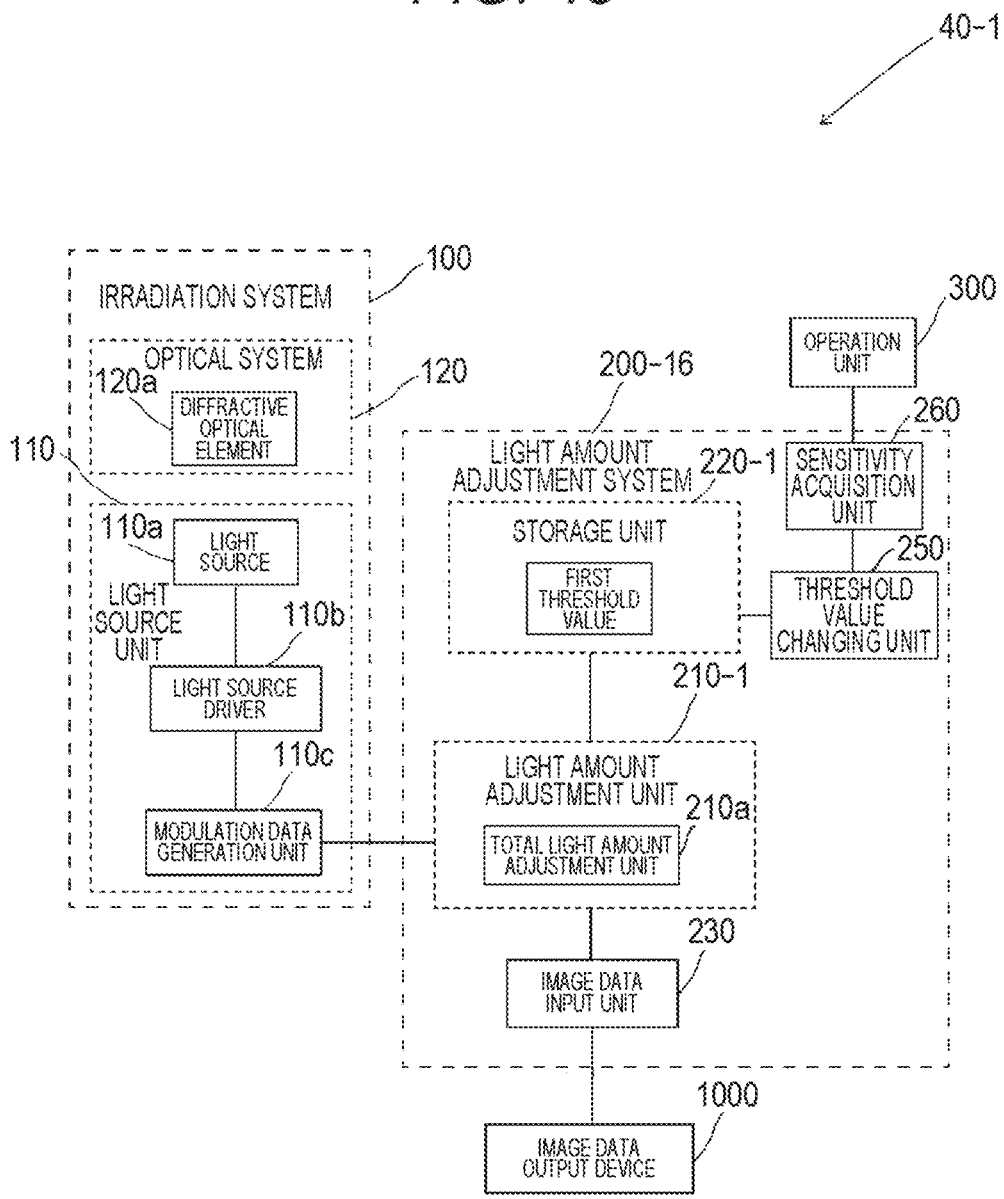
FIG. 49 is a block diagram illustrating functions of the image display device according to Example 1 of a fourth embodiment.

Image Display Device According to Example 1 of Fourth Embodiment of Present Technology As illustrated in FIG. 49, the image display device 40-1 according to Example 1 of the fourth embodiment has substantially the same configuration as the image display device 10-1 according to Example 1 of the first embodiment except that the light amount adjustment system 200-16 includes the threshold value changing unit 250 and the sensitivity acquisition unit 260. The threshold value changing unit 250 and the sensitivity acquisition unit 260 are configured by, for example, a CPU, an FPGA, or the like.

In the image display device 40-1, as an example, the sensitivity acquisition unit 260 acquires a sensitivity of the user's eye to light from an operation signal from an operation unit 300, and transmits the sensitivity to the threshold value changing unit 250. For example, in a case where the user inputs, as user information (operation signal), a feature amount (for example, at least one of a hue, a shade, or a size) of his/her own pupil 3 and/or iris 6 via the operation unit 300, the sensitivity acquisition unit 260 calculates a sensitivity (for example, a relative sensitivity α) from the user information, and transmits the sensitivity to the threshold value changing unit 250. The threshold value changing unit 250 changes the first threshold value according to the sensitivity from the sensitivity acquisition unit 260. The light amount adjustment unit 210-1 adjusts the total light amount to be equal to or lower than the changed first threshold value.

By using the image display device 40-1 according to Example 1 of the fourth embodiment, it is possible to perform image display processing similar to the image display processing (refer to FIG. 3) performed using the image display device 10-1 according to Example 1 of the first embodiment. In the image display processing, light amount adjustment processing 16 as an example of the light amount adjustment processing (step S2 in FIG. 3) is performed.

(Light Amount Adjustment Processing 16)

Figure 50:
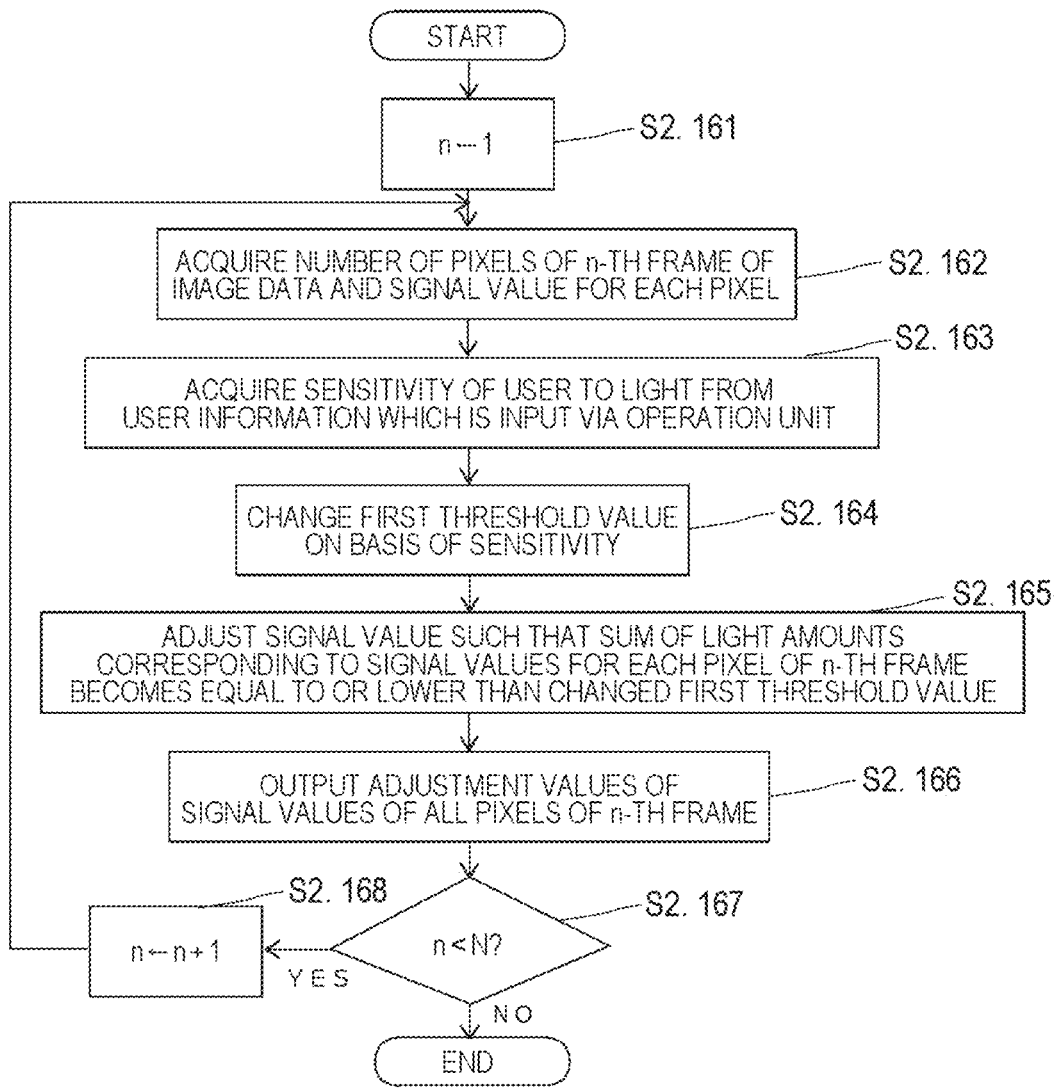
FIG. 50 is a flowchart for explaining light amount adjustment processing 16.

Hereinafter, the light amount adjustment processing 16 will be described with reference to a flowchart of FIG. 50. The light amount adjustment processing 16 is performed by the light amount adjustment system 200-16.

In first step S2.161, the light amount adjustment unit 210-1 sets n to 1.

In next step S2.162, the light amount adjustment unit 210-1 acquires the number of pixels of an n-th frame of the image data and the signal value for each pixel.

In next step S2.163, the sensitivity acquisition unit 260 acquires the sensitivity (for example, the relative sensitivity α) of the user to light from the user information (operation signal) which is input via the operation unit 300. Specifically, the sensitivity acquisition unit 260 acquires a feature amount of the pupil 3 and/or a feature amount of the iris 6 from the user information, and acquires a sensitivity (for example, a relative sensitivity α) of the user's eye to light from the acquired feature amount.

In next step S2.164, the threshold value changing unit 250 changes the first threshold value on the basis of the sensitivity acquired in step S2.163. Specifically, the first threshold value is changed from Th1 to Th1' (for example, Th1/α). Note that, for example, in a case where the relative sensitivity α is 1, the first threshold value is substantially unchanged.

In next step S2.165, the light amount adjustment unit 210-1 adjusts the signal value such that the total light amount Tli becomes equal to or lower than the changed first threshold value Th1', the total light amount Tli being a sum of the light amounts corresponding to the signal values for each pixel of the n-th frame.

For example, in a case where the sensitivity of the user's eye to light is low (in a case of α<1), the light amount adjustment unit 210-1 adjusts the total light amount Tli to a predetermined value equal to or lower than the changed first threshold value Th1' (for example, Th1/α>Th1). For example, in a case where the sensitivity of the user's eye to light is high (in a case of α≥1), the light amount adjustment unit 210-1 adjusts the total light amount Tli to a predetermined value equal to or lower than the changed first threshold value Th1' (for example, Th1/α≤Th1).

In next step S2.166, the light amount adjustment unit 210-1 outputs the adjustment values of the signal values of all the pixels of the n-th frame.

In next step S2.167, the light amount adjustment unit 210-1 determines whether or not n<N (total number of frames of image data) is satisfied. In a case where the determination in this step is YES, the flow proceeds to step S2.168, and in a case where the determination in this step is NO, the flow is ended.

In step S2.168, the light amount adjustment unit 210-1 increments n. In a case where step S2.168 is executed, the flow returns to step S2.162.

Even in the image display device 40-1 described above and the image display method using the image display device 40-1, the same effects as the effects of the image display devices 20-1 and 30-1 according to Example 1 of the second and third embodiments and the image display method using the image display devices 20-1 and 30-1 can be obtained.

Figure 51:
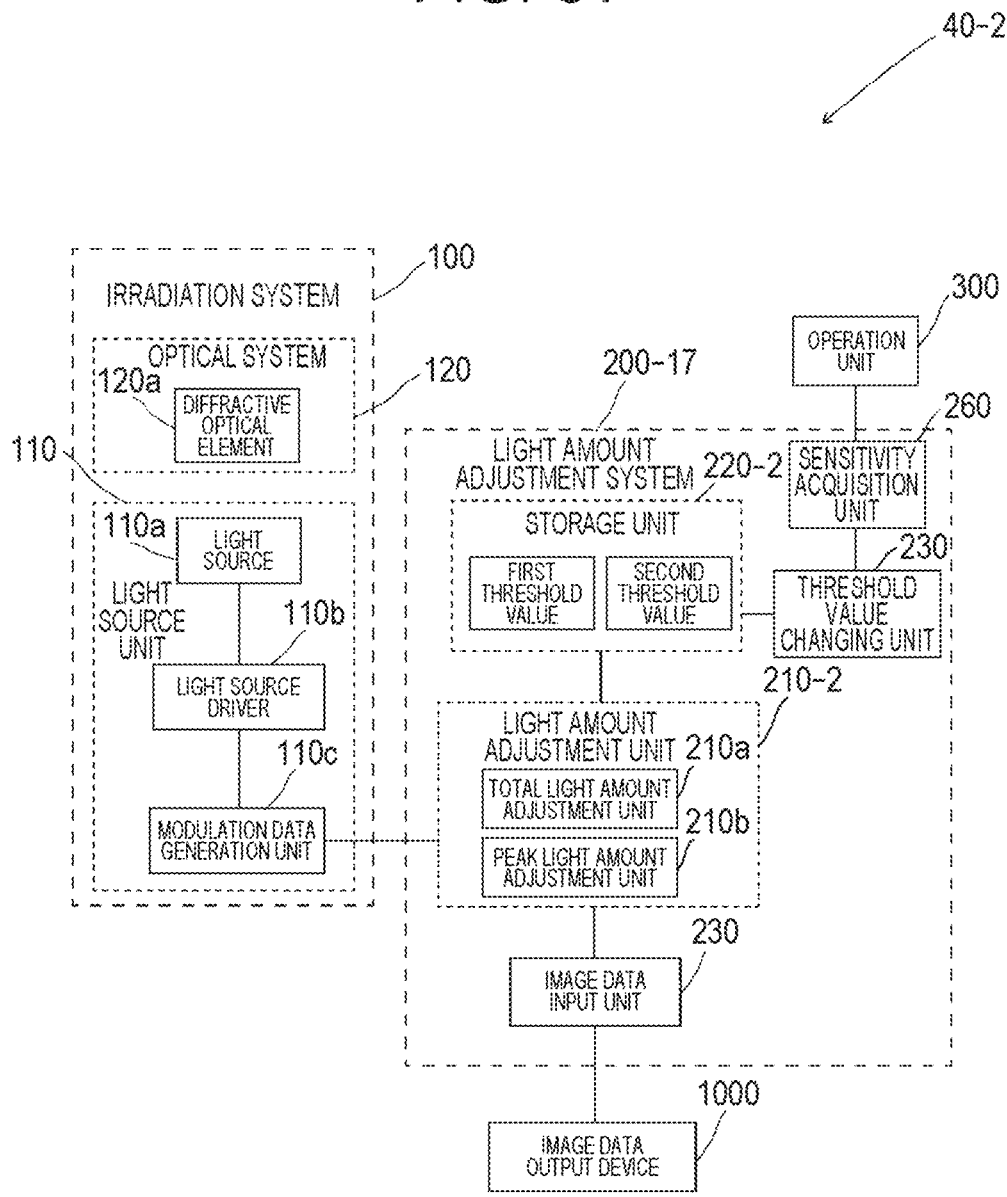
FIG. 51 is a block diagram illustrating functions of the image display device according to Example 2 of the fourth embodiment.

Image Display Device According to Example 2 of Fourth Embodiment of Present Technology As illustrated in FIG. 51, the image display device 40-2 according to Example 2 of the fourth embodiment has substantially the same configuration as the image display device 10-2 according to Example 2 of the first embodiment except that the light amount adjustment system 200-17 includes the threshold value changing unit 250 and the sensitivity acquisition unit 260. The threshold value changing unit 250 and the sensitivity acquisition unit 260 are configured by, for example, a CPU, an FPGA, or the like.

In the image display device 40-2, as an example, the sensitivity acquisition unit 260 acquires a sensitivity of the user's eye to light from an operation signal from an operation unit 300, and transmits the sensitivity to the threshold value changing unit 250. For example, in a case where the user inputs, as user information (operation signal), a feature amount (for example, at least one of a hue, a shade, or a size) of his/her own pupil 3 and/or iris 6 via the operation unit 300, the sensitivity acquisition unit 260 calculates a sensitivity (for example, a relative sensitivity $\alpha$) from the user information, and transmits the sensitivity to the threshold value changing unit 250. The threshold value changing unit 250 changes the first threshold value and the second threshold value according to the sensitivity from the sensitivity acquisition unit 260. The light amount adjustment unit 210-2 adjusts the total light amount to be equal to or lower than the changed first threshold value, and adjusts the peak light amount to be equal to or lower than the changed second threshold value.

By using the image display device 40-2 according to Example 2 of the fourth embodiment, it is possible to perform image display processing similar to the image display processing (refer to FIG. 3) performed using the image display device 10-1 according to Example 1 of the first embodiment. In the image display processing, light amount adjustment processing 17 as an example of the light amount adjustment processing (step S2 in FIG. 3) is performed.

(Light Amount Adjustment Processing 17)

Figure 52:
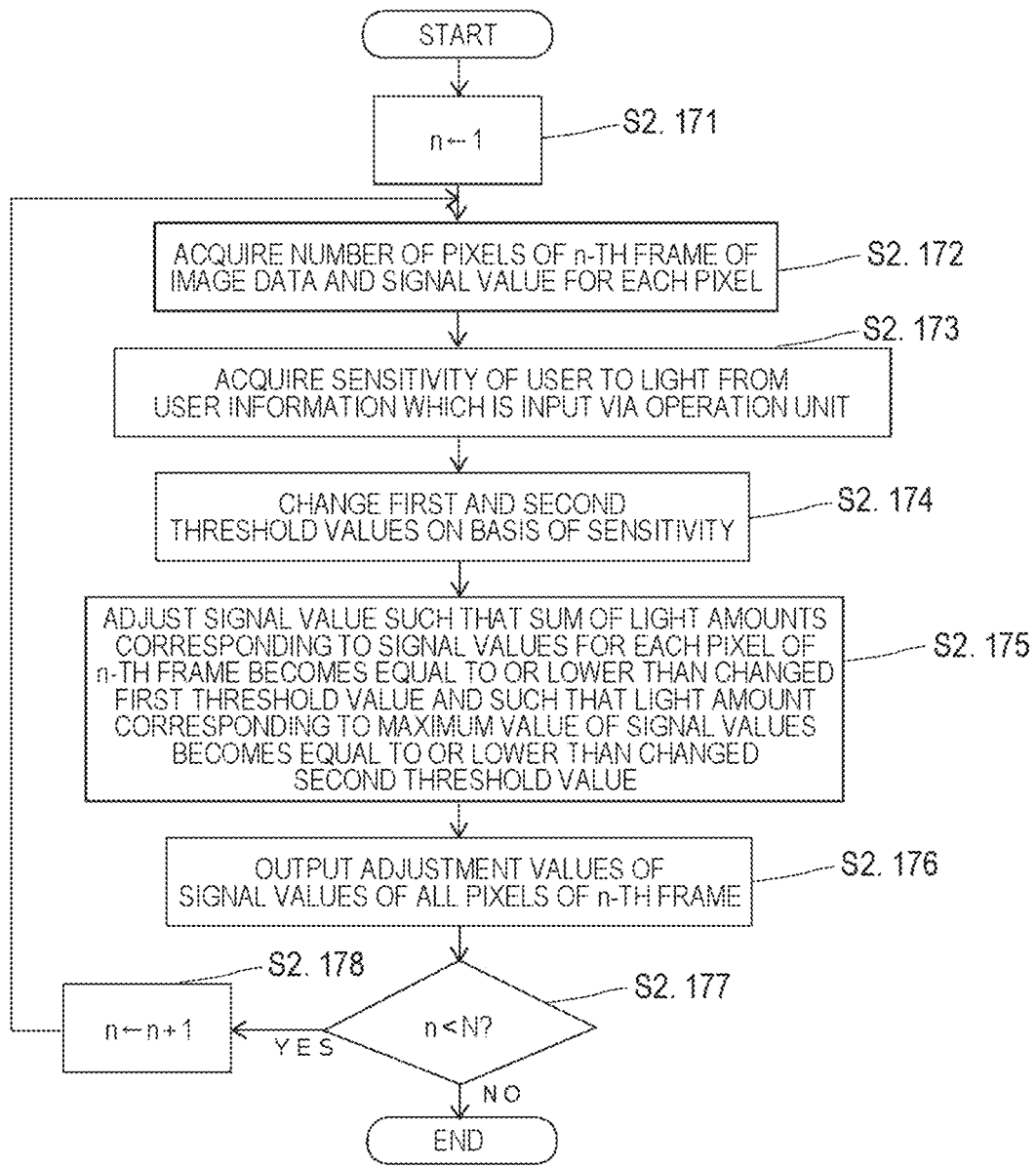
FIG. 52 is a flowchart for explaining light amount adjustment processing 17.

Hereinafter, the light amount adjustment processing 17 will be described with reference to a flowchart of FIG. 52. The light amount adjustment processing 17 is performed by the light amount adjustment system 200-17.

In first step S2.171, the light amount adjustment unit 210-2 sets n to 1.

In next step S2.172, the light amount adjustment unit 210-2 acquires the number of pixels of an n-th frame of the image data and the signal value for each pixel.

In next step S2.173, the sensitivity acquisition unit 260 acquires the sensitivity (for example, the relative sensitivity $\alpha$) of the user to light from the user information (operation signal) which is input via the operation unit 300. Specifically, the sensitivity acquisition unit 260 acquires a feature amount of the pupil 3 and/or a feature amount of the iris 6 from the user information, and acquires a sensitivity (for example, a relative sensitivity $\alpha$) of the user's eye to light from the acquired feature amount.

In next step S2.174, the threshold value changing unit 250 changes the first threshold value and the second threshold value on the basis of the sensitivity acquired in step S2.173. Specifically, the first threshold value is changed from Th1 to Th1' (for example, Th1/$\alpha$), and the second threshold value is changed from Th2 to Th2' (for example, Th2/$\alpha$). Note that, for example, in a case where the relative sensitivity $\alpha$ is 1, the first threshold value and the second threshold value are substantially unchanged.

In next step S2.175, the light amount adjustment unit 210-2 adjusts the signal value such that the total light amount Tli becomes equal to or lower than the changed first threshold value Th1' and such that the peak light amount Pli becomes equal to or lower than the changed second threshold value, the total light amount Tli being a sum of the light amounts corresponding to the signal values for each pixel of the n-th frame, and the peak light amount Pli being a light amount corresponding to the maximum value of the signal values.

For example, in a case where the sensitivity of the user's eye to light is low (in a case of $\alpha<1$), the light amount adjustment unit 210-2 adjusts the total light amount Tli to a predetermined value equal to or lower than the changed first threshold value Th1' (for example, Th1/$\alpha>$Th1), and adjusts the peak light amount Pli to a predetermined value equal to or lower than the changed second threshold value Th2' (for example, Th2/$\alpha>$Th2). For example, in a case where the sensitivity of the user's eye to light is high (in a case of $\alpha\geq1$), the light amount adjustment unit 210-2 adjusts the total light amount Tli to a predetermined value equal to or lower than the changed first threshold value Th1' (for example, Th1/$\alpha\leq$Th1), and adjusts the peak light amount Pli to a predetermined value equal to or lower than the changed second threshold value Th2' (for example, Th2/$\alpha\leq$Th2).

In next step S2.176, the light amount adjustment unit 210-2 outputs the adjustment values of the signal values of all the pixels of the n-th frame.

In next step S2.177, the light amount adjustment unit 210-2 determines whether or not n<N (total number of frames of image data) is satisfied. In a case where the determination in this step is YES, the flow proceeds to step S2.178, and in a case where the determination in this step is NO, the flow is ended.

In step S2.178, the light amount adjustment unit 210-2 increments n. In a case where step S2.178 is executed, the flow returns to step S2.172.

Even in the image display device 40-2 described above and the image display method using the image display device 40-2, the same effects as the effects of the image display devices 20-2 and 30-2 according to Example 2 of the second and third embodiments and the image display method using the image display devices 20-2 and 30-2 can be obtained.

Figure 53:
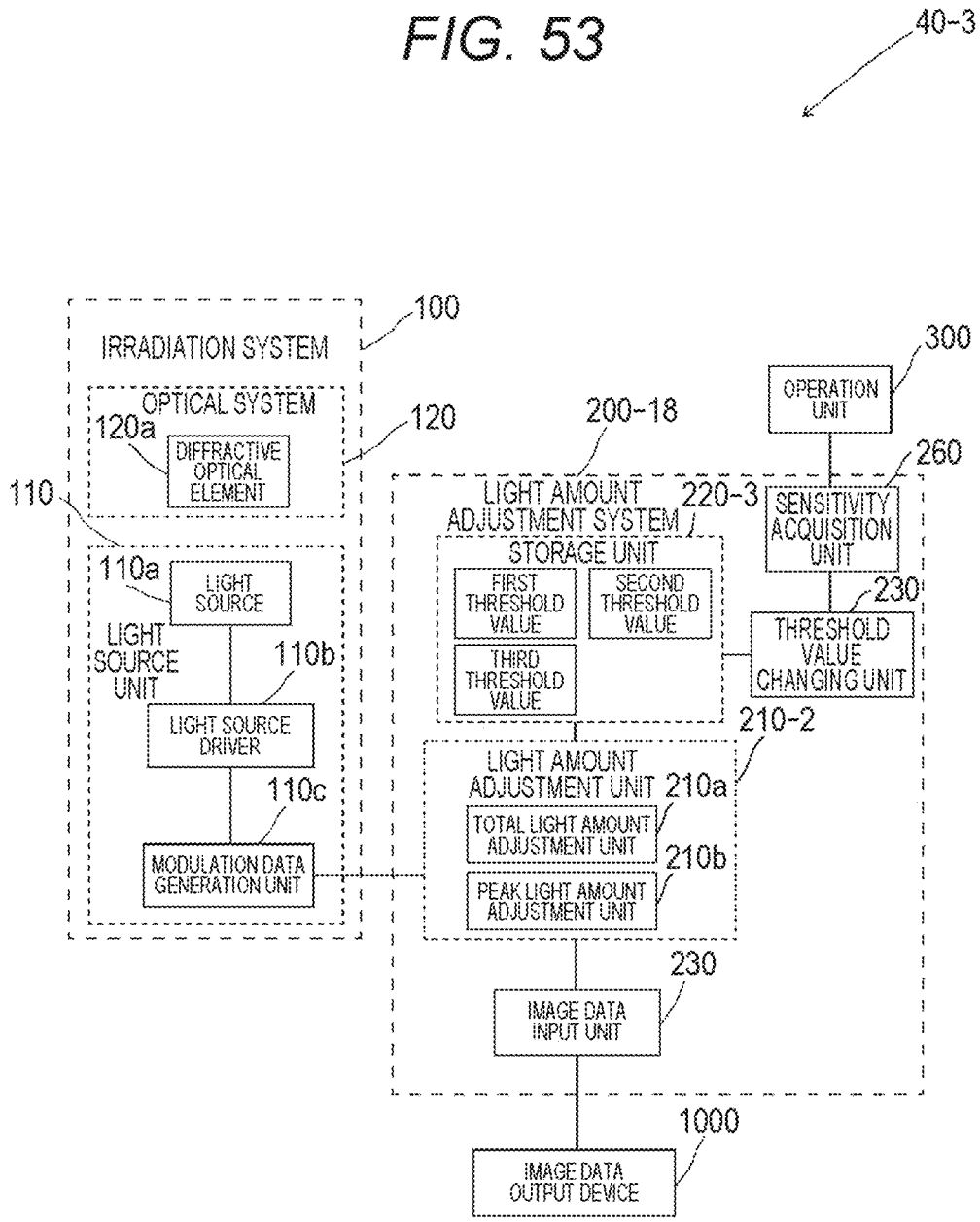
FIG. 53 is a block diagram illustrating functions of the image display device according to Example 3 of the fourth embodiment.

Image Display Device According to Example 3 of Fourth Embodiment of Present Technology As illustrated in FIG. 53, the image display device 40-3 according to Example 2 of the fourth embodiment has substantially the same configuration as the image display device 10-3 according to Example 3 of the first embodiment except that the light amount adjustment system 200-18 includes the threshold value changing unit 250 and the sensitivity acquisition unit 260. The threshold value changing unit 250 and the sensitivity acquisition unit 260 are configured by, for example, a CPU, an FPGA, or the like.

In the image display device 40-3, as an example, the sensitivity acquisition unit 260 acquires a sensitivity of the user's eye to light from an operation signal from an operation unit 300, and transmits the sensitivity to the threshold value changing unit 250. For example, in a case where the user inputs, as user information (operation signal), a feature amount (for example, at least one of a hue, a shade, or a size) of his/her own pupil 3 and/or iris 6 via the operation unit 300, the sensitivity acquisition unit 260 calculates a sensitivity (for example, a relative sensitivity $\alpha$) from the user information, and transmits the sensitivity to the threshold value changing unit 250. The threshold value changing unit 250 changes the first threshold value, the second threshold value, and the third threshold value according to the sensitivity from the sensitivity acquisition unit 260. The light amount adjustment unit 210-2 adjusts the total light amount to be equal to or lower than the changed first threshold value and equal to or higher than the changed third threshold value, and adjusts the peak light amount to be equal to or lower than the changed second threshold value.

By using the image display device 40-3 according to Example 3 of the fourth embodiment, it is possible to perform image display processing similar to the image display processing (refer to FIG. 3) performed using the image display device 10-1 according to Example 1 of the first embodiment. In the image display processing, light amount adjustment processing 18 as an example of the light amount adjustment processing (step S2 in FIG. 3) is performed.

(Light Amount Adjustment Processing 18)

Figure 54:
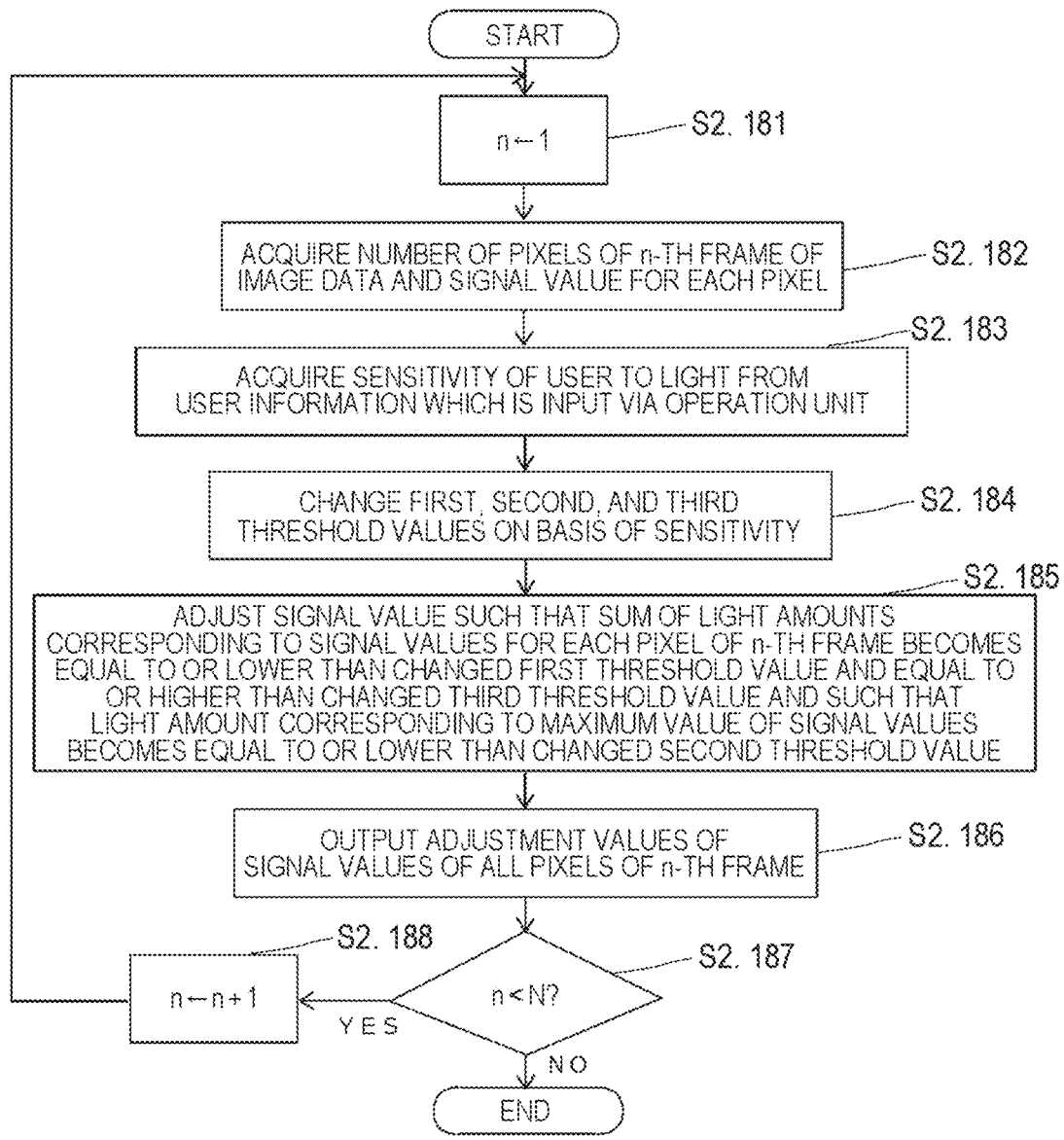
FIG. 54 is a flowchart for explaining light amount adjustment processing 18.

Hereinafter, the light amount adjustment processing 18 will be described with reference to a flowchart of FIG. 54. The light amount adjustment processing 18 is performed by the light amount adjustment system 200-18.

In first step S2.181, the light amount adjustment unit 210-2 sets n to 1.

In next step S2.182, the light amount adjustment unit 210-2 acquires the number of pixels of an n-th frame of the image data and the signal value for each pixel.

In next step S2.183, the sensitivity acquisition unit 260 acquires the sensitivity (for example, the relative sensitivity $\alpha$) of the user to light from the user information which is input via the operation unit 300. Specifically, the sensitivity acquisition unit 260 acquires a feature amount of the pupil 3 and/or a feature amount of the iris 6 from the user information, and acquires a sensitivity (for example, a relative sensitivity $\alpha$) of the user's eye to light from the acquired feature amount.

In next step S2.184, the threshold value changing unit 250 changes the first threshold value, the second threshold value, and the third threshold value on the basis of the sensitivity acquired in step S2.183. Specifically, the first threshold value is changed from Th1 to Th1' (for example, Th1/$\alpha$), the second threshold value is changed from Th2 to Th2' (for example, Th2/$\alpha$), and the third threshold value is changed from Th3 to Th3' (for example, Th3/$\alpha$). Note that, for example, in a case where the relative sensitivity $\alpha$ is 1, the first threshold value, the second threshold value, and the third threshold value are substantially unchanged.

In next step S2.185, the light amount adjustment unit 210-2 adjusts the signal value such that the total light amount Tli becomes equal to or lower than the changed first threshold value Th1' and equal to or higher than the changed third threshold value Th3' and such that the peak light amount Pli becomes equal to or lower than the changed second threshold value Th2', the total light amount Tli being a sum of the light amounts corresponding to the signal values for each pixel of the n-th frame, and the peak light amount Pli being a light amount corresponding to the maximum value of the signal values.

For example, in a case where the sensitivity of the user's eye to light is low (in a case of $\alpha<1$), the light amount adjustment unit 210-2 adjusts the total light amount Tli to a target value equal to or lower than the changed first threshold value Th1' (for example, Th1/$\alpha$>Th1) and equal to or higher than the changed third threshold value Th3' (for example, Th3/$\alpha$>Th3), and adjusts the peak light amount Pli to a predetermined value equal to or lower than the changed second threshold value Th2' (for example, Th2/$\alpha$>Th2). For example, in a case where the sensitivity of the user's eye to light is high (in a case of $\alpha \geq 1$), the light amount adjustment unit 210-2 adjusts the total light amount Tli to a target value equal to or lower than the changed first threshold value Th1' (for example, Th1/$\alpha \leq$Th1) and equal to or higher than the changed third threshold value Th3' (for example, Th3/$\alpha \leq$Th3), and adjusts the peak light amount Pli to a predetermined value equal to or lower than the changed second threshold value Th2' (for example, Th2/$\alpha \leq$Th2).

In next step S2.186, the light amount adjustment unit 210-2 outputs the adjustment values of the signal values of all the pixels of the n-th frame.

In next step S2.187, the light amount adjustment unit 210-2 determines whether or not n<N (total number of frames of image data) is satisfied. In a case where the determination in this step is YES, the flow proceeds to step S2.188, and in a case where the determination in this step is NO, the flow is ended.

In step S2.188, the light amount adjustment unit 210-2 increments n. In a case where step S2.188 is executed, the flow returns to step S2.182.

Even in the image display device 40-3 described above and the image display method using the image display device 40-3, the same effects as the effects of the image display devices 20-3 and 30-3 according to Example 3 of the second and third embodiments and the image display method using the image display devices 20-3 and 30-3 can be obtained.

Figure 55:
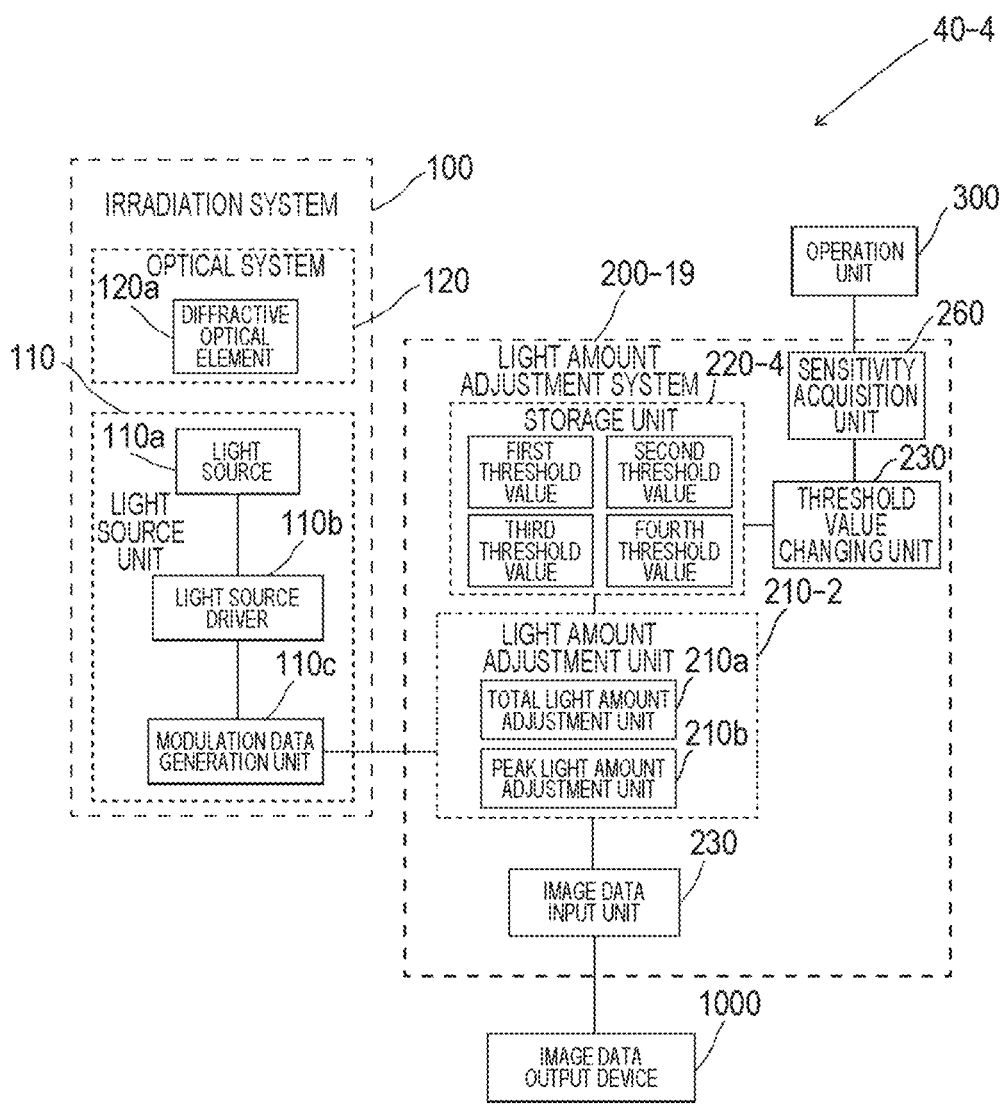
FIG. 55 is a block diagram illustrating functions of the image display device according to Example 4 of the fourth embodiment.

Image Display Device According to Example 4 of Fourth Embodiment of Present Technology As illustrated in FIG. 55, the image display device 40-4 according to Example 4 of the fourth embodiment has substantially the same configuration as the image display device 10-4 according to Example 4 of the first embodiment except that the light amount adjustment system 200-19 includes the threshold value changing unit 250 and the sensitivity acquisition unit 260. The threshold value changing unit 250 and the sensitivity acquisition unit 260 are configured by, for example, a CPU, an FPGA, or the like.

In the image display device 40-4, as an example, the sensitivity acquisition unit 260 acquires a sensitivity of the user's eye to light from an operation signal from an operation unit 300, and transmits the sensitivity to the threshold value changing unit 250. For example, in a case where the user inputs, as user information (operation signal), a feature amount (for example, at least one of a hue, a shade, or a size) of his/her own pupil 3 and/or iris 6 via the operation unit 300, the sensitivity acquisition unit 260 calculates a sensitivity (for example, a relative sensitivity $\alpha$) from the user information, and transmits the sensitivity to the threshold value changing unit 250. The threshold value changing unit 250 changes the first threshold value, the second threshold value, the third threshold value, and the fourth threshold value according to the sensitivity from the sensitivity acquisition unit 260. The light amount adjustment unit 210-2 adjusts the total light amount to be equal to or lower than the changed first threshold value and equal to or higher than the changed third threshold value, and adjusts the peak light amount to be equal to or lower than the changed second threshold value and equal to or higher than the changed fourth threshold value.

By using the image display device 40-4 according to Example 4 of the fourth embodiment, it is possible to perform image display processing similar to the image display processing (refer to FIG. 3) performed using the image display device 10-1 according to Example 1 of the first embodiment. In the image display processing, light amount adjustment processing 19 as an example of the light amount adjustment processing (step S2 in FIG. 3) is performed.

(Light Amount Adjustment Processing 19)

Figure 56:
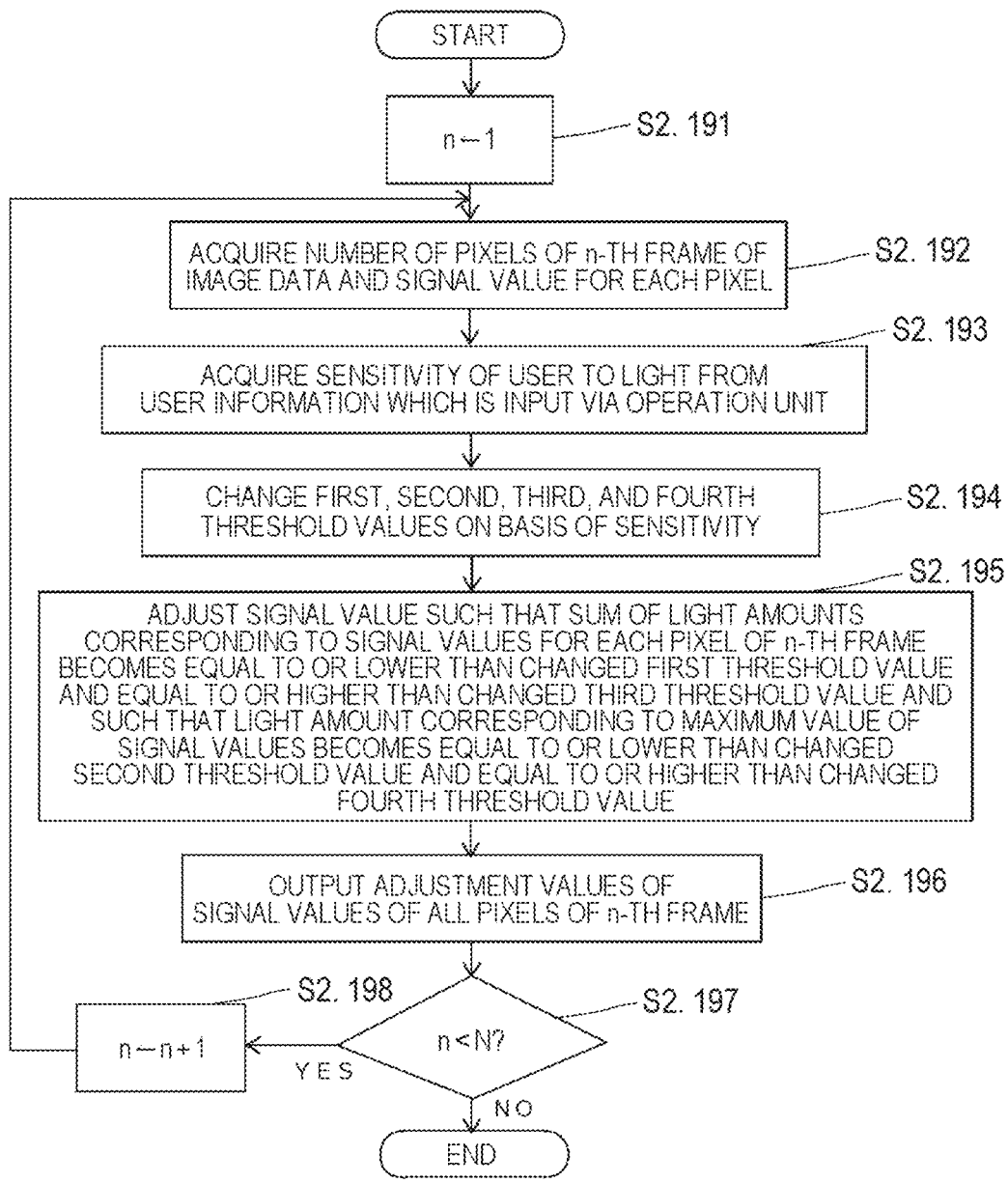
FIG. 56 is a flowchart for explaining light amount adjustment processing 19.

Hereinafter, the light amount adjustment processing 19 will be described with reference to a flowchart of FIG. 56. The light amount adjustment processing 19 is performed by the light amount adjustment system 200-19.

In first step S2.191, the light amount adjustment unit 210-2 sets n to 1.

In next step S2.192, the light amount adjustment unit 210-2 acquires the number of pixels of an n-th frame of the image data and the signal value for each pixel.

In next step S2.193, the sensitivity acquisition unit 260 acquires the sensitivity (for example, the relative sensitivity $\alpha$) of the user to light from the user information which is input via the operation unit 300. Specifically, the sensitivity acquisition unit 260 acquires a feature amount of the pupil 3 and/or a feature amount of the iris 6 from the user information, and acquires a sensitivity (for example, a relative sensitivity $\alpha$) of the user's eye to light from the acquired feature amount.

In next step S2.194, the threshold value changing unit 250 changes the first threshold value, the second threshold value, the third threshold value, and the fourth threshold value on the basis of the sensitivity acquired in step S2.193. Specifically, the first threshold value is changed from Th1 to Th1' (for example, Th1/$\alpha$), the second threshold value is changed from Th2 to Th2' (for example, Th2/$\alpha$), the third threshold value is changed from Th3 to Th3' (for example, Th3/$\alpha$), and the fourth threshold value is changed from Th4 to Th4' (for example, Th4/$\alpha$). Note that, for example, in a case where the relative sensitivity $\alpha$ is 1, the first threshold value, the second threshold value, the third threshold value, and the fourth threshold value are substantially unchanged.

In next step S2.195, the light amount adjustment unit 210-2 adjusts the signal value such that the total light amount Tli becomes equal to or lower than the changed first threshold value Th1' and equal to or higher than the changed third threshold value Th3' and such that the peak light amount Pli becomes equal to or lower than the changed second threshold value Th2' and equal to or higher than the changed fourth threshold value Th4', the total light amount Tli being a sum of the light amounts corresponding to the signal values for each pixel of the n-th frame, and the peak light amount Pli being a light amount corresponding to the maximum value of the signal values.

For example, in a case where the sensitivity of the user's eye to light is low (in a case of $\alpha<1$), the light amount adjustment unit 210-2 adjusts the total light amount Tli to a target value equal to or lower than the changed first threshold value Th1' (for example, Th1/$\alpha$>Th1) and equal to or higher than the changed third threshold value Th3' (for example, Th3/$\alpha$>Th3), and adjusts the peak light amount Pli to a target value equal to or lower than the changed second threshold value Th2' (for example, Th2/$\alpha$>Th2) and equal to or higher than the changed fourth threshold value Th4' (for example, Th4/$\alpha$>Th4). For example, in a case where the sensitivity of the user's eye to light is high (in a case of $\alpha \geq 1$), the light amount adjustment unit 210-2 adjusts the total light amount Tli to a target value equal to or lower than the changed first threshold value Th1' (for example, Th1/$\alpha \leq$Th1) and equal to or higher than the changed third threshold value Th3' (for example, Th3/$\alpha \leq$Th3), and adjusts the peak light amount Pli to a target value equal to or lower than the changed second threshold value Th2' (for example, Th2/$\alpha \leq$Th2) and equal to or higher than the changed fourth threshold value Th4' (for example, Th4/$\alpha \leq$Th4).

In next step S2.196, the light amount adjustment unit 210-2 outputs the adjustment values of the signal values of all the pixels of the n-th frame.

In next step S2.197, the light amount adjustment unit 210-2 determines whether or not n<N (total number of frames of image data) is satisfied. In a case where the determination in this step is YES, the flow proceeds to step S2.198, and in a case where the determination in this step is NO, the flow is ended.

In step S2.198, the light amount adjustment unit 210-2 increments n. In a case where step S2.198 is executed, the flow returns to step S2.192.

Even in the image display device 40-4 described above and the image display method using the image display device 40-4, the same effects as the effects of the image display devices 20-4 and 30-4 according to Example 4 of the second and third embodiments and the image display method using the image display devices 20-4 and 30-4 can be obtained.

Figure 57:
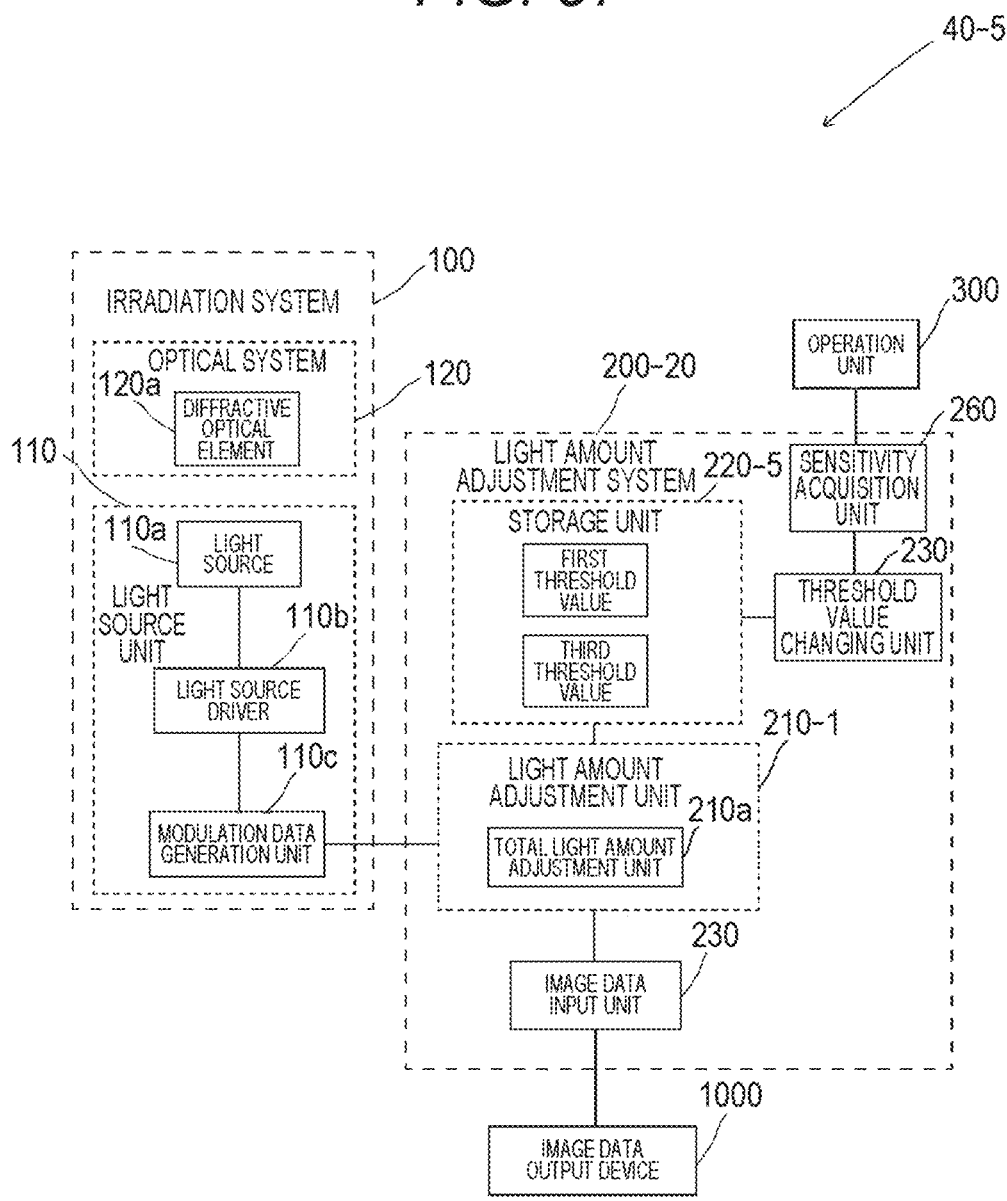
FIG. 57 is a block diagram illustrating functions of the image display device according to Example 5 of the fourth embodiment.
Figure 58:
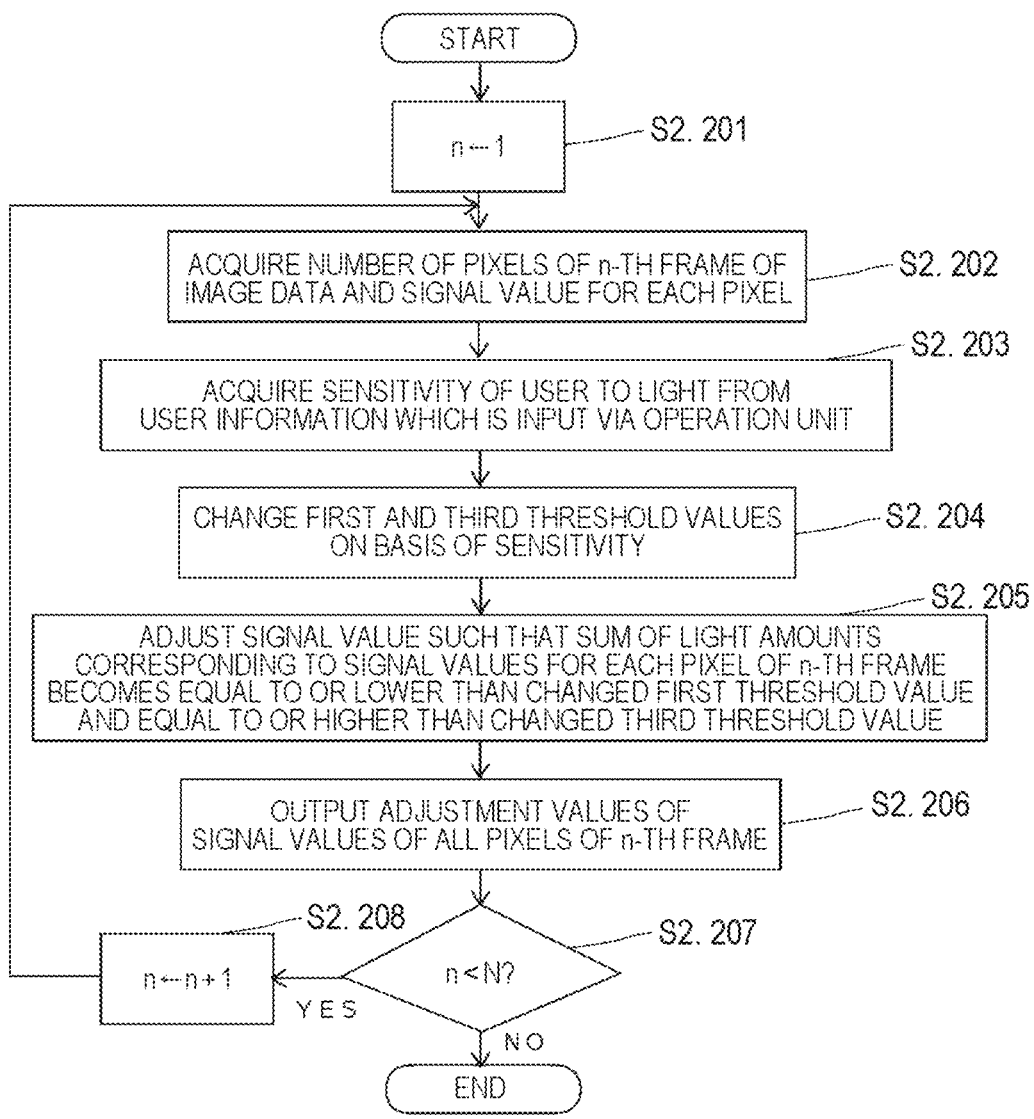
FIG. 58 is a flowchart for explaining light amount adjustment processing 20.

Image Display Device According to Example 5 of Fourth Embodiment of Present Technology As illustrated in FIG. 57, the image display device 40-5 according to Example 5 of the fourth embodiment has substantially the same configuration as the image display device 10-5 according to Example 5 of the first embodiment except that the light amount adjustment system 200-20 includes the threshold value changing unit 250 and the sensitivity acquisition unit 260. The threshold value changing unit 250 and the sensitivity acquisition unit 260 are configured by, for example, a CPU, an FPGA, or the like.

In the image display device 40-5, as an example, the sensitivity acquisition unit 260 acquires a sensitivity of the user's eye to light from an operation signal from an operation unit 300, and transmits the sensitivity to the threshold value changing unit 250. For example, in a case where the user inputs, as user information (operation signal), a feature amount (for example, at least one of a hue, a shade, or a size) of his/her own pupil 3 and/or iris 6 via the operation unit 300, the sensitivity acquisition unit 260 calculates a sensitivity (for example, a relative sensitivity $\alpha$) from the user information, and transmits the sensitivity to the threshold value changing unit 250. The threshold value changing unit 250 changes the first threshold value and the third threshold value according to the sensitivity from the sensitivity acquisition unit 260. The light amount adjustment unit 210-1 adjusts the total light amount to be equal to or lower than the changed first threshold value and equal to or higher than the changed third threshold value.

By using the image display device 40-5 according to Example 5 of the fourth embodiment, it is possible to perform image display processing similar to the image display processing (refer to FIG. 3) performed using the image display device 10-1 according to Example 1 of the first embodiment. In the image display processing, light amount adjustment processing 20 as an example of the light amount adjustment processing (step S2 in FIG. 3) is performed.

(Light Amount Adjustment Processing 20)

Hereinafter, the light amount adjustment processing 20 will be described with reference to a flowchart of FIG. 57. The light amount adjustment processing 20 is performed by the light amount adjustment system 200-20.

In first step S2.201, the light amount adjustment unit 210-1 sets n to 1.

In next step S2.202, the light amount adjustment unit 210-1 acquires the number of pixels of an n-th frame of the image data and the signal value for each pixel.

In next step S2.203, the sensitivity acquisition unit 260 acquires the sensitivity (for example, the relative sensitivity $\alpha$) of the user to light from the user information (operation signal) which is input via the operation unit 300. Specifically, the sensitivity acquisition unit 260 acquires a feature amount of the pupil 3 and/or a feature amount of the iris 6 from the user information, and acquires a sensitivity (for example, a relative sensitivity $\alpha$) of the user's eye to light from the acquired feature amount.

In next step S2.204, the threshold value changing unit 250 changes the first threshold value and the third threshold value on the basis of the sensitivity acquired in step S2.203. Specifically, the first threshold value is changed from Th1 to Th1' (for example, Th1/$\alpha$), and the third threshold value is changed from Th3 to Th3' (for example, Th3/$\alpha$). Note that, for example, in a case where the relative sensitivity $\alpha$ is 1, the first and third threshold values are substantially unchanged.

In next step S2.205, the light amount adjustment unit 210-1 adjusts the signal value such that the total light amount Tli becomes equal to or lower than the changed first threshold value Th1' and equal to or higher than the changed third threshold value Th3', the total light amount Tli being a sum of the light amounts corresponding to the signal values for each pixel of the n-th frame.

For example, in a case where the sensitivity of the user's eye to light is low (in a case of $\alpha<1$), the light amount adjustment unit 210-1 adjusts the total light amount Tli to a target value equal to or lower than the changed first threshold value Th1' (for example, Th1/$\alpha$>Th1) and equal to or higher than the changed third threshold value Th3' (for example, Th3/$\alpha$>Th3). For example, in a case where the sensitivity of the user's eye to light is high (in a case of $\alpha \geq 1$), the light amount adjustment unit 210-1 adjusts the total light amount Tli to a target value equal to or lower than the changed first threshold value Th1' (for example, Th1/$\alpha \leq$Th1) and equal to or higher than the changed third threshold value Th3' (for example, Th3/$\alpha \leq$Th3).

In next step S2.206, the light amount adjustment unit 210-1 outputs the adjustment values of the signal values of all the pixels of the n-th frame.

In next step S2.207, the light amount adjustment unit 210-1 determines whether or not n<N (total number of frames of image data) is satisfied. In a case where the determination in this step is YES, the flow proceeds to step S2.208, and in a case where the determination in this step is NO, the flow is ended.

In step S2.208, the light amount adjustment unit 210-1 increments n. In a case where step S2.208 is executed, the flow returns to step S2.202.

Even in the image display device 40-5 described above and the image display method using the image display device 40-5, the same effects as the effects of the image display devices 20-5 and 30-5 according to Example 5 of the second and third embodiments and the image display method using the image display devices 20-5 and 30-5 can be obtained.

9. Modification Example of Present Technology

The image display device according to the present technology is not limited to the configuration described in each of the embodiments described above, and can be appropriately changed.

Figure 59A:
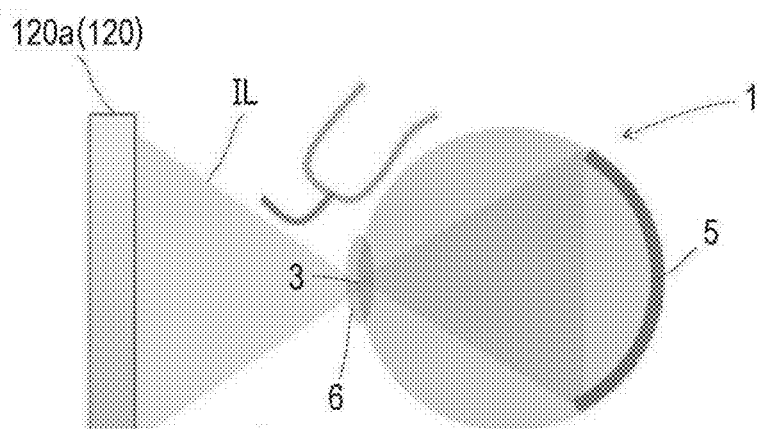
FIG. 59A and FIG. 59B are diagrams for explaining an example of enlarging an eye-box.

For example, as illustrated in FIG. 59A, in a case where a purpose of display is to display a wide angle of view, a light condensing position by the diffractive optical element 120a is set at a position of the pupil 3. In this case, substantially all of the image light IL is directly incident on the pupil 3, and thus the total light amount and the peak light amount of the image light IL do not change before and after the image light IL is incident on the eyeball 1.

Figure 59B:
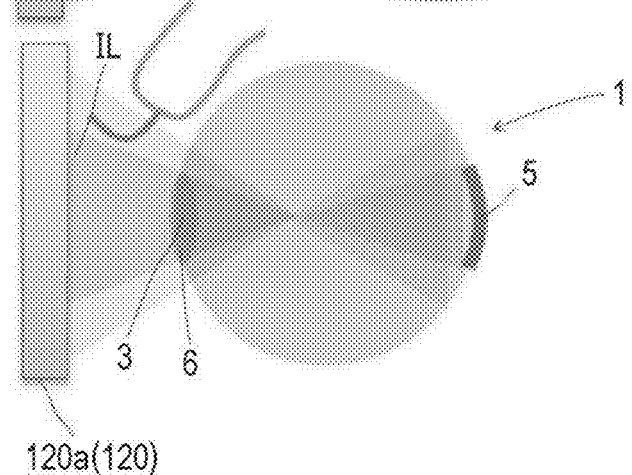

On the other hand, for example, as illustrated in FIG. 59B, as a method of enlarging a range in which an image when the eyeball moves can be seen (enlarging an eye-box), it is considered to shift the condensing position (beam waist position) of the image light IL by the diffractive optical element 120a from the pupil 3. In this case, a part (for example, a central part) of the image light IL is incident on the pupil 3, and the other part (for example, a peripheral part) of the image light IL is reflected by the iris 6 and then is guided to the pupil 3. Therefore, the total light amount of the image light IL after the image light IL is incident on the pupil 3 is smaller than the total light amount of the image light IL before the image light IL is incident on the eyeball 1.

Therefore, for the light which is incident on the iris 6 and is included in the image light IL, a difference between a light amount before being incident on the iris 6 and a light amount after being reflected by the iris 6 may be obtained in advance on the basis of reflectance of the iris 6, and the difference may be added to the total light amount and/or the peak light amount in a case of adjusting the total light amount and/or the peak light amount. The reflectance of the iris 6 can be acquired from a feature amount (for example, a hue, a shade, and the like of the iris 6) of the iris 6. Instead of or in addition to the reflectance of the iris 6 based on the feature amount of the iris 6, the total light amount and/or the peak light amount may be adjusted on the basis of a feature amount (for example, a hue, a shade, a size, and the like) of the pupil 3.

Note that, in FIG. 59B, the beam waist position of the image light IL is set on a retina 5 side of the pupil 3. On the other hand, the beam waist position of the image light IL may be set on a side opposite to the retina 5 side of the pupil 3.

Further, in a case where light corresponding to the peak light amount is included in the light which is incident on the iris 6 and is included in the image light IL, a difference between a light amount before being incident on the iris 6 and a light amount after being reflected by the iris 6 may be obtained in advance on the basis of the reflectance of the iris 6, and the difference may be added to the peak light amount in a case of adjusting the peak light amount.

The sensitivity acquisition unit 240 may include a light receiving element array (for example, a PD array in which a plurality of photodiodes is two-dimensionally arranged) for detecting a size of the pupil 3 and/or a size of the iris 6 instead of or in addition to the image capturing unit 240a.

A hue sensitivity varies depending on gender (man/woman). Thus, for example, for each of RGB (three primary colors of light), a light amount upper limit value and a light amount lower limit value of each color may be determined by a gender, a hue of the iris, and the like.

The sensitivity to light varies depending on age. Thus, an upper limit value and/or a lower limit value of the total light amount and/or the peak light amount may be set according to age.

The light source 110a of the irradiation system 100 may be a light emitting element array in which a plurality of light emitting elements is arranged in a one-dimensional array, or may be a single light emitting element. In this case, scanning of the eyeball may be performed by deflecting light from the light emitting element by an optical deflector. For example, in a case where the light source 110*a* is a single light emitting element, deflection and scanning may be performed by a two-axis MEMS mirror, a two-axis galvanometer, or the like. For example, in a case where the light source 110*a* is a one-dimensional light emitting element array, deflection and scanning may be performed by a single-axis MEMS mirror, a single-axis galvanometer mirror, or the like.

For example, as a method of adjusting at least one of the first to fourth threshold values Th1 to Th4, for example, a method of setting a threshold value for each user by an edge-AI-type machine learning device, collecting data in a cloud or the like, performing integrated learning, feeding back a learning result to each edge, and updating the threshold value to a more appropriate value may be used.

Some of the configurations of the image display devices according to Examples of the embodiments described above can be combined with each other within a non-inconsistent range.

The present technology can also have the following configurations.

(1) An image display device including:
an irradiation system that irradiates an eyeball of a user with image light with which an image is formed; and
a light amount adjustment system that adjusts a total light amount of the image light to be equal to or lower than a first threshold value regardless of a size of the image.

(2) The image display device according to (1), in which the first threshold value is a lower limit value of the total light amount at which a person feels glare or a value based on the lower limit value.

(3) The image display device according to (1) or (2), in which the light amount adjustment system adjusts a peak light amount of the image light to be equal to or lower than a second threshold value regardless of a size of the image.

(4) The image display device according to (3), in which the second threshold value is a lower limit value of the peak light amount at which a person feels glare or a value based on the lower limit value.

(5) The image display device according to any one of (1) to (4), in which the light amount adjustment system adjusts the total light amount of the image light to be equal to or higher than a third threshold value lower than the first threshold value regardless of a size of the image.

(6) The image display device according to (5), in which the third threshold value is a lower limit value of the total light amount at which a person does not feel poor visibility or a value based on the lower limit value.

(7) The image display device according to (5) or (6), in which the light amount adjustment system adjusts the total light amount of the image light to a target value equal to or lower than the first threshold value and equal to or higher than the third threshold value regardless of a size of the image.

(8) The image display device according to (3) or (4), in which the light amount adjustment system adjusts the peak light amount of the image light to be equal to or higher than a fourth threshold value lower than the second threshold value regardless of a size of the image.

(9) The image display device according to (8), in which the fourth threshold value is a lower limit value of the peak light amount at which a person does not feel poor visibility or a value based on the lower limit value.

(10) The image display device according to (8) or (9), in which the light amount adjustment system adjusts the peak light amount of the image light to a target value equal to or lower than the second threshold value and equal to or higher than the fourth threshold value regardless of a size of the image.

(11) The image display device according to any one of (3), (4), and (8) to (10), in which the light amount adjustment system includes a sensitivity acquisition unit that acquires a sensitivity of an eye of the user to light, and a light amount adjustment unit that adjusts the total light amount and/or the peak light amount on the basis of an acquisition result of the sensitivity acquisition unit.

(12) The image display device according to (11), in which the sensitivity acquisition unit acquires the sensitivity from a feature amount of a pupil of the eyeball and/or a feature amount of an iris of the eyeball.

(13) The image display device according to (12), in which the feature amount of the pupil is at least one of a hue, a shade, or a size of the pupil.

(14) The image display device according to (12) or (13), in which the feature amount of the iris is at least one of a hue, a shade, or a size of the iris.

(15) The image display device according to any one of (12) to (14), in which the sensitivity acquisition unit includes an image capturing unit that captures an image of the eyeball and/or a surrounding environment of the eyeball, and acquires the feature amount of the pupil and/or the feature amount of the iris from an image capturing result of the image capturing unit.

(16) The image display device according to any one of (12) to (15), in which the feature amount of the pupil and/or the feature amount of the iris are input to the sensitivity acquisition unit via an operation unit.

(17) The image display device according to any one of (11) to (16), in which the light amount adjustment system further includes a threshold value changing unit that can change the first threshold value according to the acquisition result of the sensitivity acquisition unit, and the light amount adjustment unit controls the total light amount to be equal to or lower than the changed first threshold value.

(18) The image display device according to (17), in which the threshold value changing unit further changes the second threshold value according to the acquisition result of the sensitivity acquisition unit, and the light amount adjustment unit controls the peak light amount to be equal to or lower than the changed second threshold value.

(19) The image display device according to any one of (3), (4), (8) to (18), in which a beam waist position of the image light is at a position shifted from a pupil of the eyeball, and an iris of the eyeball is irradiated with a part of the image light, and the light amount adjustment system adjusts the total light amount and/or the peak light amount according to a feature amount of the iris of the eyeball and/or a feature amount of the pupil of the eyeball.

(20) The image display device according to any one of (1) to (18), in which the irradiation system includes a light source unit that emits the image light, and a diffraction unit that diffracts the image light from the light source unit toward the eyeball.

(21) An image display method of irradiating an eyeball of a user with image light with which an image is formed, the method including: a light amount adjustment step of adjusting a total light amount of the image light to be equal to or lower than a first threshold value regardless of a size of the image.

(22) The image display method according to (21), in which the first threshold value is a lower limit value of the total light amount at which a person feels glare or a value based on the lower limit value.

(23) The image display method according to (21) or (22), in which, in the light amount adjustment step, a peak light amount of the image light is adjusted to be equal to or lower than a second threshold value regardless of a size of the image.

(24) The image display method according to (23), in which the second threshold value is a lower limit value of the peak light amount at which a person feels glare or a value based on the lower limit value.

(25) The image display method according to any one of (21) to (24), in which, in the light amount adjustment step, the total light amount of the image light is adjusted to be equal to or higher than a third threshold value lower than the first threshold value regardless of a size of the image.

(26) The image display method according to (25), in which the third threshold value is a lower limit value of the total light amount at which a person does not feel poor visibility or a value based on the lower limit value.

(27) The image display method according to (25) or (26), in which, in the light amount adjustment step, the total light amount of the image light is adjusted to a target value equal to or lower than the first threshold value and equal to or higher than the third threshold value regardless of a size of the image.

(28) The image display method according to (23) or (24), in which, in the light amount adjustment step, the peak light amount of the image light is adjusted to be equal to or higher than a fourth threshold value lower than the second threshold value regardless of a size of the image.

(29) The image display method according to (28), in which the fourth threshold value is a lower limit value of the peak light amount at which a person does not feel poor visibility or a value based on the lower limit value.

(30) The image display method according to (28) or (29), in which, in the light amount adjustment step, the peak light amount of the image light is adjusted to a target value equal to or lower than the second threshold value and equal to or higher than the fourth threshold value regardless of a size of the image.

REFERENCE SIGNS LIST

1 Eyeball
3 Pupil
6 Iris
10-1 to 40-5 Image display device
100 Irradiation system
110a Light source
120a Diffractive optical element (diffraction unit)
200-1 to 200-20 Light amount adjustment system
210-1 to 210-5 Light amount adjustment unit
240, 260 Sensitivity acquisition unit
240a Image capturing unit
250 Threshold value changing unit
Th1 First threshold value
Th2 Second threshold value
Th3 Third threshold value
Th4 Fourth threshold value
Th1' Changed first threshold value
Th2' Changed second threshold value
Th3' Changed third threshold value
Th4' Changed fourth threshold value
Tli Total light amount
Tli-H, Tli-L Target value of total light amount
Pli Peak light amount
Pli-H, Pli-L Target value of peak light amount

What is claimed is:

1. An image display device, comprising:
an irradiation system that irradiates a user's eye with light with which a display image is formed; and
a processor configured to:
capture an image of the user's eye;
acquire from the image a sensitivity of the user's eye to light based on a feature amount of a pupil and/or a feature amount of an iris of the user's eye; and
adjust a total light amount based on the sensitivity of the user's eye,
wherein the total light amount of the display image is equal to or lower than a first threshold value of the total light amount at which the user experiences glare based on the sensitivity of the user's eye to light from the acquired feature amount of the pupil or the iris of the user's eye and equal to or higher than a second threshold value of the total light amount at which the user does not experience poor visibility based on the sensitivity of the user's eye to light from the acquired feature amount of the pupil or the iris of the user's eye regardless of a size of the display image.

2. The image display device according to claim 1, wherein the first threshold value is a lower limit value of the total light amount at which the user experiences glare or a value based on the lower limit value.

3. The image display device according to claim 1, wherein a peak light amount of the display image is equal to or lower than a third threshold value regardless of the size of the display image.

4. The image display device according to claim 3, wherein the third threshold value is a lower limit value of the peak light amount at which the user experiences glare or a value based on the lower limit value.

5. The image display device according to claim 1, wherein the second threshold value is a lower limit value of the total light amount at which the user does not experience poor visibility or a value based on the lower limit value.

6. The image display device according to claim 1, wherein the total light amount of the display image is a target value equal to or lower than the first threshold value and equal to or higher than the second threshold value regardless of the size of the display image.

7. The image display device according to claim 3, wherein the peak light amount of the display image is equal to or higher than a fourth threshold value lower than the third threshold value regardless of the size of the display image.

8. The image display device according to claim 7, wherein the fourth threshold value is a lower limit value of the peak light amount at which the user does not experience poor visibility or a value based on the lower limit value.

9. The image display device according to claim 7, wherein the peak light amount of the display image is a target value equal to or lower than the third threshold value and equal to or higher than the fourth threshold value regardless of the size of the display image.

10. The image display device according to claim 1, wherein the feature amount of the pupil is at least one of a hue, a shade, or a size of the pupil.

11. The image display device according to claim 1, wherein the feature amount of the iris is at least one of a hue, a shade, or a size of the iris.

12. The image display device according to claim 1,
wherein the processor further updates the first threshold value according to the sensitivity of the user's eye, and
wherein the total light amount is equal to or lower than the updated first threshold value.

13. The image display device according to claim 3,
wherein the processor further updates the third threshold value according to the sensitivity of the user's eye, and
wherein the peak light amount is equal to or lower than the updated third threshold value.

14. The image display device according to claim 3, wherein a beam waist position of the display image is at a position shifted from the pupil of the user's eye, and the iris of the user's eye is irradiated with a part of light for the display image.

15. The image display device according to claim 1, wherein the irradiation system includes:
 a light source that emits light to display the display image; and
 a diffractor that diffracts the light from the light source toward the user's eye.

16. An image display method of irradiating a user's eye with light with which a display image is formed, the method comprising:
 a step of capturing an image of the user's eye;
 a step of acquiring a sensitivity to light of the user's eye from the image based on a feature amount of a pupil and/or a feature amount of an iris of the user's eye; and
 a light amount adjustment step of adjusting a total light amount of the display image to be equal to or lower than a first threshold value of the total light amount at which the user experiences glare based on the sensitivity of the user's eye to light from the acquired feature amount of the pupil or the iris of the user's eye and equal to or higher than a second threshold value of the total light amount at which the user does not experience poor visibility based on the sensitivity of the user's eye to light from the acquired feature amount of the pupil or the iris of the user's eye regardless of a size of the display image.

17. The image display method according to claim 16, wherein the first threshold value is a lower limit value of the total light amount at which the user experiences glare or a value based on the lower limit value.

18. The image display method according to claim 16, wherein, in the light amount adjustment step, a peak light amount of the display image is also adjusted to be equal to or lower than a third threshold value regardless of the size of the display image.

19. The image display method according to claim 18, wherein the third threshold value is a lower limit value of the peak light amount at which the user experiences glare or a value based on the lower limit value.

20. The image display method according to claim 16, wherein the second threshold value is a lower limit value of the total light amount at which the user does not experience poor visibility or a value based on the lower limit value.

21. The image display method according to claim 16, wherein, in the light amount adjustment step, the total light amount of the display image is adjusted to a target value equal to or lower than the first threshold value and equal to or higher than the second threshold value regardless of the size of the display image.

22. The image display method according to claim 18, wherein, in the light amount adjustment step, the peak light amount of the display image is adjusted to be equal to or higher than a fourth threshold value lower than the third threshold value regardless of the size of the display image.

23. The image display method according to claim 22, wherein the fourth threshold value is a lower limit value of the peak light amount at which the user does not experience poor visibility or a value based on the lower limit value.

24. The image display method according to claim 22, wherein, in the light amount adjustment step, the peak light amount of the display image is adjusted to a target value equal to or lower than the third threshold value and equal to or higher than the fourth threshold value regardless of the size of the display image.

* * * * *